US008064580B1

(12) United States Patent
Apple et al.

(10) Patent No.: US 8,064,580 B1
(45) Date of Patent: Nov. 22, 2011

(54) TELEPHONY SYSTEM AND METHOD WITH IMPROVED FRAUD CONTROL

(75) Inventors: Wesley Larry Apple, Archdale, NC (US); Timothy Edwin Pabon, Greensboro, NC (US); Kenneth Jay Gumbiner, Greensboro, NC (US); William Ryan, Greensboro, NC (US)

(73) Assignee: Confinement Telephony Technology, LLC, Greensboro, NC (US)

( * ) Notice: Subject to any disclaimer, the term of this patent is extended or adjusted under 35 U.S.C. 154(b) by 1399 days.

(21) Appl. No.: 11/219,541

(22) Filed: Sep. 2, 2005

Related U.S. Application Data

(60) Provisional application No. 60/607,447, filed on Sep. 3, 2004, provisional application No. 60/676,155, filed on Apr. 29, 2005, provisional application No. 60/676,153, filed on Apr. 29, 2005, provisional application No. 60/676,151, filed on Apr. 29, 2005, provisional application No. 60/676,154, filed on Apr. 29, 2005, provisional application No. 60/676,152, filed on Apr. 29, 2005.

(51) Int. Cl.
H04M 15/00 (2006.01)
H04M 3/42 (2006.01)

(52) U.S. Cl. ............ 379/114.14; 379/127.02; 379/201.1

(58) Field of Classification Search ............... 379/32.01, 379/114.14, 114.21, 114.24, 114.25, 114.26, 379/127.02, 127.06, 145, 188, 201.1, 207.13, 379/207.14, 207.15; 455/410, 411
See application file for complete search history.

(56) References Cited

U.S. PATENT DOCUMENTS

| 4,054,756 | A | 10/1977 | Comella et al. |
| 4,797,910 | A | 1/1989 | Daudelin |
| 4,890,317 | A | 12/1989 | Hird et al. |
| 4,908,852 | A | 3/1990 | Hird et al. |
| 4,922,519 | A | 5/1990 | Daudelin |
| 4,933,965 | A | 6/1990 | Hird et al. |
| 4,933,966 | A | 6/1990 | Hird et al. |
| 4,935,956 | A | 6/1990 | Hellwarth et al. |
| 4,993,062 | A | 2/1991 | Dula |
| 5,048,079 | A | 9/1991 | Harrington et al. |
| 5,093,858 | A | 3/1992 | Hird et al. |
| 5,113,433 | A | 5/1992 | Hird et al. |
| 5,131,027 | A | 7/1992 | Hird et al. |
| 5,159,698 | A | 10/1992 | Harrington et al. |

(Continued)

FOREIGN PATENT DOCUMENTS

EP 1 388 997 A1 2/2004

(Continued)

OTHER PUBLICATIONS

Arons, Barry,"SpeechSkimmer: A System for Interactively Skimming Recorded Speech," ACM Transactions on Computer-Human Interaction, vol. 4, No. 1, Mar. 1997, pp. 3-38.

(Continued)

*Primary Examiner* — Quoc D Tran
(74) *Attorney, Agent, or Firm* — Kilpatrick Townsend & Stockton, LLP

(57) ABSTRACT

Inmate communications systems provide a feature-rich platform with a high degree of flexibility and security employing call control facilities located off institutional premises. Authentication processes for calling and called party verification include biometric techniques in some embodiments. Distributed processing of call control and billing provide flexible interactive call payment processes. Preferred embodiments feature voice over IP transmission and control featuring controlled access to avoid addition of unauthorized third-party call participants. Monitoring, recording and selective forwarding of calls is provided under control of system administrators.

21 Claims, 19 Drawing Sheets

U.S. PATENT DOCUMENTS

| | | | |
|---|---|---|---|
| 5,199,077 | A | 3/1993 | Wilcox et al. |
| 5,319,701 | A | 6/1994 | Hird et al. |
| 5,319,702 | A | 6/1994 | Kitchin et al. |
| 5,351,290 | A | 9/1994 | Naeini et al. |
| 5,483,581 | A | 1/1996 | Hird et al. |
| 5,535,261 | A | 7/1996 | Brown et al. |
| 5,539,812 | A | 7/1996 | Kitchin et al. |
| 5,602,900 | A | 2/1997 | Hattori |
| 5,623,539 | A | 4/1997 | Bassenyemukasa et al. |
| 5,655,013 | A | 8/1997 | Gainsboro |
| 5,729,741 | A | 3/1998 | Liaguno et al. |
| 5,768,355 | A | 6/1998 | Salibrici et al. |
| 5,796,811 | A | 8/1998 | McFarlen |
| 5,805,685 | A | 9/1998 | McFarlen |
| 5,862,519 | A | 1/1999 | Sharma et al. |
| 5,867,494 | A | 2/1999 | Krishnaswamy et al. |
| 5,926,533 | A | 7/1999 | Gainsboro |
| 5,960,072 | A | 9/1999 | Hird et al. |
| 6,064,963 | A | 5/2000 | Gainsboro |
| 6,141,406 | A | 10/2000 | Johnson |
| 6,185,527 | B1 | 2/2001 | Petkovic et al. |
| 6,336,090 | B1 | 1/2002 | Chou et al. |
| 6,434,520 | B1 | 8/2002 | Kanevsky et al. |
| 6,480,825 | B1 | 11/2002 | Sharma et al. |
| 6,542,869 | B1 | 4/2003 | Foote |
| 6,560,323 | B2 | 5/2003 | Gainsboro |
| 6,611,583 | B1 | 8/2003 | Gainsboro |
| 6,636,504 | B1 | 10/2003 | Albers et al. |
| 6,639,977 | B1 | 10/2003 | Swope et al. |
| 6,639,978 | B2 | 10/2003 | Draizin et al. |
| 6,647,096 | B1 | 11/2003 | Milliorn et al. |
| 6,665,376 | B1 | 12/2003 | Brown et al. |
| 6,665,380 | B1 | 12/2003 | Cree et al. |
| 6,668,045 | B1 | 12/2003 | Mow |
| 6,760,701 | B2 | 7/2004 | Sharma et al. |
| 6,763,099 | B1 | 7/2004 | Blink |
| 6,795,540 | B1 | 9/2004 | Mow |
| 6,804,331 | B1 | 10/2004 | Vacek et al. |
| 6,836,540 | B2 | 12/2004 | Falcone et al. |
| 6,842,447 | B1 | 1/2005 | Cannon |
| 6,895,086 | B2 | 5/2005 | Martin |
| 6,898,277 | B1 | 5/2005 | Meteer et al. |
| 6,920,209 | B1 | 7/2005 | Gainsboro |
| 7,013,002 | B2 | 3/2006 | Link et al. |
| 7,042,992 | B1 | 5/2006 | Falcone et al. |
| 7,158,621 | B2 * | 1/2007 | Bayne .................. 379/114.13 |
| 7,403,766 | B2 | 7/2008 | Hodge |
| 7,494,061 | B2 | 2/2009 | Reinhold |
| 7,505,406 | B1 | 3/2009 | Spadaro et al. |
| 7,529,357 | B1 | 5/2009 | Rae et al. |
| 7,881,446 | B1 * | 2/2011 | Apple et al. ............. 379/114.21 |
| 2001/0036297 | A1 | 11/2001 | Ikegami et al. |
| 2001/0036821 | A1 | 11/2001 | Gainsboro et al. |
| 2001/0043697 | A1 | 11/2001 | Cox et al. |
| 2002/0120756 | A1 | 8/2002 | Lynam et al. |
| 2002/0126626 | A1 | 9/2002 | Singh et al. |
| 2002/0168060 | A1 | 11/2002 | Huie |
| 2003/0009333 | A1 | 1/2003 | Sharma et al. |
| 2003/0034423 | A1 | 2/2003 | Hess et al. |
| 2003/0035523 | A1 | 2/2003 | Mansfield |
| 2003/0091046 | A1 | 5/2003 | Fang et al. |
| 2003/0126470 | A1 | 7/2003 | Crites et al. |
| 2003/0138084 | A1 | 7/2003 | Lynam et al. |
| 2003/0200182 | A1 | 10/2003 | Truitt et al. |
| 2004/0022380 | A1 | 2/2004 | Lynam et al. |
| 2004/0029564 | A1 * | 2/2004 | Hodge ...................... 455/411 |
| 2004/0190702 | A1 | 9/2004 | Mayer et al. |
| 2005/0018828 | A1 | 1/2005 | Nierhaus et al. |
| 2005/0043014 | A1 | 2/2005 | Hodge |
| 2005/0063522 | A1 | 3/2005 | Kim et al. |
| 2005/0141678 | A1 | 6/2005 | Anders |
| 2005/0190902 | A1 | 9/2005 | Benco et al. |
| 2005/0283475 | A1 | 12/2005 | Beranek et al. |
| 2006/0188077 | A1 | 8/2006 | Susen et al. |
| 2006/0285650 | A1 | 12/2006 | Hodge |
| 2009/0046841 | A1 | 2/2009 | Hodge |

FOREIGN PATENT DOCUMENTS

WO     WO 00/76158 A1     12/2000

OTHER PUBLICATIONS

Alon, Guy, "Key-Word Spotting—The Base Technology for Speech Analytics," http://www.electronics-2000.com/images/aardvark/kws.pdf, Jul. 2005, pp. 1-8.

Dharanipragada, S., "A Fast Vocabulary Independent Algorithm for Spotting Words in Speech," Acoustics,Speech,and Signal Processing,'98 IEEE IN.Conf., V. 1, May 1998,pp. 233-236.

Johnson, Charles E., "New Technology is Creating Improvements in the Corrections Field," Corrections Today, Jul. 2005, pp. 62-64.

Leavitt, Neal, "Let's Hear It for Audio Mining," IEEE Comp., Oct. 2002, pp. 23-25.

Pfeiffer, Silvia, "Automatic Audio Content Analysis," Proceedings of the fourth ACM International Conference on Multimedia, Feb. 1997, pp. 21-30.

Wold, Erling, "Content-Based Classification, Search, and Retrieval of Audio," Multimedia, IEEE vol. 3, Issue 3, Fall 1996, pp. 27-36.

Sulkin, Allan, PBX Systems for IP Telephone, McGraw-Hill, 2002, pp. 183-202.

* cited by examiner

TELEPHONY SYSTEM AND METHOD WITH IMPROVED FRAUD CONTROL

RELATED APPLICATIONS

The present application claims priority based on these related provisional applications:

1. IP-Based Telephony System and Method, Ser. No. 60/607,447, filed Sep. 3, 2004;
2. Telephony System and Method with Improved Validation, Ser. No. 60/676,155, filed Apr. 29, 2005;
3. Telephony System and Method with Improved Call Monitoring, Ser. No. 60/676,153, filed Apr. 29, 2005;
4. Telephony System and Method with Improved Caller Access Control, Ser. No. 60/676,151, filed Apr. 29, 2005;
5. Telephony System and Method, Ser. No. 60/676,154, filed Apr. 29, 2005;
6. Telephony System and Method with Improved Fraud Control, Ser. No. 60/676,152, filed Apr. 29, 2005;

Each of these provisional applications is hereby incorporated by reference for all purposes in the present application as if set forth in its entirety herein.

In addition, other related non-provisional applications filed concurrently with the present application are:

7. *Telephony System and Method with Enhanced Fraud Control*, by W. L. Apple and T. E. Pabon;
8. *Telephony System and Method with Enhanced Call Monitoring, Recording and Retrieval*, by W. L. Apple and T. E. Pabon;
9. *IP-Network-Based Telephony System and Method*, by W. L. Apple and T. E. Pabon.
10. *Telephony System and Method with Enhanced Validation*, by W. L. Apple, T. E. Pabon and J. V. Townsend;
11. *Telephony System and Method with Enhanced Caller Access Control*, by W. L. Apple and T. E. Pabon.

Each of these concurrently filed non-provisional related applications is hereby incorporated by reference for all purposes in the present application as if set forth in its entirety herein. In the sequel, the above-identified related incorporated applications will be referred to by the paragraph number in which it appears, e.g. incorporated application 1, or incorporated provisional application 1, is a reference to IP-Based Telephony System and Method cited in paragraph 1 above. Because each of the cited concurrently filed applications incorporates all of the others, but none incorporates itself by reference, the corresponding paragraph number for the present application is intentionally omitted.

FIELD OF THE INVENTION

The present invention relates generally to the field of telecommunications. More particularly, the present invention relates, in one aspect, to voice and data telecommunications systems and methods. Still more particularly, aspects of the present invention relate to voice and data telecommunications systems and methods for use in providing collect, pre-paid calling or other billing options. Yet more particularly, embodiments of the present invention relates to such telecommunications systems and methods as applied to inmate telephone calling systems and methods for providing telephone calling services to inmates in correctional and other confinement facilities. The terms confinement facilities and correctional facilities are used interchangeably in this application.

BACKGROUND OF THE INVENTION

Various telephone calling and billing arrangements have been developed over the long history of the telecommunications industry. From operator-controlled local and long distance calls to automatic direct dialing to newly emerging computer telephony calling over data networks, and from plain-old-telephony service (POTS) to collect calling, to calling card, toll-free calling and pre-paid calling—among many others—the telephone industry has been continually seeking to apply new technologies to provide new and more flexible telephone calling services.

Electronic and optical switching, transmission, signaling, and database storage of many kinds have expanded the reach of telephony techniques to many new and enhanced applications. These and a variety of processors and other facilities embedded in, or linked to, more traditional facilities in the Public Switched Telephone Network (PSTN) have still further enlarged the spectrum of telephone services available to the public.

One telephone service area that has developed rapidly in recent years is that of providing telephone communications to inmates in jails, prisons and other confinement facilities, sometimes referred to as Inmate Calling Services (ICS). While ICS contexts involve functions in common with everyday home and business calling, and with calling from public facilities such as airports and hotels, special issues arise that are peculiar to ICS. Thus, for example, controls over timing, duration, allowed called destinations, and billing—among many others—must be addressed in planning and implementing ICS.

An important goal in providing ICS is call efficiency—despite the need to observe the many constraints characteristic of ICS calling. Thus, for example, automation of call setup, monitoring and billing processes for ICS is of high importance. In particular, since collect and other special billing arrangements are common in the provision of ICS, avoidance of costs associated with human operators to provide step-by-step controls for ICS has long been recognized. U.S. Pat. No. 4,054,756, issued Oct. 18, 1977 to Comella and Yokelson discloses a system and method for automating many operator services, including playing of recorded announcements, collection of information from calling and called parties, call setup and billing based on such inputs. Use of functionality like that described in the last-cited patent has therefore found application in the provision of ICS.

As computing power has greatly increased and been made available in the form of now-ubiquitous personal computers, the Comella, et al. teachings have been adapted to provide much of the computing power used to provide ICS. In particular, providing ICS to inmates in confinement facilities has lately been accomplished through the use of analog telephone station equipment (usually hardened versions of basic home or office telephone sets) connected to one or more personal computers located on-premises at correctional facility locations. Such computers are used, among other things, to control telephone access to the PSTN, record conversations as appropriate, and to generate and record Station Message Detail Reporting (SMDR) data for use in billing calls made from the correctional facility.

FIG. 1 shows a functional network diagram representation of a typical prior art ICS systems, including apparatus installed at a correctional facility connected to the PSTN. In particular, a telephone facility 100 is shown as including a plurality of analog telephone sets 101-*i*, i=1, 2, . . . , N, illustratively connected to control computer 110. Telephone sets 101-*i* and computer 110 may be physically located in different areas or different buildings of a correctional facility; more than one control computer 110 may be employed if required to meet calling volume at the facility. Control computer(s) 110 located on-site within an illustrative correctional facility are typically connected directly to the PSTN via on-site analog loop-start telephone lines or, in some cases, multiplexed digital connections, e.g., T1 carrier links. Personal computer-based control computer 110 typically includes a plurality of peripheral interface cards to accomplish connectivity between the analog stations and the PSTN. Illustratively, Intel Dialogic D/4PCI cards are used to interface to up to four input telephone sets per card. In some applications, up to 16 such cards can be used in a single computer to provide access to PSTN 120 for up to 64 telephone sets. Other particular Intel cards can provide much higher line coverage. While the illustrative Intel cards provides functionality for detecting ringing associated with incoming calls, ICS calling is typically limited to providing only outbound calling from the correctional institution.

The one or more control computers 110 at each correctional facility site, in cooperation with PSTN functionality provided off-site by local and long distance telephone companies, control the sequence of events required to complete ICS calls originated at the correctional facility site to called parties connected to the PSTN. Such calls are typically either collect or debit/prepaid telephone calls to remote called parties identified by inmates using the facilities shown in FIG. 1. In FIG. 1 the PSTN is represented as cloud 120; parts of PSTN 120 are shown outside this cloud to emphasize the part they play in completing the call. In particular, illustrative PSTN switches 140 and 145 are shown serving representative stations, shown as telephones 170 and 160, respectively, in FIG. 1. Telephone station set 160, by way of example, is indicated as the called party's telephone set.

The owner or provider of the on-site telephony equipment and ICS incurs purchase, operation and maintenance costs associated with the completion of such calls, and seeks a profit by charging a rate for ICS calls that repays both the fixed costs (equipment, maintenance and other) and the variable per-call costs that the provider incurs for use of PSTN 120.

As will be appreciated from the foregoing, control computer costs, telephone line use costs, and maintenance costs associated with ensuring a high level of system up-time at many geographically distributed (on-correctional-site) installations—each including complex computer hardware and associated software—can be burdensome and expensive.

Voice over IP (VOIP) techniques using the Internet or other data networks offer possible alternatives to a range of existing business and residential communications systems. In particular, VOIP systems are emerging as candidate implementations for a variety of enterprise communications solutions. One illustrative example of such systems is available from Quintum Technologies. Residential use, as illustrated by AT&T's CallVantage VOIP service over high-speed cable connections, and digital subscriber line Internet connections by local exchange carriers and others, is also emerging as a possible alternative to local and long distance calling using traditional Plain Old Telephone Service (POTS). A formal XML Schema for IP-based voice telephony service is included as Exhibit ipdr-1 in incorporated provisional application 1.

A particular aspect of collect, bill-to-third-party, and calls involving other particular billing options is that of billing validation. Billing validation relates generally to validating the availability of identified accounts for billing of a call, and has proven to be especially important for inmate calling. Thus, for example, validation is commonly sought for collect calls to determine that the account, including called party account numbers, exist and are of a class for which billing can be accomplished by one or more billing entities. In some cases, as, for example, for at least some calls to a called party at a cellular account number, it is often difficult to ensure billing for the benefit of an ICS provider placing the call on behalf of a calling party. Often bills for calls completed to a variety of called party destination types prove to be uncollectible unless complex, expensive and time-consuming validation techniques are used. Further, these techniques are applied in prior practice even when a call is not completed, as when the called number is busy or a called party fails to answer.

Because of the rise in popularity of cellular and other portable telephone devices, many of which do not provide billing collection services for calls placed by wireline ICS providers, an important step in insuring payment for ICS is to verify the type of service subscribed to by the called party for ICS calls. Perhaps even more important in this regard is the rise of CLECs or Competitive Local Exchange Carriers, who often lack the ability or inclination to provide billing collection for calls processed by an ICS provider. CLECs are to be contrasted with the traditional incumbent local exchange carriers (ILECs), such as a Regional Bell Operating Company (RBOC).

Some estimates report that upwards of 20 percent of calls sought to be completed by ICS providers are ultimately to be completed by CLECs. When combined with mobile services such as cellular telephone services for which billing is sometimes problematic, the combined percentage of calls potentially associated with billing problems can easily approach or exceed twenty-five percent.

To help reduce the number of calls completed to telephone stations associated with cellular service, CLEC and other services that do not ensure collection and payment of charges for ICSs, and for other service providers concerned about billing of charges for services rendered, a number of databases are maintained by the telephone industry for checking the status of particular telephone lines. In particular, so-called Line Identification Databases (LIDB databases) provide a variety of information for telephone lines. Thus, a database query launched to a LIDB or similar database for a call can provide some information relating to whether calls to a particular line (and the account and phone number associated with it) can be counted on (or not) to be billed by the number provider.

Other databases having special information about particular telephone subscriber accounts may also be maintained, including, generally, a class known as billed number screening databases or by other particular names. Some of these are maintained locally by service providers based on past history of payment, credit or other factors. All of these may help service providers, including ICS providers, to increase the share of calls that can actually be billed, thereby increasing the share of calls for which charges are actually collected.

As might be expected, use of LIDB and other telephone line or account databases by service providers seeking information about particular telephone lines or accounts incurs charges by the providers of such databases. Since data commonly found in such databases is available more easily to some industry participants than others, concern is sometimes expressed by those querying the database as to these charges and conditions associated with use of the databases. In particular, a significant percentage of calls for which line or account databases (hereinafter, LIDB databases) are queried (i.e., for which so-called database dips are performed) prove to be no-revenue calls. This no-revenue condition can arise because the LIDB data raises issues about the likelihood of being able to bill for the call. For example, the unlikely ability to bill for the call may be indicated by a database response indicating no data is available for the particular line/account (hereinafter, line). In some cases, it is possible to arrange for alternative payment methods by which a called party can pay for received calls, even if such payment options are not reflected in the LIDB database response. But by the time such arrangements have been made, a LIDB dip may well have been performed, and a cost to the ICS provider incurred.

Further, even if the line information received in response to a LIDB dip appears to warrant the completion of a call in the expectation of being able to bill for the call, the call may not be completed, e.g., because of a busy line or a no-answer condition at the time of the call. As to conditions associated with LIDB services, it is often required that even successive calls to the same number must employ a separate LIDB dip, thus incurring multiple charges for the same information over a short interval. Moreover, storage (or caching) of prior LIDB dip results is typically discouraged under contracts with LIDB database providers. Thus, ICS and other service providers incur substantial costs for LIDB services, even for calls or call attempts for which no revenue will be derived by the ICS provider.

In yet another way that ICS providers incur costs without deriving any revenues involves so-called billed number screening (BNS). Callers attempting to place a third number billed or collect call to a line equipped with BNS will be advised by an announcement that such billing is not authorized and another form of billing is required. Such need for alternative billing arrangements may not be determined before costs of call setup and LIDB dip has been performed, thus incurring cost to an ICS provider. It is obviously preferable that such alternative billing arrangements not be negotiated on each call to a BNS line.

It is therefore desirable for network users, such as ICS providers, to ascertain with increased certainty that calls placed can be billed. Moreover, it is desirable that such calls incur minimum costs to the provider and provide convenience for calling and called parties to an ICS call.

A need therefore exists to provide flexible and economical validation of billing status for called parties or others relied upon by an inmate to pay charges for ICS calls.

A continuing problem in ICS is that though an original called party (e.g., an inmate's lawyer or an approved family member) can be qualified by correctional authorities to receive inmate calls, such calls can sometimes be forwarded, extended, bridged, or otherwise connected to other parties who have not been so qualified. A primary mechanism for permitting calls to such not-qualified persons or locations includes the conference call and call forwarding functionality available to many PSTN users. In the sequel, all multi-party, conference, forwarded, bridged, or otherwise extended calls will be referred to as conference calls or 3-way calls—irrespective of the actual number of stations involved and irrespective of the particular mechanism used to establish or maintain the call—unless the context requires otherwise. It should be borne in mind that some 3-way calls may be authorized, e.g., to simultaneously discuss a legal issue with an attorney and spouse, or with two attorneys at different locations.

Many techniques have been developed to attempt to thwart unauthorized 3-way calling. These have often employed monitoring a calling line to detect hook-flashes or other signals characteristic of a 3-way call attempt for an ongoing call. A number of problems with such techniques have long been recognized, including false-positive indications. Claims for successful detection of unauthorized 3-way calls on inmate calls have frequently been regarded as dubious. It is therefore desirable to control inmate calling behavior by seeking to positively detect unauthorized 3-way calling, but to permit 3-way calling when properly authorized.

Applicants have further recognized that present implementations of existing features and the introduction of new features in existing ICS systems and methods often suffer limitations imposed by current personal computer-based on-site computers and PSTN communications links and processes. Areas in which ICS systems and methods are currently limited include (i) location of processing assets on-site at correctional institutions, thereby limiting or precluding ready access to specialized or high-powered computing and communications resources, (ii) establishing the identity of a calling inmate with a high degree of certainty, (iii) rapidly and economically recording, monitoring, storing and selectively playing back inmate conversations to serve a variety of law enforcement needs, and (iv) identifying with a high degree of certainty when unauthorized persons receive (including by forwarding) or are added to calls originated by calling inmates.

SUMMARY OF THE INVENTION

Limitations of the prior art are overcome and a technical advance is made in accordance with the teachings of the present invention described in illustrative embodiments herein.

Applicants have recognized that the application of VOIP principles to the implementation of ICS offer flexibility, added feature functionality and reduction in operating costs needed to support significant upgrading of existing ICS systems and services. In one illustrative embodiment, Voice Over Internet Protocol (VOIP) techniques are practiced in a cardless IP Telephony Switch (IPTS computer, or IPTS in the sequel) in concert with other peripheral systems to perform functionality provided by traditional ICS systems, and to provide significant additional functional capabilities while yielding cost reductions and operational efficiencies. IPTS computers and related peripheral functionality may be co-located at central or regional nodes of a data network, or such computers and peripheral units may be distributed over plural node locations in the network. Such flexibility in locating cooperating functional elements is an important advantage of packet-based networks, such as those employing VOIP principles and protocols.

An illustrative IPTS computer is based on Intel's Host Media Protocol (HMP) technology to process digitized speech and telephony events while avoiding the need for traditional trunk and station telephony cards as well as avoiding the need for IP telephony cards. It proves advantageous in some embodiments to employ well-known communications protocols, e.g., Ethernet protocols and one or more standard Ethernet Network Interface (NIC) cards, to transport digitized voice and control signals to the IP Telephony Switch.

Thus, for example, overall operation of one illustrative system provides for analog telephone stations—handset/keypad combinations—to be connected via standard telephone lines to one or more industry-standard Foreign Exchange Station (FXS) VOIP gateways in such numbers and capacities as are required to handle originating traffic for each particular correctional location. These FXS gateways provide dial tone, ring voltage and basic signaling functionality to a calling station, and in some implementations also perform conversion of calling party analog voice signals into compressed (or uncompressed) digital data streams. Example VOIP gateways are provided by AudioCodes Inc. and include analog gateway digital gateway, VOIP Media Gateway offerings. Further useful background on typical VOIP gateways is available from AudioCodes Inc. These documents appear as included Exhibits AC-1, AC-2, AC-3 and AC-4, respectively, in incorporated provisional application 1. Applications employing such technologies are described in a white paper entitled "AudioCodes Enterprise VoIP Networking: (EVN): Migrating to the New Voice Infrastructure," available at from AudioCodes, Inc. and is included as Exhibit AC-5 in incorporated provisional application 1; and in an applications description entitled "AudioCodes' Enterprise VoIP Applications Description," available from AudioCodes, Inc. and included as Exhibit AC-6 in incorporated provisional application 1.

FXS gateway functionality is illustratively provided through interfaces on stand-alone units dedicated to such gateway functionality, as well as through ports on routers, access servers and network switches, including IP switches. Such FXS functionality is also illustratively employed for converting incoming digital signals from the IPTS into analog voice signals directed to the calling stations. FXS gateways are, in turn, connected, illustratively via standard Ethernet links to the IPTS (through the use of a standard Ethernet hub or switch). Alternative transport of digitized voice and control signals between a data network and correctional facilities may be employed in accordance with flexible design choices available for practice of the present invention.

The IPTS is then connected via standard Ethernet links, hubs or switches, (or via other data network transport techniques) as appropriate to the network topology, to an industry standard FXO gateway. The FXO gateway functions to convert between digital VOIP packets, or other data signals, and signals compatible with the Public Switched Telephone Network (PSTN). FXO gateways are advantageously configured to interface between the VOIP digital device (IPTS) and either or both traditional phone lines (e.g., analog loop-start), or digital (e.g., T1) PSTN lines. This allows the phone service provider the flexibility to use whichever type of PSTN line is more cost-effective for a given instance.

In accordance with another aspect of illustrative embodiments of the present invention, the above-described network elements, including the IPTS and associated database and processing functionalities, are advantageously programmed and configured to provide centralized or regional call control functions and administrative functions. These call control functions include caller authentication, call setup, billing control, billing validation, call progress, security, quality control, and other functions to be described more fully below. Administrative functions include maintenance of allowed-caller lists, allowed 3-way call parties, account status, billing records and others.

Advantageously, centralized or regionalized processing of call control and administrative tasks in accordance with embodiments of the present invention permits simplified and efficient operation of ICSs. Moreover, overall costs associated with the purchase, installation, updating, operation and maintenance of ICS systems in accordance with embodiments of the present invention are reduced. Importantly, networks based on presently described inventive principles are readily scaled to handle a rapid expansion, as by the deployment of ICS at an additional correctional facility.

In accordance with another aspect of the present invention, billing validation methods are employed that prove to be efficient in the use of system resources while permitting flexibility in offered billing options. Thus, in accordance with a feature of illustrative embodiments of the present invention, special first call treatment is provided in ICS calling by means of which costs for an ICS provider can be minimized while providing convenience and choice to ICS customers. In this illustrative embodiment, normal processing of an ICS call is modified by the inclusion in a billed-party-validation process in which a query to at least one database (local, LIDB or other) has raised an issue as to the likelihood of payment being made. Then, in accordance with a presumed or default mode, the improved processing provides that a call be allowed to proceed without charge to either the calling or called party, subject to certain limitations. In illustrative circumstances, such as when a new account has been opened, sufficient database information is not available, or when a collect call is sought to be made by a particular calling party to a particular called party for the first time, thus raising possible payment issues, an inventive first call feature is advantageously applied.

So, for example, rather than delay an initial call while other possible payment arrangements might be made, a call is allowed to be completed without charge to either the calling or called parties. However, this call is advantageously preceded by an announcement to the called party or both the called and calling parties that while payment issues have arisen for the present call, the call will be completed without charge, but subject to the requirement that the party to be billed (usually the called party) engage in a discussion with a representative of the ICS provider at the completion of the call regarding payment for future calls. Generally, the allowed duration for the free call will be for a reasonable, but limited, time.

In accordance with another aspect of the present invention, caller authentication is enhanced through the use of speaker verification techniques, either alone or in combination with traditional user-id and password techniques.

Another aspect of the present invention relates to monitoring, recording, storing and selective retrieval for playback of inmate conversations. Such recording-related functions are, of course, performed within constraints imposed by law, including restrictions relating to attorney-client communications. Such selective real-time access to on-going conversations and selective retrieval of recorded calls for subsequent playback advantageously employs word-spotting, audio mining and other speech processing techniques, as well as non-voice call-related data, as may be appropriate.

In particular, it proves advantageous for law enforcement personnel to be selectively granted access to high-quality on-going conversations between a calling inmate and one or more other parties, e.g., to thwart actual or potential criminal activity or otherwise maintain good order and discipline. In providing these and other monitoring, recording and access functions, some embodiments of the present invention advantageously employ speech recognition functionality to identify the kind of treatment accorded calls placed by, or to, particular individuals.

In particular, it proves advantageous to employ so-called word spotting techniques, i.e., comparing words or phrases occurring in the course of monitored or stored conversations with particular predetermined words or phrases having significance in particular circumstances. For example, when potential criminal activity is a concern, the occurrence of particular recognized words or phrases having significance in the context of such criminal activity will, in accordance with an aspect of the present invention, trigger a predetermined response. Such trigger will illustratively take the form of a flag or other distinguishing indicia being associated with a physical location on a recording medium, or a particular time in a call recording. These triggers are further advantageously associated with or, conditioned by, other occurring events or predetermined facts, conditions, or events. For example, if a particular phrase is found to have been spoken in a monitored conversation between two particular individuals, a course of action might be pursued that is different from that pursued when the conversation is not between the same two individuals.

In accordance with another embodiment of the present invention, advantage is taken of existing standard VOIP protocols, such as the well-known SIP protocol, and enhance identification techniques for treating all VOIP calls as conference calls involving at least an authorized calling party, illustratively an inmate calling party, and an authorized called party. So, an ICS call is set up in a substantially similar manner to that used in accordance with the SIP protocols for setting up conference calls generally. Additional qualifying information is advantageously required with respect to a named calling party or identified called network address, telephone number, or other personal or terminal indicia. Among other criteria used to determine initial or continued qualification by an ICS call participant are receipt of current terminal or address information and current speaker identification.

BRIEF DESCRIPTION OF THE DRAWING

The above-summarized description of illustrative embodiments and features of the present invention will be more fully understood upon a consideration of the following detailed description and the attached drawing, in which like-numbered elements and steps in the several figures have a common identity, and wherein.

DETAILED DESCRIPTION

Figure 1:
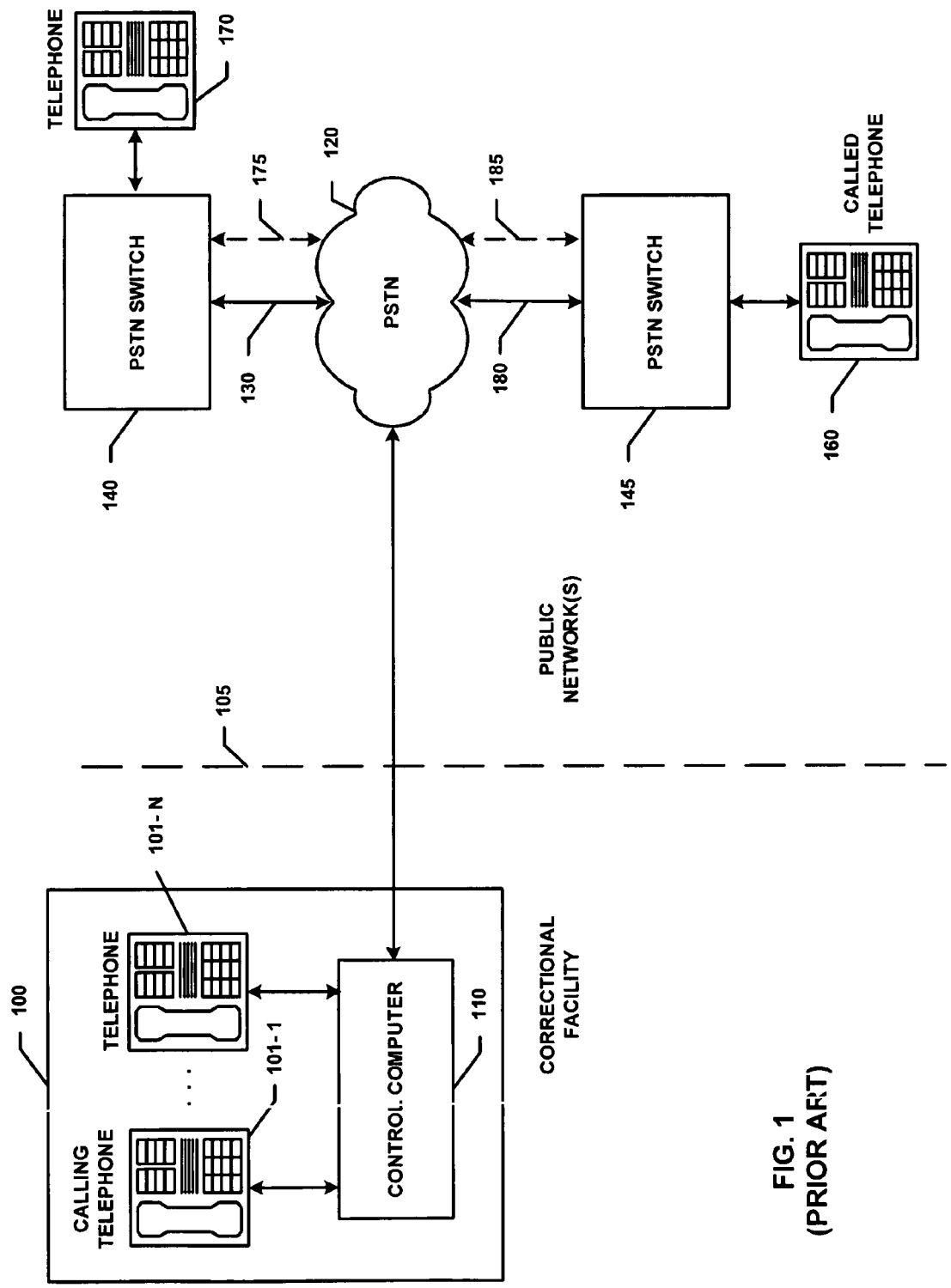
FIG. 1 is a system block diagram of a typical prior art ICS system for use a particular correctional facility.

Some Typical Functions Performed in Completion of ICS Telephone Calls

As noted above, calls by inmates at correctional facilities are usually subject to a number of administrative, security and billing constraints. In particular, ICS calls are primarily collect calls (though pre-paid, credit card and other call payment options are also used). ICS calls are automatically processed, at present, at the correction facility, by performing a sequence of steps including some combination of the following:

(1) authenticating the caller, as by verifying one or more (or sometimes neither, or with other particular identification) of a keypad entry of a (sometimes public) UserID and a (private) Personal Identification Number (PIN), (2) if the caller is authenticated, receiving digits keyed by the caller to identify the called party (called number), (3) recording or retrieving a stored voice announcement, e.g., one made by the caller, identifying the caller, (4) verifying that the called party's number is one appearing on a set of allowed called party numbers, (5) placing a collect (or other special billing) telephone call to the called party while temporarily disconnecting the calling party, (6) upon answer at the called number, playing a recorded announcement (typically including the recording made by the calling party) explaining the nature of the call and requesting approval to complete the call, typically subject to payment by the called party, (7) upon receipt at the ICS system of a response indicating willingness to accept charges for the call, bridging the calling telephone to the connection to the called party number to complete the call.

Other steps typically performed by the ICS system can include (a) time recording to determine charges for each completed call (collecting and processing SMDR data), (b) checking for the nature of the called party station (e.g., whether the called station is a wireless or other special type of station), (c) processing call attempts that are not answered or for which charges are not accepted, (d) collecting and coordinating SMDR data from a plurality of correctional locations in one or more correctional systems.

Many other steps—such as monitoring and reporting functions, whether specifically related to the placing and billing of a call or not—are also performed for security, law enforcement and other purposes. As noted, these steps are presently performed on site at a correctional institution—with necessary interaction with, and completion of calls by switches and other facilities of the PSTN.

Illustrative System Overview

Systems introduced in the prior art to automatically accomplish the foregoing steps have typically been located at individual correctional facilities to serve calls made from the respective associated facility. These and other systems for performing the required automatic operator assistance functions (recording and playing announcements, placement of collect calls, receiving acceptance signals from a called party, and the like) have been end-to-end circuit switched implementations that inefficiently used network facilities and provided limited feature flexibility and suffered operational, maintenance and customization limitations. Present inventive contributions overcome these and other limitations as will now be described in more detail.

Initially, a VOIP network will be described with reference to FIG. 2 that provides underlying infrastructure for implementing ICS services in a flexible, economical and efficient manner. Known enterprise VOIP networks, their component elements, and the manner of interconnecting these elements to provide communications in a typical corporate or other enterprise are described at links provided by Cisco Systems, Inc. One particular description presents the design of a long distance network. For ease of reference, this last-cited paper is included as Exhibit C1 in incorporated provisional application 1. Another white paper describing gateways (from Micronet) is included as Exhibit MN-1 in incorporated provisional application 1. It will be clear from these and many other public references that the design and implementation of a VOIP network for completing otherwise ordinary telephone calls is well understood. The following descriptions will show how such now available network designs and implementations can be adapted and extended to provide ICS and features associated with ICS.

Figure 2:
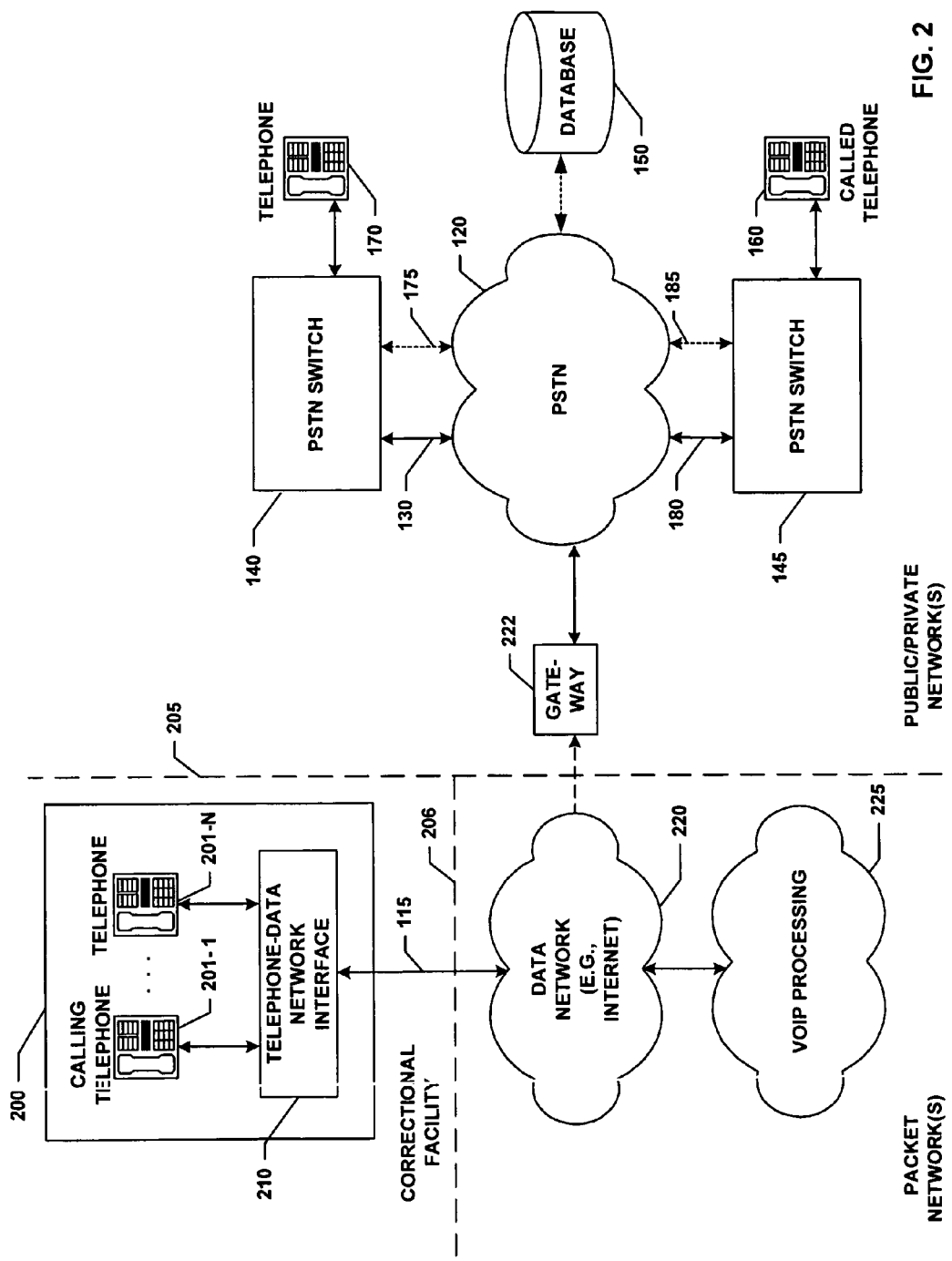
FIG. 2 is an overall view of a network useful in practicing illustrative embodiments of the present invention.

FIG. 2 is an overall view of one network useful in practicing illustrative embodiments of the present invention. Shown there is a telephone facility 200 at a correctional facility including a plurality of telephone stations 201-$i$, $i=1, 2, \ldots, N$, represented by their respective telephone sets, and an interface 210 for interfacing the telephone stations 201-$i$ to a data network 220. Data network 220 may be the Internet or other IP network, or it may be a composite data network having a variety of access interfaces and transport links. For example, at least part of data network 220 may, in some embodiments of the present invention, include an Asynchronous Transfer Mode (ATM) backbone or other ATM links and may also include appropriate ATM access facilities, e.g., including one or more digital subscriber line access multiplexers (DSLAMs). Internet Protocol (IP) packets may be reformatted or otherwise converted to ATM cells for transport over ATM networks; ATM cells may likewise be converted to IP packets in an overall network. Portions of data network 220 may employ other particular packet, frame, cell or other data format and may be transported in accordance with an appropriate one of the standard protocols used with these respective formats. For illustrative purposes only, the present descriptions will be primarily couched in terms of the well-known Ethernet formats and protocols and packets configured and processed in accordance with IP and related protocols, e.g., the well known TCP protocol.

Inmate Telephone Sets and Network Interface

In many implementations, telephone stations 201-$i$ in FIG. 2 will be standard analog telephone sets—physically hardened as appropriate to use in particular correctional facilities. As such, telephone sets 201-$i$ may be functionally identical to telephone sets 101-$i$ shown in the prior art system of FIG. 1. In other cases, telephone stations 201-$i$ may include digital telephones that incorporate analog-to-digital (A/D) and digital-to-analog (D/A) conversion in the sets themselves or in associated terminal adapters. Such A/D conversion operates on analog speech generated by a party to a telephone conversation at a station 201-$i$ and, in a complementary manner, D/A conversion operates on speech arriving at a station 201-$i$ to provide analog speech to the party. Signaling information, to/from a station 201-$i$ may also be processed, as appropriate, by A/D and D/A using such facilities.

The telephone interface 210 to data network 220 shown in FIG. 2 will therefore assume a variety of particular implementations, each suitable for interfacing with particular types of telephone sets and data networks. Thus, if telephone stations 201-$i$ are standard analog stations (without A/D and D/A functionality), then their voice output and signaling information may pass as analog signals directly to data network 220 in FIG. 2 for further processing. In such instances, Network 220 will also, in a complementary manner, provide for conversion from digital signals to supply analog voice and signaling information to telephone stations 201-$i$.

Illustrative interfaces 210 employing so-called FXS and FXO functionality and protocols will be described below. Additionally, any of the well-known analog or digital multiplexing techniques may also be used for combining signals to and from the telephone facility 200, or from two or more such facilities at the same or separate correctional facilities.

In other cases, interface 210 will include digital-to-analog conversion processing to provide digital voice and signaling information to data network 220 and to receive corresponding digital signals from data network 220. In some cases, interface 210 will perform the further steps of packetizing and de-packetizing of telephone signals exchanged between telephones 201-$i$ and data network 220. As will be apparent, interface 210 permits great flexibility in selecting particular station equipment at correctional facilities and particular types of data networks 220.

Data Networks

Data network 220 shown in FIG. 2 includes functionality to accommodate the input/output characteristics of telephone facilities 200. In particular, data network 220 will, in appropriate cases, include functionality for converting analog signals received from telephone interface 210 to digital signals suitable for further transmission on data network 220. In such circumstances, data network 220 also provides functionality for converting received signaling information and received digital-coded voice signals to analog form before directing such analog signals to interface 210 and respective ones of telephone sets 201-*i*.

In particular embodiments of the present invention, network interface 210 will include functionality of standard Network Interface Cards (NICs) associated with standard IEEE 802.3 (Ethernet) or high speed (including Gigabit Ethernet) protocols or other standard network protocols. Such Ethernet protocols are sometimes referred to as 10 Base T and 100 Base T (10BT or 100BT), or Gigabit Ethernet (Gig-E). In other links in network 220/225, even higher speed transmission may be achieved using 10 Gigabit Ethernet protocols. See IEEE standard 802.3ae (10 Gigabit Ethernet Alliance (10GEA) and in "10 Gigabit Technology Overview," Intel Corporation, 2003 (Attached as Exhibit I-2 in incorporated provisional application 1). In such Ethernet network interfaces outputs from interface 210 may be in the form of the respective frames or blocks associated with the respective protocols. It will prove advantageous in many cases to multiplex the output from telephone interface 210 over a single transmission link to data network 220, or, in any event, a number of links smaller than the number of telephone sets 201.*i*. Accordingly, telephone interface 210 may include one or more Ethernet links to data network 220.

In appropriate cases, as when the output from telephone sets 201-*i*, an adapter associated with these telephone sets, or telephone interface 210 is in one of many well-known digital coded formats, e.g., PCM, ADPCM, or one of the compressed formats such as ITU-T G.711μ Law, G.726-32, G.723, G.711aLaw, G.722, G.728, G.729, GSM, and other well-known codec standards, many of the resulting data streams may be multiplexed over one or more T1-grade links or a fractional T1-grade links. Other useful, techniques for transmission of coded data over data networks are described in IETF RFC 1890, "RTP Profile for Audio and Video Conferences with Minimal Control" included as Exhibit IETF-1 in incorporated provisional application 1. RTP is a well known protocol used in streaming of multimedia content that proves useful in many contexts, including techniques used in practicing embodiments of the present invention.

Whether telephone sets 201-*i* or interface 210 in FIG. 2 provide digital outputs, e.g., standard IEEE 802.3 (Ethernet) frames, or whether analog signals are received and converted to digital format at data network 220, it proves advantageous in accordance with illustrative embodiments of the present invention to switch and transmit these digital signals over all or part of data network 220. Again, these signals may be in Ethernet, T1, fractional T1 (FT1), ISDN, ATM, IP or other digital formats. For present illustrative purposes only, it will be taken that these digital signals are advantageously converted to Internet Protocol (IP) format for transmission over the Internet or other IP-based communication links, which IP links typically form at least part of data network 220. It will be understood by those skilled in the art that in other contexts, other particular protocols will be used.

As will be elaborated below, receipt of voice digital information (and related signaling information) at data network 220 from a plurality of sources, e.g., a number of correctional facilities, or a number of buildings or sections of a single correctional facility will advantageously be concentrated in data network 220. It will be understood, however, that data network 220 may also be used to transport forms of packetized or other digital-formatted, non-speech information.

VOIP Processing in Data Network(s)

Because the architecture and infrastructure of data networks are generally well known, features of data network 220 that are not especially related to the present invention are not shown in the drawing of FIG. 2. However, for emphasis only, network functionality associated with VOIP processing is shown in a separate network cloud 225 in FIG. 2. As will be understood by those skilled in the art, no such separate grouping of facilities is necessary, or even appropriate in many cases. To the contrary, it proves advantageous in many applications and configurations to have processing for performing VOIP and other network-based functions distributed in network 220 in a manner best suited to the geographical, functional and economic constraints and requirements, goals and tasks at hand. This characteristic of data networks will be observed in the further discussion herein, with only the relevant processing elements and functions being displayed for the feature functionality being described.

Embodiments of the present invention will, however, typically include substantial shared network-based resources, as distinguished from having individual control and administrative facilities located at, and dedicated to calling from, respective ICS facilities. Thus, it will prove advantageous to have at least a substantial portion of switching, routing, control, administrative, billing, security and maintenance facilities operate in a shared, networked mode on behalf of an overall network, or a logical, functional or a geographic regional subset of an overall network. In particular, call processing functionality included in control computer 110 of FIG. 1 that is used in present networks to perform these functions is moved to centralized or distributed network nodes at "off-site" (off-correctional-facility-site) locations. In addition, because of the availability of substantial processing capacity at such network nodes, significant additional functionality not available at "on-site" ICS locations is readily made available in network 220 (including the portion represented as 225) in FIG. 2. This additional functionality is conveniently provided through execution of new, augmented or specially configured application software—or combinations of existing software and hardware functionality in this data network.

Certain functions, such as selected network access functions may be retained at a location that is on-site at a correctional facility. Thus, for example, collection of information, such as speech samples, iris scans and other personal identification indicia may be performed at a node located on-site at a correctional facility. At least preliminary processing of such collected identification information will also be performed on-site in some cases. In some cases, recording and, at least temporary storage of, recorded calls may also be performed on-site. In general, however, important advantages in processing, storing and retrieving call content, billing, and other call-related information are realized by relocating these functions to off-site network node locations.

Examples of network resources and processing for VOIP, and other multimedia content and data formats in an overall network arrangement of the type shown in FIG. 2 will be described below.

Interfaces Between Data Networks and PSTN

FIG. 2 further shows the connection of data network 220 (supported by its VOIP processing components shown as 225) through a gateway 222 to Public Switched Telephone Network (PSTN) 120 for completion of calls to stations such as telephone station 160 and 170 through respective switches 145 and 140. Gateway 222 provides an illustrative interface between data network 220 and PSTN 120 in accordance with one or more well-known protocols. Among these protocols are those set out in International Telecommunications Union (ITU) Recommendation H.323 for packet-based multimedia communications systems, the Session Initiation Protocol (SIP) defined by the Internet Engineering Task Force (IETF) in RFC 2543 and Media Gateway Control Protocol discussed in IETF RFC 3015, and also published as ITU-T Recommendation H.248). Each of these readily available recommendations, RFPs or other standards-like documents is hereby incorporated by reference in the present text as if set forth expressly in its entirety herein. See also Intel's overview in "SIP and IPLink™ in the Next Generation Network," attached as Exhibit I-1 in incorporated provisional application 1.

When ICS calls are sought to be completed in the context of the networks of FIG. 2, all or some of the same requirements and constraints imposed in the prior art system of FIG. 1 may apply. For example, an emphasis on collect calls, and the use of recorded announcements are maintained in illustrative network-based embodiments of the present invention. The following discussion of these network-based implementations will, however, focus on network-based processing in combination with innovative network architectures to accomplish improved ICS.

FXS and FXO gateway functionality is illustratively employed in interfaces to correctional facility telephone resources 200 for interfacing with data network 220. Foreign eXchange Subscriber (FXS) and complementary Foreign eXchange Office (FXO) functionality is well known in the analog telephony world and has been adapted for use in interfacing between telephone station equipment and a variety of networks. See, for example, a tutorial by G. Yancey and K. Devlin-Allen of Texas Instruments, Inc., entitled "Building Residential VoIP Gateways: A Tutorial—Part Two: VoIP Telephony Interfaces," appearing as Exhibit TI-1 in incorporated provisional application 1.

Figure 3B:
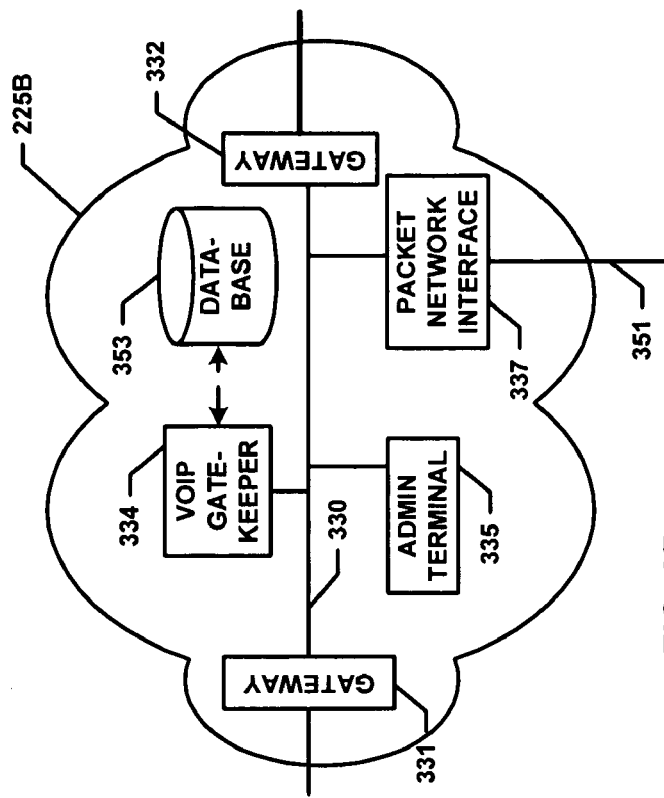
FIG. 3B is a representation of a second set of VOIP and call control functional elements useful in the practice of second embodiments of the present invention in the context of a network of the type shown in FIG. 2.
Figure 3A:
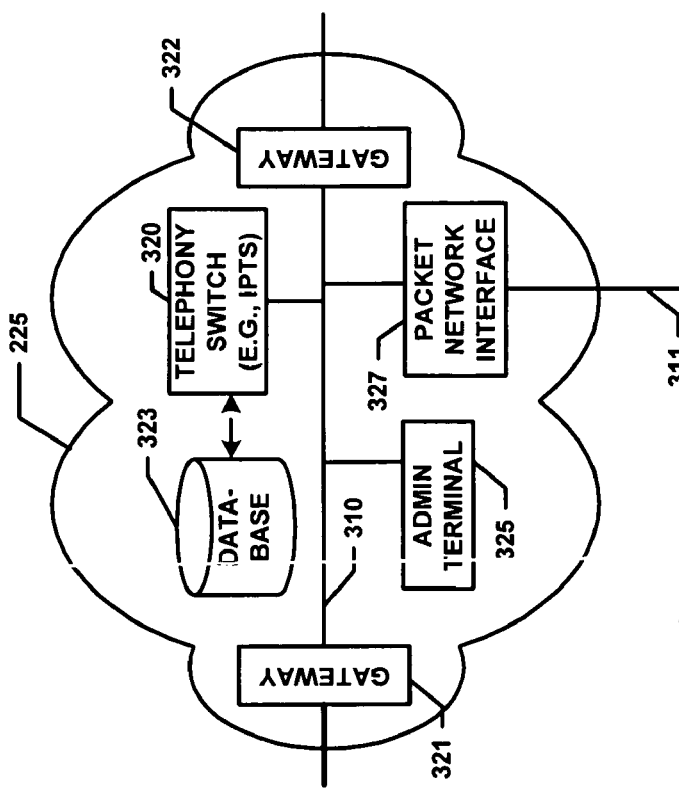
FIG. 3A is a representation of a first set of VOIP and call control functional elements useful in the practice of first embodiments of the present invention in the context of a network of the type shown in FIG. 2.

The FXS and FXO functionality may be implemented through interfaces 160 on stand-alone units dedicated to such a gateway role, e.g., gateway 321 in FIG. 3A, as well as through ports on routers, access servers and IP network switches. In some applications, the FXS and FXO functionality will be present at a calling party site at which telephone stations are located, and in other cases will be present in a data network. See, for example, the document included as Exhibit C-2 in incorporated provisional application 1 for illustrative background discussion of physical and virtual voice interfaces including FXS (and FXO) resources. Illustrative procedures for configuring voice ports and dial peers on voice gateway routers are provided in other Cisco documents (Exhibit C-3) and Exhibit C-4 in incorporated provisional application 1.

Though traditional (prior art) installations of complete network interfaces have been located on-site at correctional facilities, illustrative embodiments of the present invention permit use of simplified interfaces between correctional facilities and the data network, and between the data network and the PSTN. Thus, for example, in some embodiments only a single Ethernet connection (of sufficient bandwidth) need be provided for each of these simplified interfaces.

FIG. 3A shows one illustrative embodiment for VOIP processing cloud 225 constituting part of overall data network 220. Shown in FIG. 3A is gateway 321, which will illustratively include FXS functionality for interfacing with telephone-data-network interface 210. As noted above, other particular gateway functionality between data network 220 and interface 210 will be appropriate in some cases, depending on the nature of interface 210. Also shown in FIG. 3A is a telephony packet switch, illustratively an IP packet telephony switch (IPTS) 320. Modern IP packet switches have many of the characteristics of general purpose computers and can be programmed to provide high-speed switched packet processing, as is well known in the art. In appropriate cases IPTS 320 may include a high speed router for routing IP packets to gateways in data network 220 based on addresses derived during call setup pursuant to one or more of the protocols used for VOIP and other voice-over-data-network protocols.

Recent implementations of high speed (e.g., Gigabit) Ethernet protocols and associated networks also permit data network 220 to include one or more switched Ethernet (data link layer-2 or layer 2-addressed) links. Here, layers refer to the well-known seven-layer OSI Reference Model. See, for example, J. Davidson & J. Peters, Voice over IP Fundamentals, Cisco Press, 2000, (hereinafter, "Davidson") especially Chap. 7, pp. 151-164 (included as Exh. D-1 in incorporated provisional application 1). By way of example, when gateway 321 is arranged to receive Ethernet frames from one or more correctional facility interfaces 210, then switch 320 will, in some embodiments, advantageously include an Ethernet switch to appropriately direct these frames toward their destination within data network 220. In this context the Ethernet switch acts as a high-speed network bridge with a plurality of interfaces to different network portions or to different networks. In the course of traversing data network 220 it will often prove convenient to convert Ethernet formatted voice and signaling information to another form, e.g., IP packets or ATM cells, for transmission over a variety of physical media toward the desired destination. Still further, conversions, including conversion back to Ethernet format—or to another format—may also prove advantageous before final delivery of the digital information to a destination gateway, such as gateway 322 in FIG. 3A, for conversion to an appropriate format for delivery to PSTN 120. In other cases, it will prove convenient to have data from an ICS calling location formatted as IP packets at an early stage of transmission.

If required, conversion to a different format, e.g., from Ethernet to IP packet format, will be performed in a gateway, such as 321, or at a switch or router (reflecting alternative implementations of IPTS 320) in FIG. 3A. Widely available routers, e.g., Cisco's 3600 Series routers, include ports for receiving data in a variety of formats, including Ethernet, ATM, T-1, etc. See further, Exhibit C-4 in incorporated provisional application 1.

It will be understood that the representation of data network 220 and its VOIP Processing portion 225 in FIG. 2 may be greatly simplified as compared with many actual network arrangements for practicing the present invention. Thus, in particular, network 220 and its component elements for VOIP Processing 225, will in some networks include subnetworks, each of which may serve a portion of the calling traffic, with connections between subnetworks being accomplished through well-known gatekeepers, such as those described in the above-referenced ITU H.323 and other industry standards. Examples of internetworking are provided in Exhibit C-1 included in incorporated provisional application 1 and many standard texts. See for example, Davidson, pp. 129-148, included as Exhibit D-2 to incorporated provisional application 1, including FIGS. 6-7 on p. 139 of that exhibit.

FIG. 3A also shows database 323 connected to IPTS 320. Database 323 is one illustrative implementation for storing routing, billing, call privilege, call restriction and other data pertaining to identified callers, destinations, or other calling information. In appropriate cases, database 323 may be used to store conversations made by inmates in correctional facilities, as is presently the case—subject to certain exceptions, e.g., calls made to an inmate's legal counsel. As will be discussed below, it is sometimes advantageous to provide separate storage and associated indexing, retrieval and playback facilities for monitoring, recording, and otherwise processing inmate call content. Though not shown as connected directly to illustrative interconnection (Ethernet) LAN 310, it may prove convenient to make such a connection, e.g., for mirroring certain packet streams to be recorded and otherwise providing more direct access to database 323 for other non-switching functions, including those identified above. Storage and processing of information of the type just described at a central (or regional) location provides efficiencies not found in traditional correctional-site-based ICS call processing systems.

FIG. 3A also shows an administrative (admin) terminal 325 for purposes of entering and modifying inmate calling data, e.g., login, PIN and similar data, and for reviewing call records and the like—all as is well known. Flexibility afforded administrators in accordance with embodiments of the present invention is realized by virtue of the network connectedness of admin terminal 325. That is, because the terminal can be located at any linked location in data network 220 (including VOIP processing portion 225), a central location (or one or more regional locations) can include admin terminals for editing, reviewing and otherwise processing data accumulated in database 323.

Just as admin terminal 325 may be used at a single location in network 220/225, so too may database 323 and telephony switch 320 (and other functional units) also be located at such single network node separate from on-site ICS calling locations. Facilities at such single location may, nevertheless, provide services (switching, admin, database, and other) for a plurality of ICS calling locations—or all ICS calling locations in a region or beyond—for which traffic is directed to that single node. Alternatively, some or all of the functions, e.g., switching or database functions, may be separately located from other functions. That is, a database node in network 220/225 may house only the database and related functions, receiving queries, data streams, and control or other messages from throughout a region or an entire network, i.e., the database may be dedicated to a single or limited range of functions, with other databases performing other required functions. So, too, may a switch be at a location serve an entire network (or a region or sub-network) solely with regard to switching functions. In other cases, a switch will include sufficient processing power as to permit other particular functions, e.g., word spotting analyses or other speech processing functions to be described below. As can be seen, it will often prove advantageous to group diverse network functions, but sometimes it will prove more advantageously to have distributed, but interconnected, special-purpose nodes performing only one or a few functions.

Figure 5:
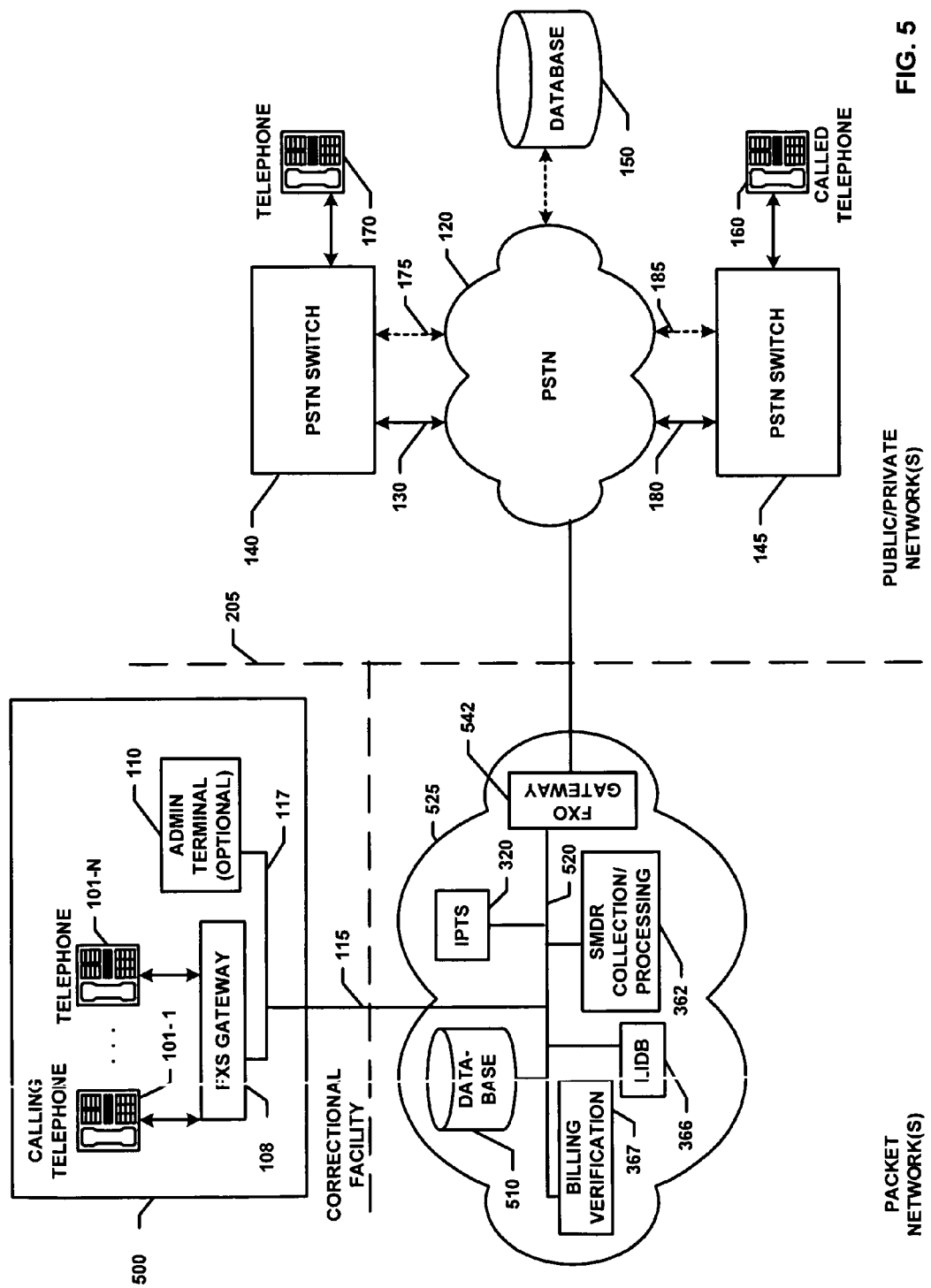
FIG. 5 is a representation of an alternative implementation of the network of FIG. 2 showing FXS/FXO gateways and aspects of billing and call control functional elements.

In fact, the network architecture shown in FIG. 2 allows distribution of facilities, including switches, routers, databases and all other functional units at locations that are most convenient to the system operator or support personnel. That is, because of the interconnection of VOIP (or other voice over data) functionality shown in FIGS. 2 and 3A-C, some or all of the facilities, may be grouped, isolated, replicated or otherwise arranged in data network 220/225. While not required, it may prove convenient to include some functionality, e.g., an admin terminal, 325 at a correctional facility site. This will allow local correctional facility administrators to monitor certain operational details of the network, perhaps relating to call privileges for, or calls placed by, particular inmates. FIG. 5 shows an alternative embodiment that includes such terminal (and FXS gateway functionality, as well) at a correctional facility site. Further, while it will not generally be efficient to perform switching and other call setup functions at a correctional facility, it may prove convenient to perform at least some call recording and related processing at a correctional facility for calls that originate at that facility.

Packet network interface 327 in FIG. 3A is an example port or terminal on LAN 310 for connection to another node in data network 220/225—or to another network, through a gateway if necessary. The nature of the packet interface will vary depending on the format of data, e.g., IP packets, and all ports need not be of the same format. That is, IPTS may route some packets (or frames, etc.) that arrive in one format and other packets that arrive in other formats. As noted above, multi-function routers allow for such a variety of port formats and configurations. Many such packet network interfaces will generally be found for connecting to nodes in data networks 220/225 and nodes external to data networks, as appropriate to particular applications and network topologies.

As has been noted, locations for one or more switches (IPTS 320) or other high-investment or high-maintenance resources are advantageously located at an off-site (from correctional facilities) facility shared with a service provider's network control center, or to a PSTN telephone central office. Thus, by combining such high investment elements, a service provider gains the advantage of more readily available access to network critical functionality. Such consolidation of facilities compares favorably with availability for maintenance and operations monitoring of facilities located wholly or partly on correctional facility premises. Service providers thereby require fewer personnel and/or less travel time for specialized technicians. This characteristic of present inventive embodiments therefore offers the potential for lowering costs and increasing operational efficiency, while also greatly expanding available functionality.

FIG. 3B shows a variation of the illustrative voice processing portions of data network 220, with the whole cloud in FIG. 3B being referenced as 225B. The differences between the clouds of FIG. 3A and FIG. 3B principally relate to the call setup and switching functionality reflected by IPTS 320 (in FIG. 3A) and VOIP gatekeeper 334 (in FIG. 3B). That is, the elements of 225B in FIG. 3B provide for gatekeeper functions, among other functions. IPTS 320 has been discussed above.

Gatekeeper 334 is a control element associated, e.g., with the ITU H.323 protocol for multi-media (including voice) network connections. Aspects of the H.323 protocol provide for receiving requests for connection to a called party at a gatekeeper such as 334, and having the gatekeeper act to permit exchanging packets with a called party. Gatekeeper 334 will, in some implementations, include a database function—represented by connected database 353—to provide address translation and other gatekeeper functions. Gatekeeper functions are fully specified in the H.323 standard itself and many commercial implementations of H.323 are readily available and widely discussed in the literature. See, e.g., Davidson at Chapter 10, included as Exhibit D-3 in incorporated provisional application 1.

Other elements shown in FIG. 3B perform the functions described above for corresponding elements in FIG. 3A. In particular, gateways 331 and 332 (well known in H.323 multimedia networks and described in several exhibits included in incorporated provisional application 1) provide network-based interfaces to telephone-data-network interface 210 and PSTN 120, respectively.

Figure 3C:
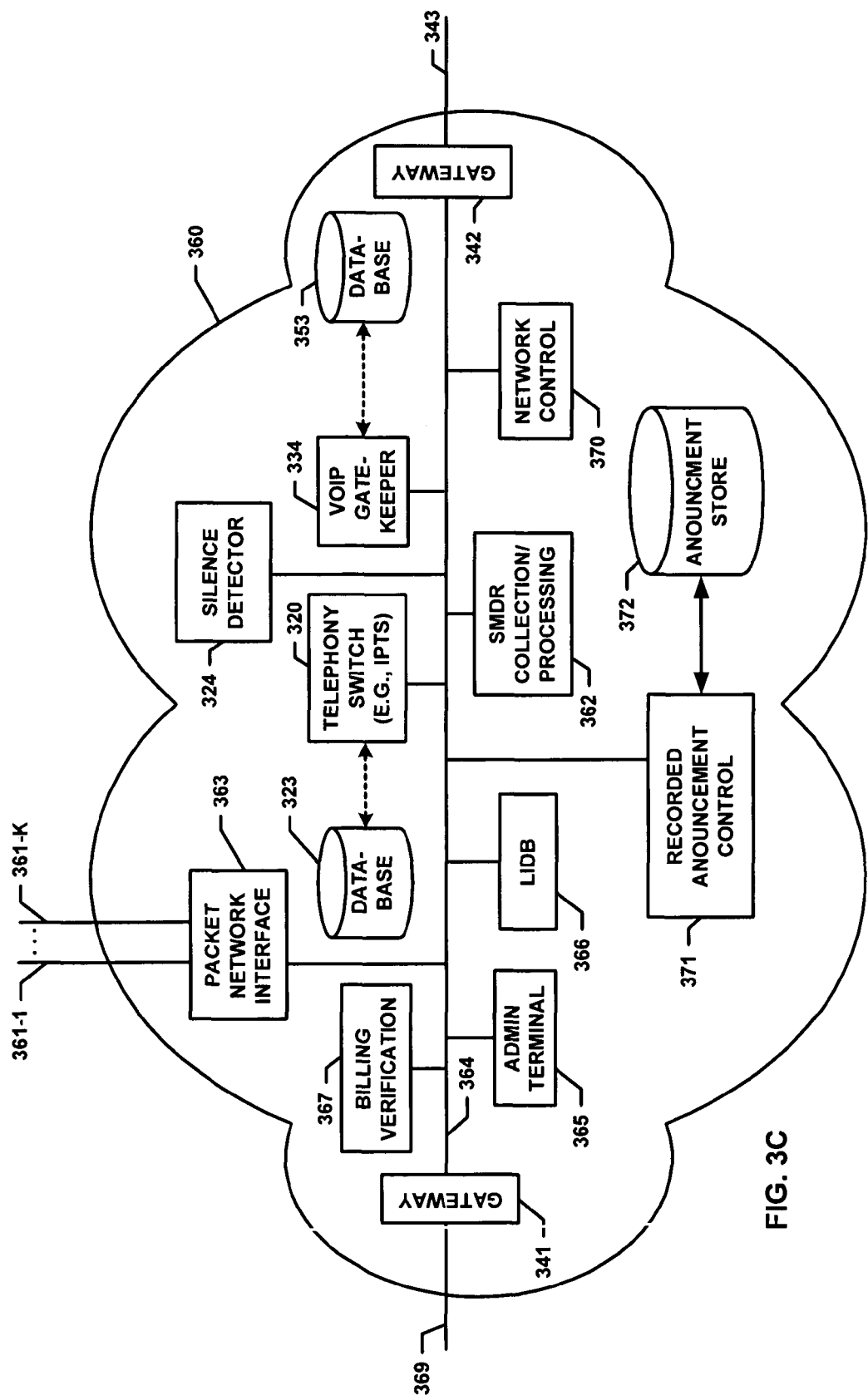
FIG. 3C is a representation of other call control and billing functional elements useful in the practice of other embodiments of the present invention (including those functionalities in common with those shown in FIGS. 3A and 3B) in the context of a network of the type shown in FIG. 2.

FIG. 3C shows additional functionalities useful in providing ICS calling and, by illustrative example, shows how call control functionality for a plurality of correctional 180 calling sites can be combined at a single network-based (off-correctional-facility-site) location. Thus, the functionalities included in the cloud of FIG. 3C advantageously combine and expand upon functions of either or both of FIG. 3A and FIG. 3B. In FIG. 3C, the two gateway interfaces 341 and 342, and packet interface 363 (and its representative external paths 361-1 thru 361-K to other destination(s) in network 220 and 185 elsewhere, as appropriate), switching and database elements 320 and 323, admin terminal 365, and VOIP gatekeeper 334 (with associated database 353) provide the same functionality as corresponding elements in FIGS. 3A and 3B. But FIG. 3C also includes new functional elements in cloud 360. In particular, the above-noted network control center that provides overall administrative control, maintenance, and the like for calls 190 from all correctional facilities in a region (or for the entire network) is represented by network control 370. While the specific configuration of a network, including use of particular vendor component products, will dictate the type of network control required, a representative network control center is described in the Cisco document included as Exhibit C-5 in incorporated provisional application 1.

SMDR collection/processing block 362 in FIG. 3C represents the retrieval (e.g., from a plurality of distributed network databases), processing and preparation of data for billing purposes. While such SMDR functionality has been used with on-site ICS call setup and control computers in past implementations of ICS processing, use at a central network (or regional) network node permits ready access and modification to SMDR records and processing.

FIG. 3C also shows Line Identification Database (LIDB) 366, which database is typically accessed in the course of setting up a call. In particular, checking this database includes checking for the existence of, and the type of station corresponding to, the called party telephone. This checking is useful because certain types of called party numbers, e.g., those corresponding to cellular phones, are generally treated differently—if calls to such numbers are permitted at all. Traditionally, LIDB database services have been maintained by large carriers or carrier-support organizations for PSTN calling. See, e.g., Exhibit V-1 included in incorporated provisional application 1 describing LIDB services provided by Verisign, Inc. Embodiments of the present invention apply LIDB services to VOIP or other network-based packet calling services. Thus, for example, a node in an ICS provider network will advantageously include a copy of at least portions of a LIDB database, and will, as needed, seek information from another LIDB database service provider to derive service profile information for a called subscriber, typically before allowing a call to be completed. Such called party information will typically include 10-digit line number, service provider ID, equipment indicator, and billing specifications. The LIDB information will generally be used in determining whether to block calls to certain end users, whether to allow collect calls, how to validate account information and the like.

Billing verification block 367 in FIG. 3C refers to operations during call setup that relate to verifying that a call being processed is an authorized call to an authorized called party. Such verification operations as validating a calling party (inmate) login or other ID, and an associated password are typically employed prior to allowing a call attempt to be made. In addition, a list of authorized called parties for each authorized calling party is checked, as are any entries relating to prior difficulties regarding acceptance of calls (or collect calls), or other billing issues. If an attempted call is found to be directed to a called party that does not wish to accept calls, or if some other inconsistency appears, then the call may be canceled or special call treatment invoked. Examples of innovative special treatment under such circumstances will be described below. In some cases, it proves convenient to store previously acceptable billing data, e.g., collect call acceptances for identified authorized numbers, or validated credit card information used in processing prior calls. Use of such historical data, if the data are reasonably current and its use is not in conflict regulatory or contract provisions, will sometimes prove useful in considering approval of current call setup requests.

Figure 4:
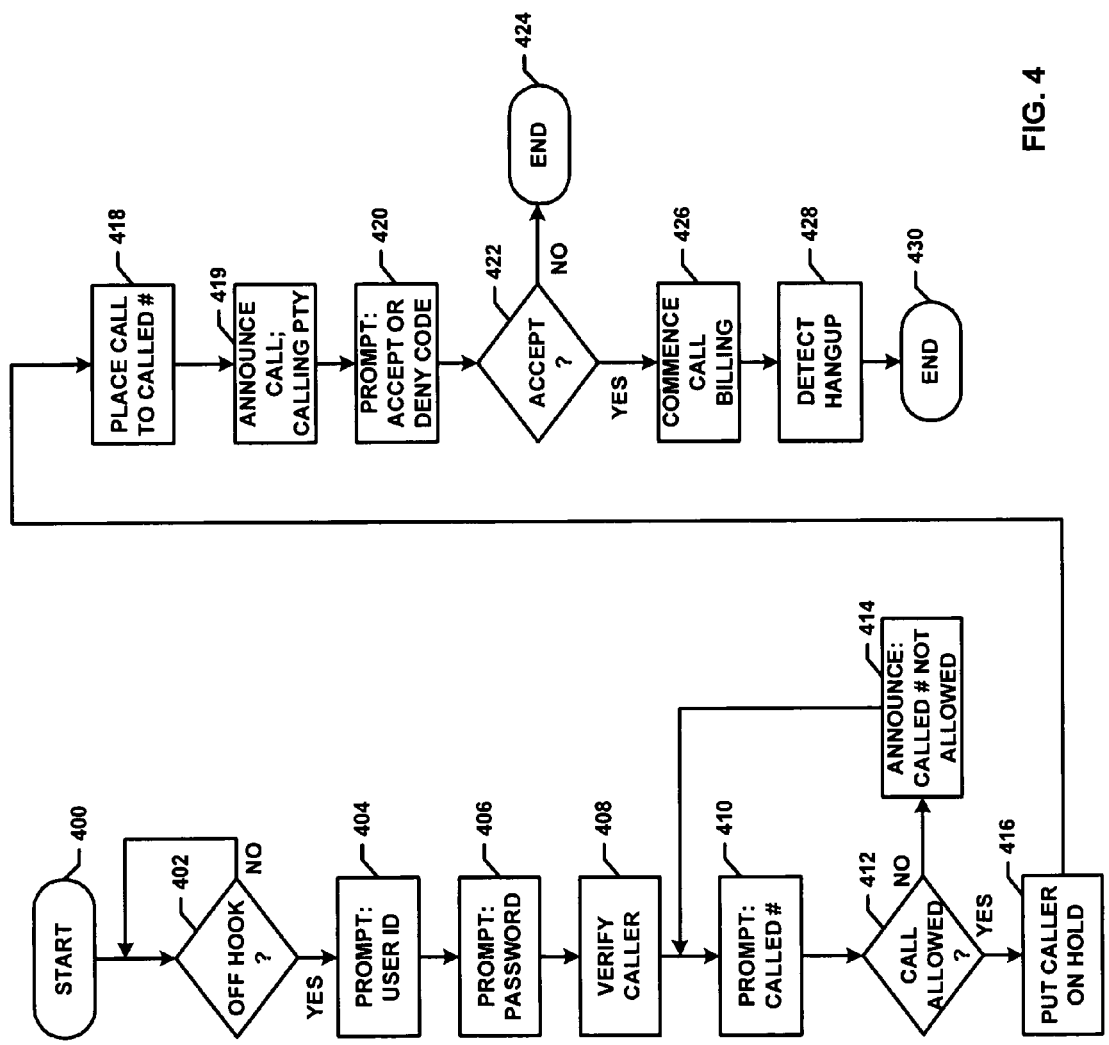
FIG. 4 is a flowchart representation of network-based call processing functions and steps performed in accordance with a class of applications advantageously executed on systems of the type shown in FIGS. 2 and 3A-3C.

FIG. 4 is a flowchart showing illustrative process flows corresponding for an attempted ICS collect call. There, issuing of voice (played-back recorded or currently synthesized) prompts by telephony switch 320 or a voice response unit (VRU) under the control of telephony switch 320 (VRU not shown), direct calling and called party to provide a sequence of responses which, if consistent with calling procedures, allow a collect call to proceed. In particular, following off-hook detection at 402, responses to user (caller) ID and password prompts at 404 and 406 are verified at 408. As described in the section relating to Caller Authentication, other particular verification techniques may be applied to authenticate callers in the various embodiments described in this application. If verified, a prompt is issued at 410 and, upon billing verification and, if appropriate, LIDB access, a call is found to be appropriate to complete (subject to acceptance of billing by the called party). If the verification process fails, a notice and further instructions (e.g., to redial or try another number, etc.) are desirably provided by announcement at 414.

When a call is found to be acceptable (again, subject to payment approval) the called party is placed on hold or otherwise disconnected (416) from a call placed to the called number (418). When the call placed at 418 is answered, an announcement (419) identifies the call as being a collect call (or other specially billed call) and (optionally) identifying the caller—as by playing a previously recorded identification speech segment generated by the calling party. A request (420) is then made to the party answering the call to accept or not accept charges for the call; if the charges are not accepted, the call is typically terminated. If charges for a call are accepted in response to the request at 420, then call billing commences and the calling party is connected to the call. Billing timing is continued until hang-up by either party is detected.

FIG. 5 shows an alternative illustrative embodiment providing interconnection of inmate calling center 500 to ICS provider data network facilities 525. In this illustrative embodiment FXS gateway functionality is provided at inmate calling center 500, with selected functional elements previously discussed in connection with FIGS. 2 and 3A-3C and shown here as part of ICS network 525, providing connections to PSTN 120 via FXO gateway 542. As noted above, ICS provider functional elements (e.g., IPTS 320 or SMDR Collection and Processing 362) may be co-located in network 525, or one or more of them—or other functional elements, such as gatekeeper 334 (not shown in FIG. 5), may be located elsewhere in network 525. Not shown expressly in FIG. 5 are other nodes in data network 500 that act as intermediate nodes for relaying or processing a call from one of the calling telephones 101-i to a party at PSTN called station 160.

Inmate calling facility 500 is shown as including an administrative terminal 110 to provide limited on-site monitoring or other administrative functions, e.g., for updating calling privileges and the like. As an alternative to, or in addition to, such on-site admin terminal at ICS calling facility 100, it will prove advantageous to include one or more network-based admin terminals at nodes in network 525. In any event, admin terminals, wherever located, are used to monitor and enter information for storage and control in network-based elements such as switches, databases and the like. Likewise, it will prove advantageous to include a network control unit, such as 370 in FIG. 3C, within network 525. Advantageously, such network control 370 will concentrate monitoring, overall control and maintenance operations at one or a few convenient locations.

Figure 6:
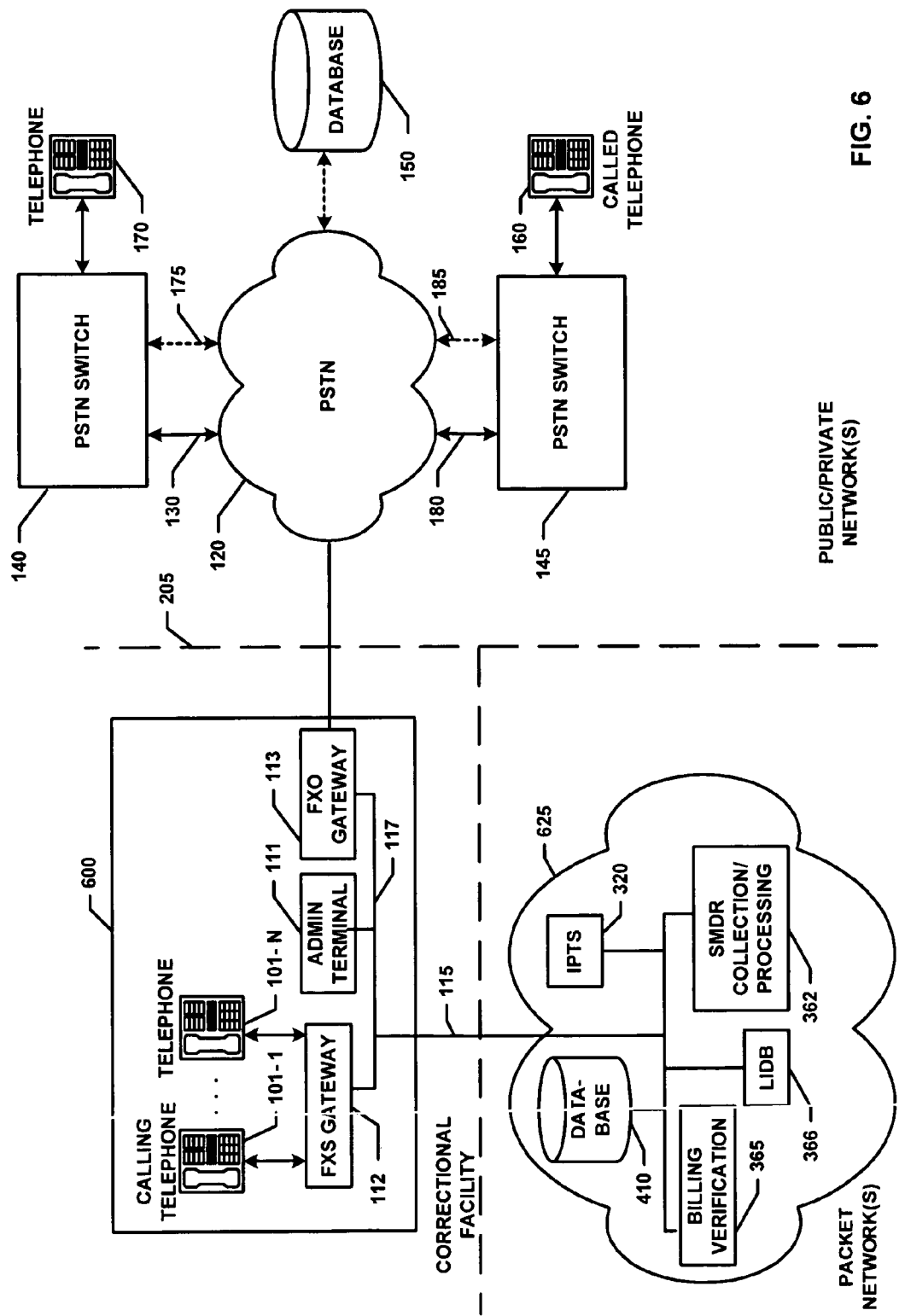
FIG. 6 shows an alternative embodiment of the present invention in which FXS and FXO functionality is resident at a correctional facility.

FIG. 6 shows another alternative embodiment of the present invention that differs from that shown in FIG. 5 in that FXO functionality appears with FXS functionality at one or more correctional institution calling facilities. This organization again emphasizes that placement of equipment units at the correctional institution can be minimized, with all call control, billing and other call processing functions located in the network 625 (part of the overall ICS network). While admin terminal 111 is shown as providing access for purposes of selective monitoring and updating as may be arranged between the correctional facility and the ICS provider, the latter is shown in FIG. 6 as providing call setup and control through access to the calling path(s) at the facility calling center. The calling center then interfaces through FXO gateway 113 to deliver call content to an illustrative PSTN destination. When PSTN involvement is not required, as, for example, when calling to an IP phone of standard design at the called location, then network portion 625 will advantageously complete delivery of the call. Billing verification, SMDR collection/processing and LIDB functionality is also shown as part of voice processing portion 625.

Indeed, the construct of separating voice processing functions from other data network functionality is meant only to focus on the particular elements of data networks that do not routinely occur in many data networks. In all cases, therefore, it should be understood that the voice processing (or VOIP processing) portions of the various example networks described herein should be understood to be part of an overall data network (or network of data networks). The data network(s) may include public and private networks or portions thereof as will be advantageous in implementing particular applications and services.

Figure 7:
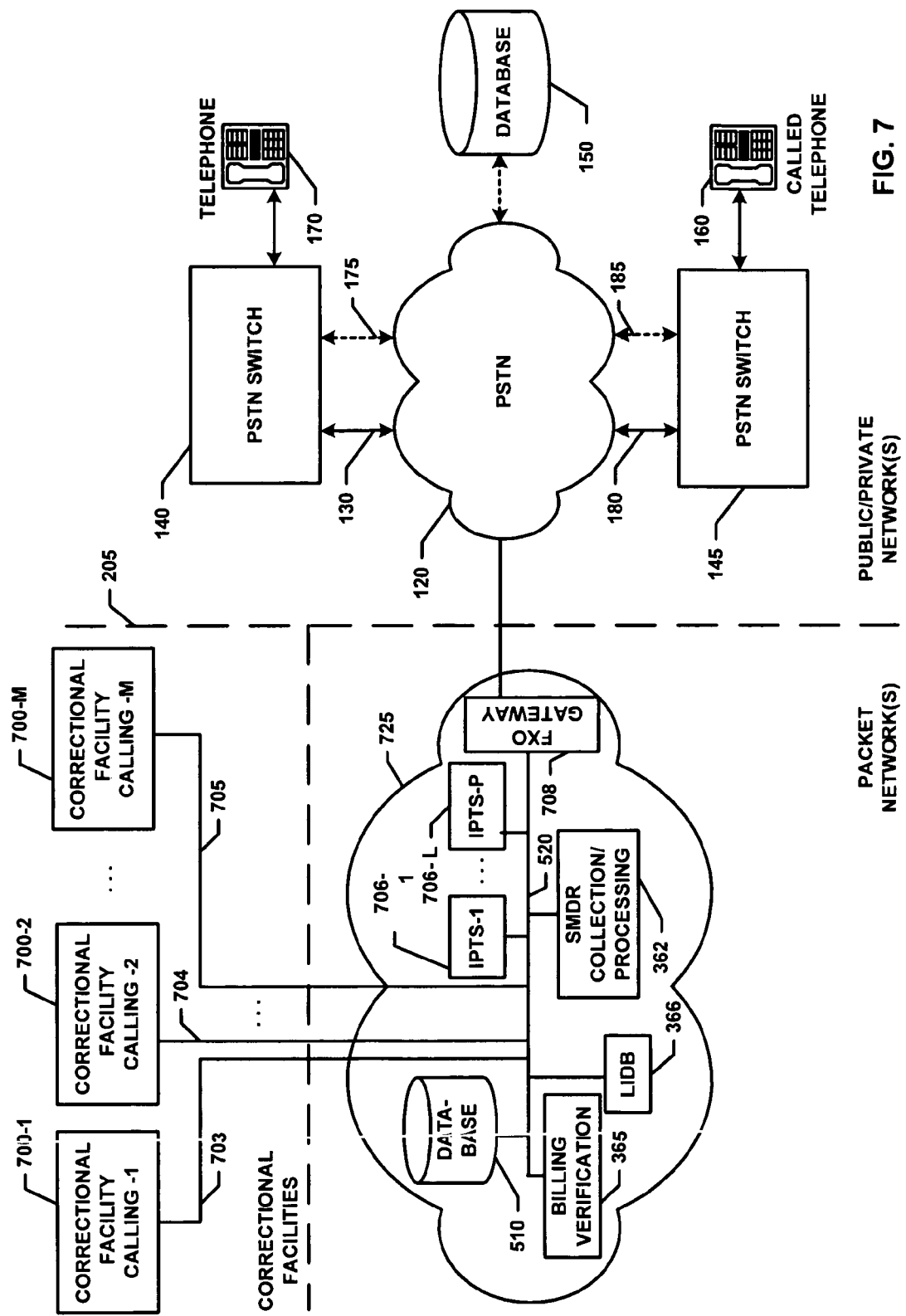
FIG. 7 shows an alternative embodiment of the present invention in which VOIP call processing is accomplished for a plurality of correctional facilities, with increased call connection facilities.

FIG. 7 shows yet another illustrative embodiment of the present invention in which a plurality (M) of correctional institution calling facilities, 700-1 through 700-M are shown interconnecting through data network 725 and FXO interface 708 to PSTN 145 to complete ICS calls to called telephones like 160 shown in FIG. 7. As further illustration of scalability of networks and network elements to meet calling demands of the several correctional institution calling facilities, network 725 is shown comprising a plurality (L) of IPTS switching units 706-1 through 706-L. Each of these switches will have available database facilities, here represented by a common database 510. It will be recognized, however, that each switch **706-*i* may desirably have an individual database, or some other association of switches with related database functionality may be appropriate. Indeed, none of the switches 706-*i*,** nor associated databases need be co-located with each other.

Not expressly shown in FIG. 7 are the interfaces for connection of the calling facilities **700-*i* to data network 725, but illustrative FXS functionality may be located at each calling facility 700-*i*, or another interface, such as a digital (e.g., T1) interface multiplexing voice and signaling data from one or more of the calling facilities 700-*i* may be employed. It is noteworthy that different correctional facilities may have widely different calling traffic demands, and so can have different interconnecting and interfacing facilities. Thus, for example, large facilities may connect to data network portion 725 via individual multiplexed T1 lines, others may employ a multi-port FXS connection to data network 725**, and smaller facilities may require only a relatively small bandwidth connection, such as may be realized with a DSL link. This differs from current practice where each correctional facility, via one or more on-site computers requires a number of lines or trunks—typically one line for each calling telephone.

Efficiencies available through use of voice-over-data network calling in network-centric contexts described in the several illustrative embodiments herein make clear the advantages of the present inventive teachings. One example: the case of a service provider working with smaller county jails; no longer does a 2-line correctional facility require the significant capital outlay implicit in using on-site control computers. Only an appropriate link to the ICS provider's network is required, as illustrated, for example, in FIG. 7.

Economies of scale using present inventive techniques can also be realized in several other areas, as by combining large numbers of PSTN connections at a central location through use of negotiable-rate T-1 or T-3 connections, rather than having tens or hundreds of individual analog lines scattered across a large area. As well, larger IPTS switches (servers), each servicing many sites can be scaled for optimal traffic capacity and balancing. Peak capacity management thus becomes much simpler and more effective when locations are combined in this manner. Using present inventive embodiments, each inmate location can have access to significantly larger headroom capacity (e.g., in terms of outbound trunks) available for peak calling times, while the total excess, or unused, capacity carried by the provider might actually be less than if each location were managed individually. This efficiency leads to an increase in call volume capacity with a corresponding decrease in operating costs.

In many cases, the calling pattern for a particular correctional facility may have a large component of local calls. It is possible using present inventive techniques to redirect PSTN calls to higher capacity multiplexed connections (e.g., T-1 or T-30) reaching destinations having a scope of local calling that includes or exceeds normal local connections available at the facility. In short, the provider may take advantage of placing low cost local calls thereby improving margins and reducing overall costs.

Similarly, through the use of strategically located PSTN connection hubs or nodes across a much wider geographic area, such as one node per LATA (or state), the provider may link these connections together via broadband Ethernet or other data transport method and route calls from one area into another for PSTN connection. This allows the provider to realize the benefit of lower cost inter-area data links, then to complete a local call in the call destination area, thereby reducing the cost of a long-distance call.

For example, if an inmate in city X wishes to place an interlata call to city Y, the provider may route this call from the inmate facility into a central office in city X (e.g., via a FXS gateway and broadband Ethernet), and then transport the call (e.g., via broadband Ethernet) to a remotely located FXO gateway to the PSTN at a location that includes city Y in its local calling plan. This call transport and delivery allows an inter-LATA call to be completed with no per-call usage charges. This and other applications of reduced-cost routing will result in substantial overall cost savings.

Figure 10:
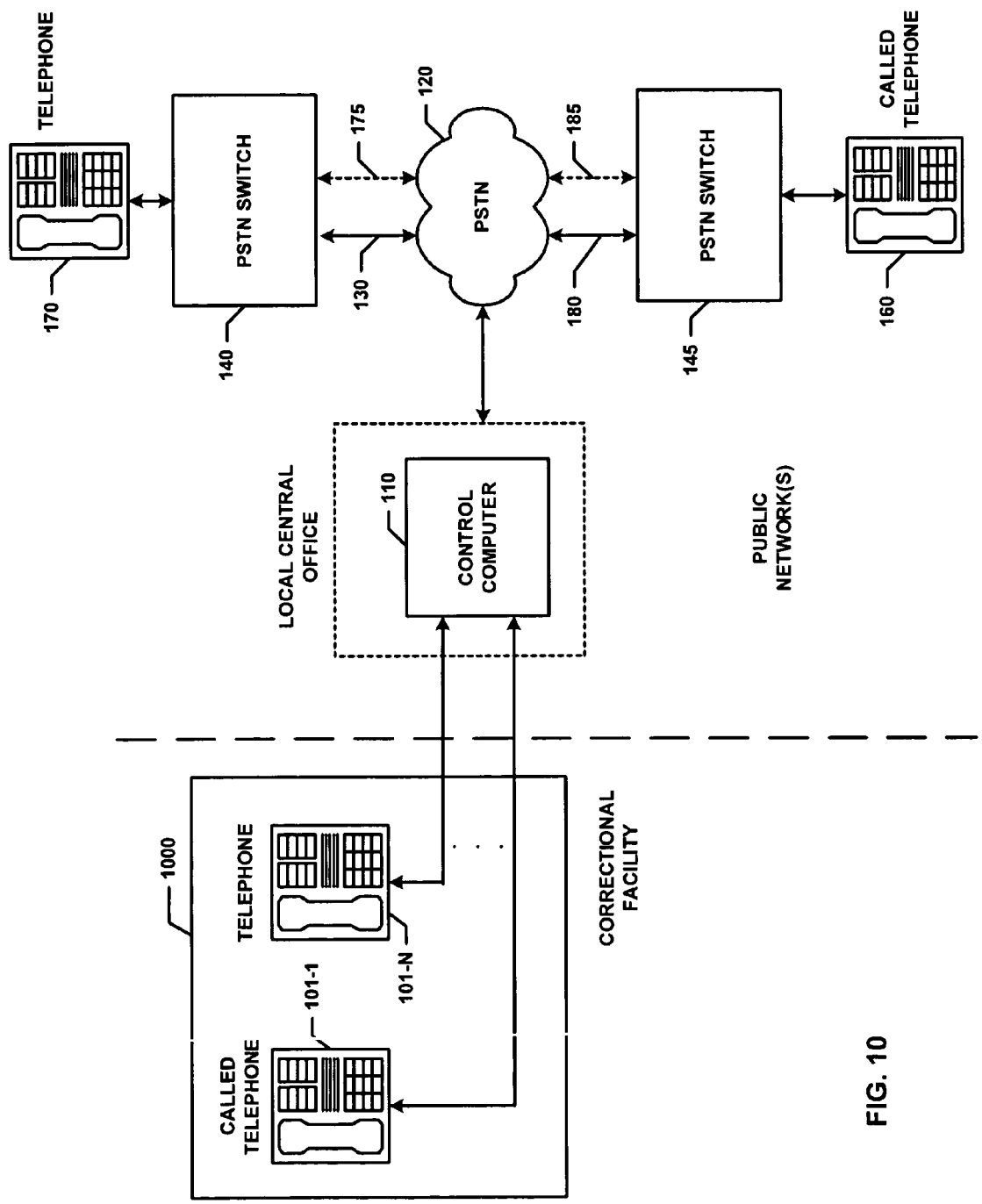
FIG. 10 shows an adaptation of the prior art system of FIG. 1 in which the control computer(s) formerly at a correctional facility site is/are removed to a local off-site location, such as a local telephone central office.

FIG. 10 shows a modification of the prior art system of FIG. 1 in which the control computer 110 for managing telephone calls at the correctional facility (in FIG. 1) is relocated to an off-site location in the vicinity of the correctional facility, e.g., a local telephone company central office, where it then connects to the rest of the PSTN. While a telephone company central office is noted, other particular secure off-site locations will be appropriate in particular cases.

The location of a computer at a location that is not on correctional facility premises, but connect to the calling center of the correctional facility, offers significant potential advantages relative to existing PSTN connections, especially when the computer acts as a remote relay to an ICS network, such as 225 and 220 in FIG. 2. Thus, for example, by having the link 116 from calling center LAN 117 shown in FIG. 5 terminate in a switch, such as a simplified IPTS 320 in FIG. 5 (or in a router or other communication device), call setup, billing and other functions included in network portion 525 can be removed to a central or regional location such as 725 in FIG. 7. Thus, in effect, an off-site computer can function in the manner of supplying inputs such as 700-i in FIG. 7. Such an arrangement is an application of principles of the present invention described above relating to functionality in a cloud (such as 525 in FIG. 5). These principles support optimal distribution of linked network resources. Thus, only an IPTS (or a simpler communicating equivalent) is needed at an off-site location for communication with efficiently distributed call setup, billing, call transport and other ICS network resources shown in other embodiments of the present invention.

Enhanced Validation

Figure 11:
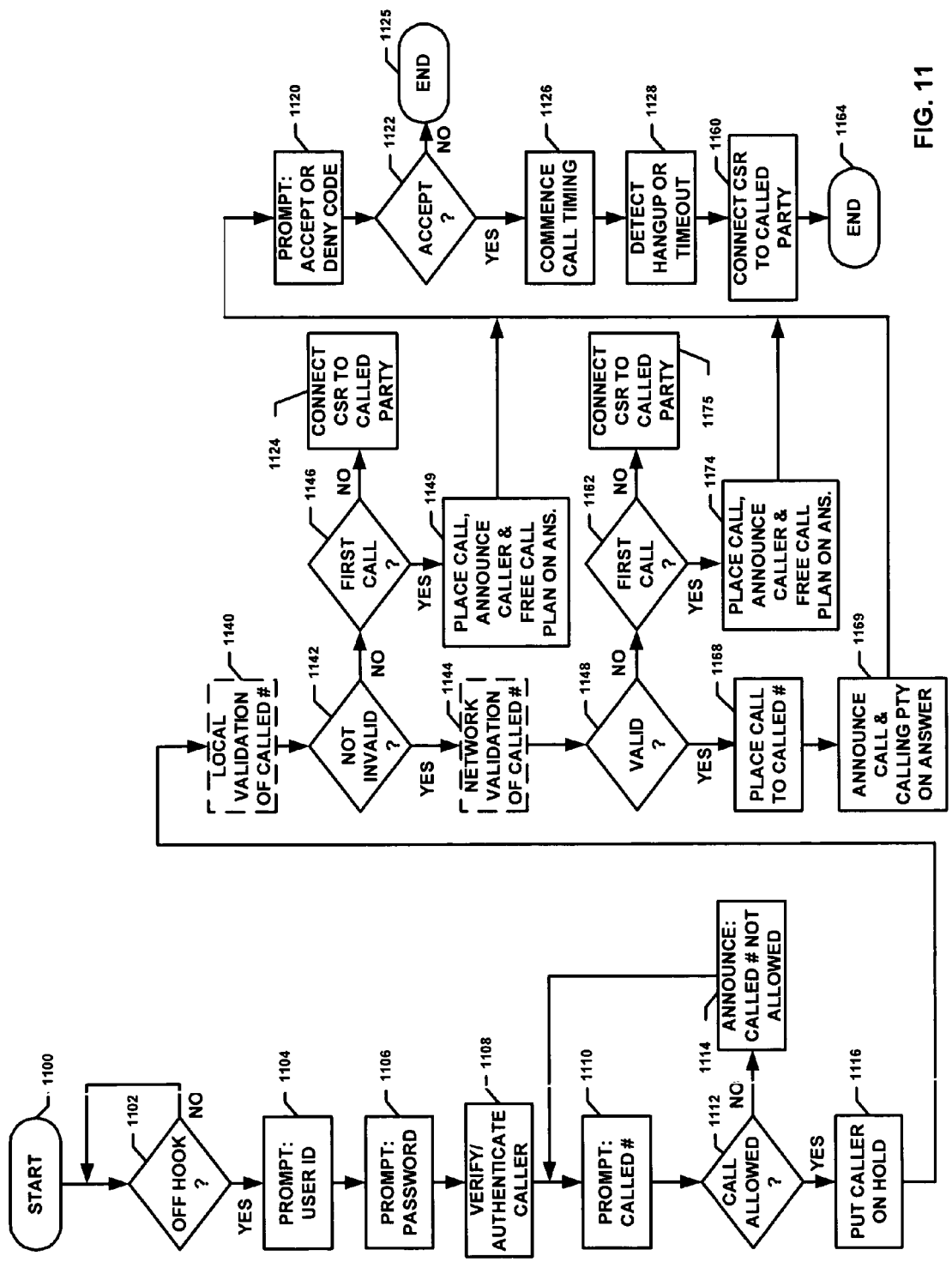
FIG. 11 is a flowchart illustrating a billed number validation process, including an advantageous free first call feature, performed at billing verification server(s) such as 365 in FIG. 7 in cooperation with IPTS and other functional units at one or more network nodes such as 720 in FIG. 7.

FIG. 11 is a flowchart illustrating a billed number validation process, including an optional free call feature, performed at a billing verification server, such as 365 in FIG. 7 in cooperation with one of IPTS 706-i, such as IPTS 706-1, and other functional units at one or more network nodes such as 725 in FIG. 7. It will be recognized that facilities for performing the functions shown in FIG. 11 need not all be located at a common node, such as 725 in FIG. 7. In particular, it will be recognized that the VoIP network systems and processing described herein may advantageously be performed at a number of separated network locations. For example, the announcement functions referred to in FIG. 11 and elsewhere in this description may advantageously be realized using an IPTS computer appropriately programmed to include the functionality of one or more announcement servers, which servers may be located at locations serving the overall efficiency of the ICS network and parties connected to that network.

Turning then to FIG. 11, call processing starts at 1100 with the detection of an off-hook condition for a particular calling station when the response at decision block 1102 is YES. As with the process described in connection with FIG. 7, a number of preliminary steps are desirably performed before a call actually gets underway—here at steps 1104, 1106, 1108- to authenticate the calling party. When a desired called party number is entered in response to the prompt at 1110 and found to not be on a list of disallowed numbers, the calling party is placed in an on-hold condition—not connected to any called party destination—but available to receive inputs from the system. If the called number is found to not be allowed a prompt is given at 1114 to the caller and a prompt for another number is provided to the calling party.

While the calling party is on hold, the system advantageously conducts a billed party (typically the called party) validation sub-process beginning at optional step 1140. In FIG. 11, optional steps include those represented by broken-line boxes or other broken-line objects. Step 1140 is indicated as optional because not every (or any) local validation may be performed in placing ICS calls. It may prove advantageous in some circumstances, however, for an ICS provider to maintain a local database of information about some lines, as, for example, regarding past credit history in dealing with the ICS provider—or any of a large variety of data that might affect the likelihood that a call sought to be billed to that line will be paid for. Many lines may have little or no information in the local validation database. Such a local database may be included in database 510 shown in FIG. 7 or may be elsewhere in the network of FIG. 7, but accessible as required. Such a local database may be private to a particular ICS provider, or may be accessible by other providers, including non-ICS service providers.

Generally, a local validation database used in performing step 1140 in FIG. 11 is a so-called negative database because it provides information that can potentially be interpreted as disqualifying a line from having an ICS (or other) call billed to it. It is advantageous, however, to allow a service provider to interpret data retrieved from any validation database in a manner determined by the provider under the circumstances. Thus, data retrieved by one provider may be deemed sufficient to refuse to complete a call, while another provider may make a different decision based on the same data.

In the case of the validation sub-process of FIG. 11, a test is made at step 1142 to determine if the proposed billed number is not valid (the aforementioned negative database information), i.e., whether sufficient issues are raised that payment for billing can not be reasonably assured. If the answer is YES at step 1142, corresponding to a determination that the local database information for the proposed billed line does not indicate a likelihood that that billed charges will be not be paid, then the process illustratively continues to the network validation of the called number at step 1144. However, it should be noted that step 1144 is also indicated as optional. This optional characteristic may include an option as to when, if ever, such a network validation (previously referred to collectively as a LIDB database dip) might occur. More will be said about this below.

Returning to step 1142, and in particular the branching resulting from a NO determination at that step, it will be seen that a follow-on determination referred to as a first call determination is made at step 1146. For purposes of this description, first call may relate to a number of possible circumstances. Generally, though, it is descriptive of a case where a particular calling party is seeking to call a particular called party for the first time while seeking to have the called party pay for the call. First call may, be deemed by an ICS provider to include the first time these circumstances have arisen for a pre-determined period of time, or the first time they may have arisen since the occurrence of a particular event—such as a prior release of the calling party from incarceration or other such conditions. Further, the reason that a test at step 1142 might yield a NO response is that the called party may have moved or otherwise caused a change in his/her line number or service provider in the recent past—so that data in the local database may be in transition. These and other conditions can be deemed by an ICS provider to give rise to a first call determination, but, absent easily recognizable or defined exceptions, a first call will include exactly one call to a particular called party identified with a particular called number. The feature may be allowed to extend to more than one called party, but, consistent with the goals of the present inventive feature, limits may be placed on the number of first calls at the discretion of the ICS provider.

As will be noted in FIG. 11, a YES determination at step 1146 (the call is a first call) results in the placement of the call to the called party number. But prior to allowing the conversation to begin between the calling and called parties, an announcement is made to at least the called party (but advantageously to both calling and called parties) to the following effect:

This is a collect call placed by (Name of Calling Party) placed at (Correctional Facility). Issues have arisen regarding the payment for this call, so the service provider has decided to allow this call to proceed for (minutes, N being determined by the ICS provider) free of charge to either party to the call. I repeat this is a free call. Nevertheless, a representative of (the ICS provider) will contact the called party at the end of the (N minute) call to arrange for payment of future calls. No free calls can be expected in the future.

Call processing continues at step 1120 and 1122 to allow the called party to refuse the call, notwithstanding its no-charge character. If the call is accepted, then call timing is commenced at step 1126, otherwise the call is terminated as shown at step 1125. If the call is completed by a hang-up, or if the allotted free period of N minutes expires, the call is over and a connection is made at step 1160 between the called party and a representative (e.g., a customer service representative, CSR) of the ICS provider. When that discussion is complete the process ends at step 1164.

For purposes of the present invention, the first call feature seeks, among other things, to avoid discouraging necessary or appropriate calls from inmates, provides an opportunity for an inmate to advise others as to his/her changed circumstances as an inmate and otherwise promote the well being of the inmate caller while avoiding abuse of ICS calling facilities. Thus, if a called number is found to be not not-invalid (i.e., it is found to be invalid) at step 1142, and it is found at step 1146 not to be a first call (as defined for the particular circumstances recognized by the ICS provider), then the call will be ended as shown at step 1124. In appropriate cases, a NO decision at step 1146 can cause a redirection of caller action by an announcement such as that provided at step 1114, or by the action of connecting to a Customer Service Representative (CSR) of the ICS provider under particular circumstances determined by the ICS provider.

If the test at step 1142 indicates that the local validation process at 1140 produced a YES determination at step 1142, then the optional network validation of the called number (LIDB dip) may be performed. As with the local validation at step 1140 and the determination at 1142, a YES-NO decision results at decision block step 1148. There, a NO decision indicates that sufficient issues about the likelihood that the called line number will result in payment of the charges for the call that, in the judgment of the ICS provider, the call would normally be refused. In accordance with this feature of the invention, however, a first call test is made at step 1162 and if a YES determination is made there, the processing is continued at step 1174 or step 1175 to a completion at step 1175 or 1164, respectively.

If the called number is found to be not invalid upon a local validation (YES at step 1142) and valid upon a network validation (YES at step 1148), then the call is placed at step 1168 and an announcement about the nature of the call (collect call) and the calling party at step 1169. No first call determination is needed or appropriate in this case. Call processing is completed by way of steps 1120-1126 (only hang-up is relevant at step 1126 for this case) and step 1160 is not needed.

As noted above, either or both of the local validation 1140 or network validation 1144 is optional—with regard to the time of their occurrence or whether they occur at all.

Thus, if a free first call is to be granted, there is no need to determine if the call is likely to be paid for. Instead, the granting of a free first call may engender sufficient good will as to tend to encourage a party not presently inclined to accept charges to reconsider. In particular, if BNS would otherwise cause a call to be blocked, it might encourage a called party to make an exception for ICS calls, or at least to consider such calls subject to non-acceptance, e.g., as provided by the prompt and response at steps 1120 and 1122 in FIG. 11.

Further, when validation, especially network validation, is to be performed, the present invention provides enhanced cost control commensurate with the risk an ICS provider is willing to assume under particular circumstances. Thus, either or both (or neither) the indicated local and network validations steps can be accomplished before a call is placed, while ringing is occurring, when the call is answered by a person, when the call is answered by other than a person (e.g., by a computer, fax machine, answering machine, etc.), when answered by a person who responds within a prescribed period after call pick-up (or end of ringback), during a prompt (such as that indicated at step 1169 or 1120), at a time after acceptance (YES at step 1122) but before hang-up, after hang-up, or never. It will be appreciated that the discussion of validation (either local or network) need not be limited to a particular negative database or to the well-known LIDB database, but to the use any source of validation data. Decision criteria employed by an ICS carrier will advantageously be subject to change, and may depend in any aspect, based on information in local validation step 1140 or on any particular information available to the ICS carrier about either the caller or the called party (or the proposed billed party if that is different from the called party).

Figure 12:
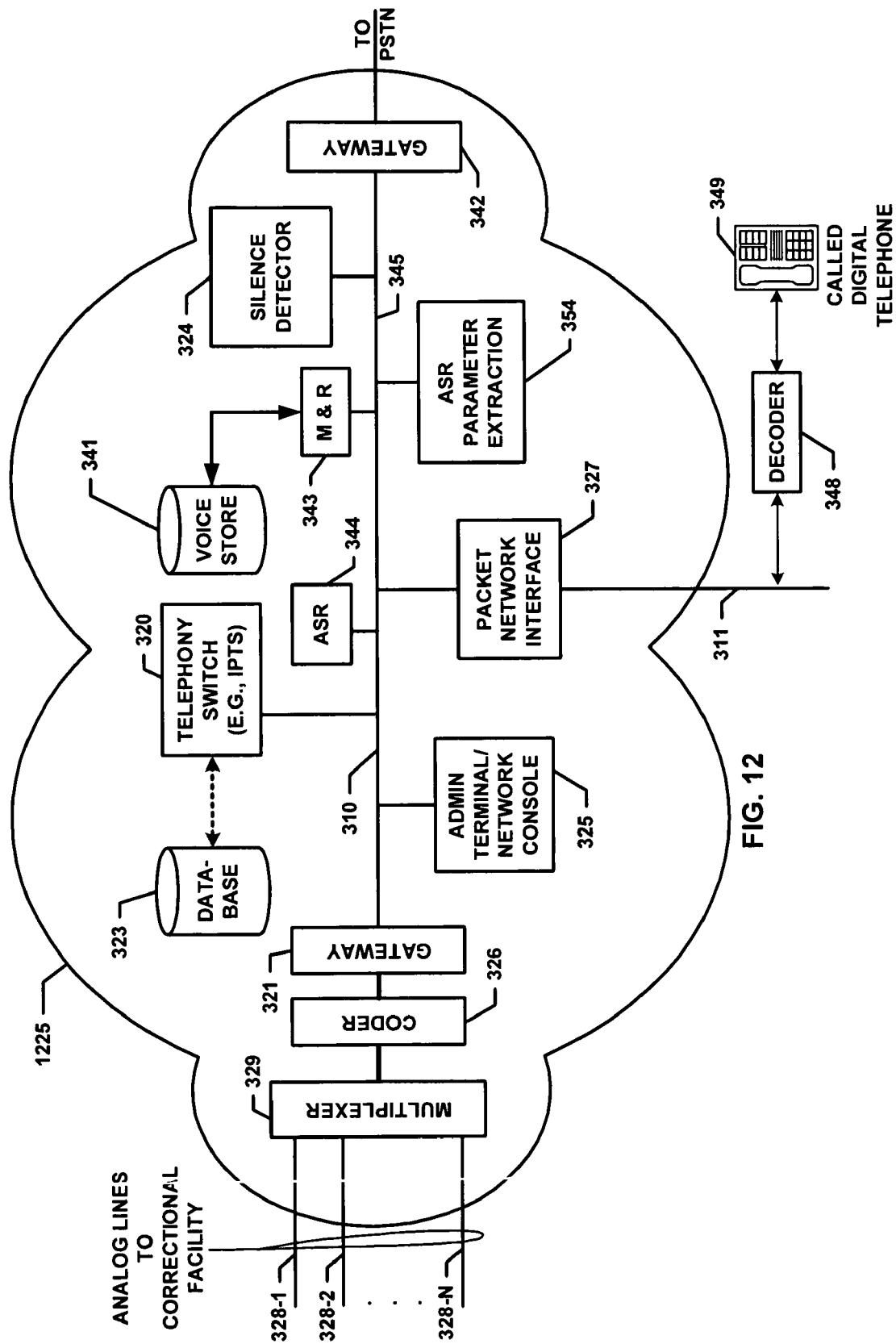
FIG. 12 is an adaptation of FIGS. 3A-C showing analog lines from a correctional facility extending to an off-premises location, such as an existing LEC central office, with speech codecs located in the off-premises location.

FIG. 12, in part, illustrates an extension of the arrangements shown in the inventive embodiment of FIG. 10. In FIG. 12, the network cloud includes much of the functionality of FIGS. 3A-3C, but also includes an analog interface to a correctional facility. Thus, lines 328-1 through 328-N in FIG. 12 are shown as analog lines directly connected to a correctional facility calling center, such as 200 in FIG. 2 where FXS functionality has not been applied to the analog voice and supervision signals from telephones such as 201-i. (As noted above, considerable flexibility is available in presenting call signals—in analog or digital form—from the facility call center.) These incoming analog lines are shown in FIG. 12 being concentrated in multiplexer 329 and coded, e.g., to PCM or other suitable form in coder 326 before being presented to gateway 321, where they will normally be packetized as described above in connection with FIG. 2 or FIGS. 3A-C.

Once processed through gateway 321 the voice signals are in substantially the same form as when processed a telephone-data network interface 210 having included FXS and packetizing functionality. In particular, these speech (and related signaling) signals are presented in Ethernet or other packet form for possible subsequent further formatting in IP packet format for transmission over the Internet or other IP network. While in packet form in network arrangement 1225 in FIG. 12, which arrangement may be distributed over a plurality of networked nodes, IPTS 320 will advantageously direct voice packets for delivery through packet network(s) via illustrative packet interface 311 under the control of signaling information associated with voice packet sequences and with information stored in database 323. Packets provided at interface 311 may be decoded, e.g., by decoder 348 for delivery to a destination digital phone 349. Gateway 343 in FIG. 12 provides the interface to the PSTN as in FIG. 3C. Other aspects of the arrangement of FIG. 12 will be described below.

Figure 8:
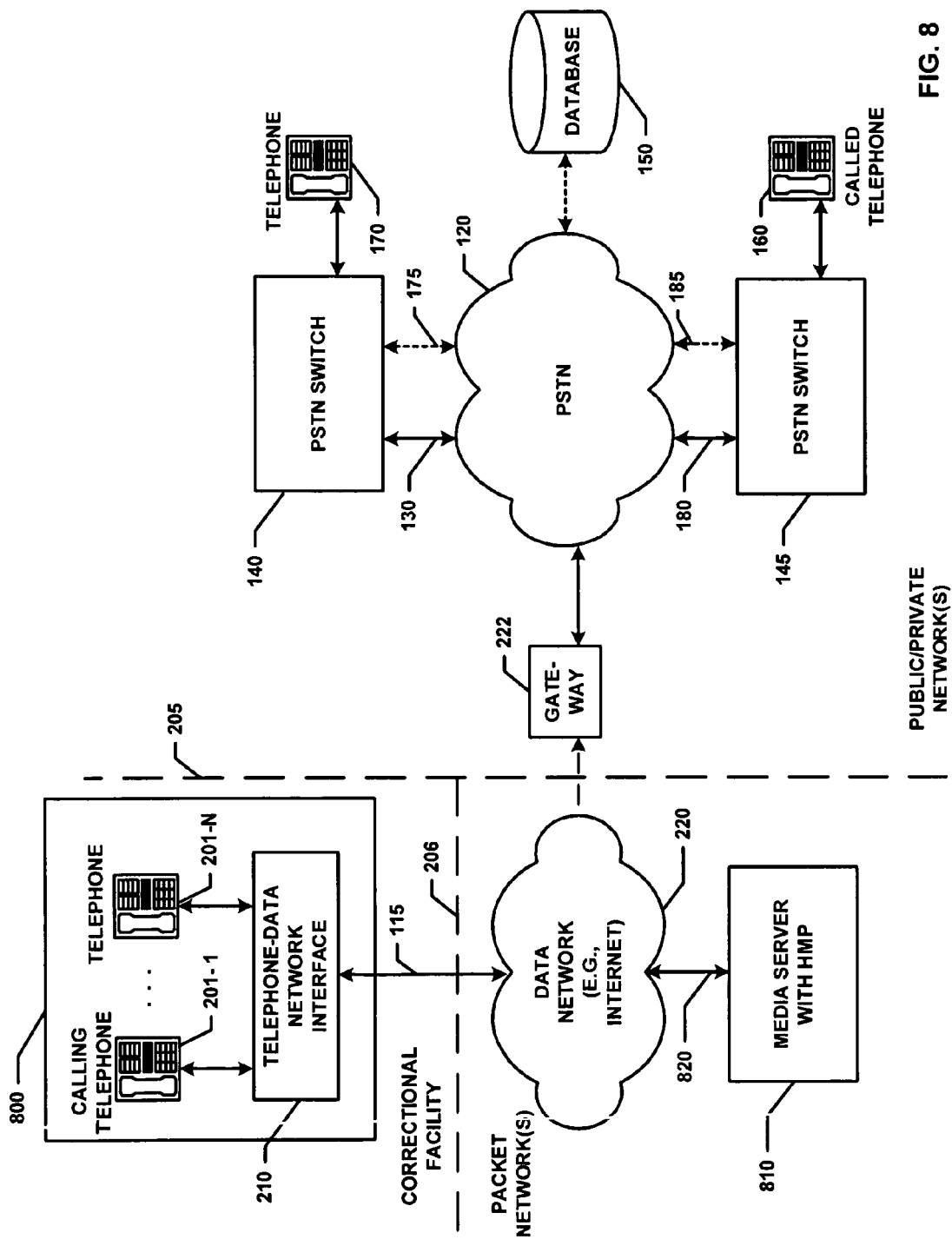
FIG. 8 shows an adaptation of the system of FIG. 2 with VoIP processing functionality of FIG. 2 being illustratively accomplished using Media Server software with HMP.

An illustrative embodiment of the present invention will now be described with initial reference to FIG. 8. The illustrative embodiment shown there is based on Intel's Host Media Processing (HMP) software. In one aspect, HMP seeks to provide software-only processing of voice and signaling information using general purpose computing platforms. In FIG. 8, an HMP-based platform is shown as media server 810 interfaced with the Internet or other data network of the types described above in illustrative embodiments of the present invention. This HMP-based platform, in addition to the Intel HMP software is an Intel processor computer running Microsoft Windows®. More complete equipment and environment software requirements are provided in literature that is generally available from the vendor.

Thus, for example, for an overall view of, and a full range of user information available from Intel for the HMP platform, see:

Intel® Netstructure™ Host Media Processing Software Release 1.1 for the Windows® Operating System included as Exhibit I-3 in incorporated provisional application 1;

Intel white paper: "Next-Generation Media Processing for the Modular Network, included as Exhibit I-4 in incorporated provisional application 1.

Also of interest for implementations of HMP:

Intel's "Host Media Processing for Windows Operating Systems Reference Design Guide," included as Exhibit I-5 in incorporated provisional application 1;

"Intel NetStructure Host Media Processing Software Release 1.1 for Windows Technical Specifications," included as Exhibit I-6 in incorporated provisional application 1.

"Intel NetStructure Host Media Processing Software Release 1.1 Feature Pack 1 for Windows Release Notes," included as Exhibit I-7 in incorporated provisional application 1;

"Intel NetStructure Host Media Processing Software Release 1.1 Feature Pack 1 for Windows—Installation Guide," included as Exhibit I-8 in incorporated provisional application 1;

"Intel SNMP Agent Software for Intel NetStructure Host Media Processing Software for Windows—Administration Guide (September, 2003) included as Exhibit I-9 in incorporated provisional application 1;

"Intel Global Call API for Linux and Windows Operating Systems—Library Reference (September 2003);

"Intel Global Call API for Windows Operating Systems—Programming Guide" (September 2003);

"Intel Global Call IP for Host Media Processing—Technology Guide" (September 2003);

"Intel IP Media Library API for Host Media Processing—Library Reference" (April 2004);

"Intel IP Media Library API for Host Media Processing—Programming Guide," (April 2004);

"Voice Software Reference: Features Guide for Windows,";

"Voice Software Reference: Programmer's Guide for Windows,";

Voice Software Reference: Standard Runtime Library for Windows,"; and

"DM3 Diagnostic Utilities—Reference Guide,".

Each of these HMP cited references, and all Exhibits included in incorporated provisional application 1 are hereby incorporated in this application by reference, and by virtue of being exhibits in, and forming part of, incorporated provisional application 1.

Figure 9:
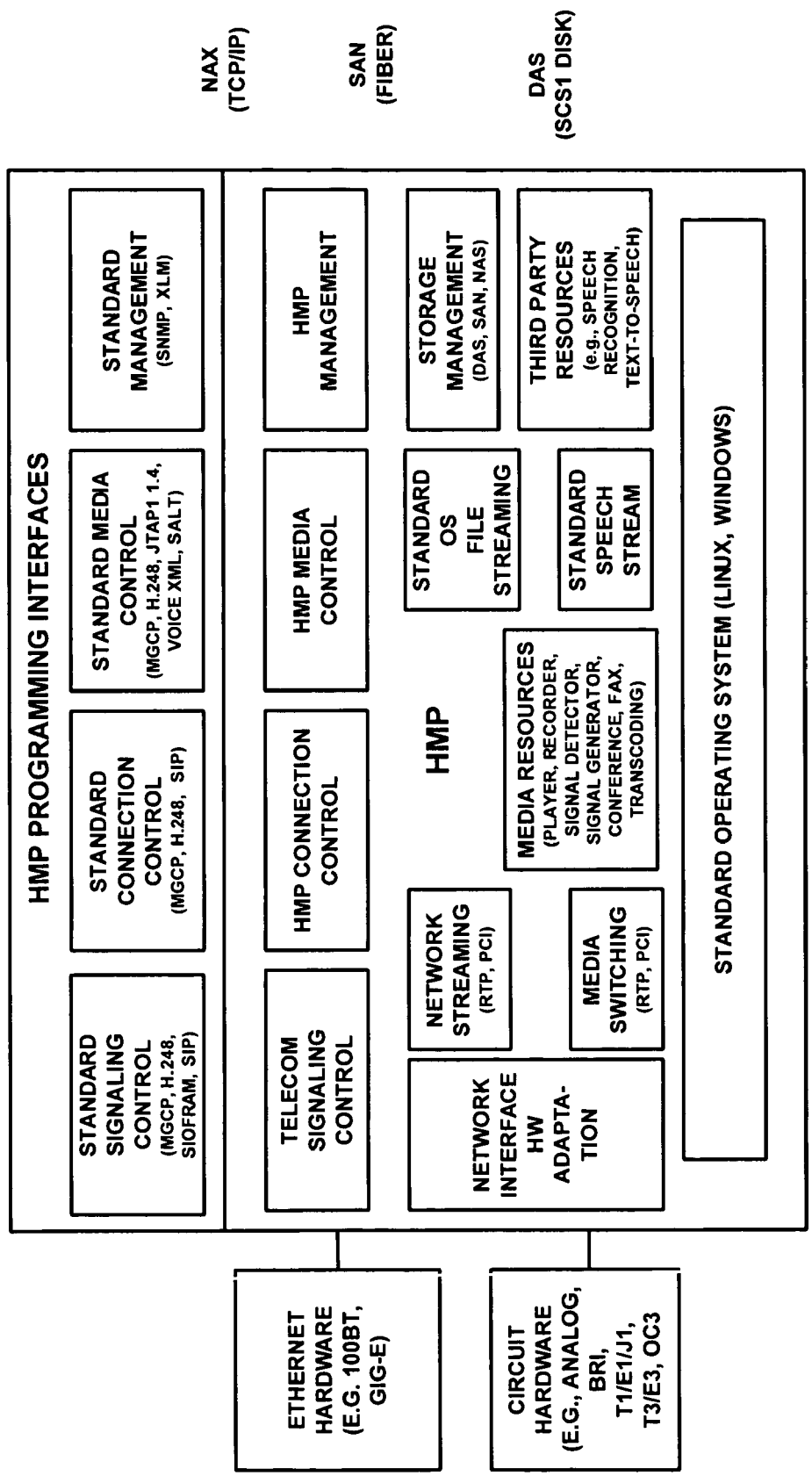
FIG. 9 is a representation of illustrative software for executing on media server 810 in FIG. 8 to achieve the connection, control and other functions described above with reference to FIGS. 2-7.

FIG. 9 is a representation of HMP software programming interfaces, collectively shown as 900 in FIG. 9, which is based on FIG. 3 of Exhibit I-4 included in incorporated provisional application 1. Such programming interfaces and underlying associated resources execute on media server 810 in FIG. 8 while interfacing with applications software to achieve the connection, control and other functions described in the present application. FIGS. 2-7 and FIGS. 10-18 show functionality that implement functions that are implemented using such HMP software in cooperation with applications software. In particular, the switching functions of IPTS 320 in FIGS. 3A-C, and other figures, are advantageously performed by HMP software in media server 810.

As is reflected in the several Intel HMP Exhibits included in incorporated provisional application 1, and in Alliance Systems Exhibits included in incorporated provisional application 1, speech-enabled media server applications—including VOIP—are achieved, e.g., in the illustrative HMP Starter Kit implementation described below. Further, to adapt existing VOIP and related speech applications to perform ICS functionality in accordance with the present invention, it proves advantageous to employ the several programming tools that are made available for use with the HMP software, which programming tools are described in the above-cited Intel documents, including those appearing as Exhibits included in incorporated provisional application 1 forming part of this application.

In one realization of the system of FIGS. 8 and 9, a predefined "HMP Starter Kit" designed and validated by Alliance Systems Ltd. provides for media server and gateway functionality corresponding to media server 810 in FIG. 8 and IP media gateway functionality for connecting correctional facility calling center 200 to data network 220, via a link 820 to media server 810. See Exhibit AC-6 included in incorporated provisional application 1. Media server 810 in the Alliance configurations may assume the form of any of the Alliance server options: V-1000 (single Intel Pentium 4 at 2.4 GHz), I-1000R2 (Single Intel Xeon at 2.8 GHz with Hyper-Threading), or I-2000R3 (Dual Intel Xeon at 2.8 GHz). Intel's HMP Software is, however, designed to operate on a wide range of standard hardware/software platforms as described, for example, in Exhibit I-7 (at pp. 15-17) included in incorporated provisional application 1.

Gateway functionality in the Alliance Systems HMP Starter Kit for use in the network arrangement of FIG. 8 between analog telephones at correctional facility calling location 200 and data network 220 (including media server 810) may include any of AudioCodes MP-102, MP-104, MP-108, and MP-124. FXO functionality between data network 220 and PSTN, represented as gateway 222 in FIG. 8, will advantageously be implemented as AudioCodes MP-104 or MP-108 gateways to accommodate loop-start PSTN lines. In other particular configurations different gateways may be used.

As will become clear in the following descriptions, it is advantageous in realizing additional features and functions related to ICS that certain additional software, such as word-spotting speech recognition software and speaker verification software be integrated with systems such as that shown in FIGS. 8 and 9. In the sequel, examples of commercially available software suitable for integration with the call control, existing caller authentication functionality, billing and other component functions used in processing ICS calls will be described.

As one example, a flow call model that is readily coded using the programming tools noted above for execution on the media server 810 in FIG. 8 is provided in the following illustrative Call Flow for an ICS calling context.

Illustrative Call Flow

Caller takes station off hook. IPTS receives signal from inbound (FXS) IP gateway identifying which station is off hook and begins call processing.

Call detail record is created in local database to store call information for later retrieval.

Audio recording file of call is created on local hard drive for investigative and/or diagnostic use.

IPTS checks for available outbound trunk
    Outbound (FXO) IP gateway is polled to determine if available port exists
        If available port exists, IPTS reserves it (makes unavailable to other calls)
        If no trunk available, "fast busy" is played back to caller, call is aborted.
IPTS prompts for language choice & stores selection in memory
    All subsequent prompts (to both calling and called parties) are played back in selected language
IPTS prompts for PIN # and verifies caller using voice biometrics (e.g., speaker verification software such as VoiceCheck™ software by VoiceVantage, Inc. —see www.voicevantage.com
IPTS prompts for call type choice (debit/collect) & stores selection
If Collect Call is chosen:
    IPTS prompts for phone number to call, stores selection
    IPTS performs verification of number to call
        Number formatted correctly (valid NpaNxx+Line)
            If incorrect format, play message indicating so & re-prompt for number (1 retry, then terminate call if fail on $2^{nd}$ attempt)
        Continental U.S. only for collect calls (in some cases)
            If not continental U.S., play message indicating collect calls can only be completed to U.S. numbers
        Number checked (via IP data communication with central office) against intra-company database of numbers to be blocked due to customer requests or for billing reasons (no billing agreement with LEC, number unable to accept collect calls, delinquent account or prior bad debt losses, etc.); this number check will typically include a LIDB dip
            If number is denied, play message to caller indicating reason
            If reason is due to no billing agreement or unable to accept collect calls, offer caller option of switching to debit billing. If debit billing is chosen, resume call steps in debit process
            If debit billing is not chosen, IPTS may contact customer to inform that caller "x" is attempting to contact them via collect call & offer to transfer via VOIP to a service provider CSR to set up an alternative collect call billing account; IPTS may also be configured to continue processing and offer called party a one-time-only abbreviated call at no charge, after which the called party will be connected to CSR to establish billing account for future calls—a so-called First Call feature.
        Number is checked against local database of "hot" numbers for which inmate facility has requested notification upon calling
            If number is in database, perform one of the following:
            Notify via pager
            Notify via email
            Email optionally includes URL link to mp3-formatted recording of conversation. Clicking link will begin playback of recording. Email will be sent upon completion of call.
            Email optionally includes file attachment of mp3-formatted recording of conversation. Email will be sent upon completion of call.
            Connect to a pre-determined monitoring station (could be via PSTN or could be via IP network to SIP client) for the purpose of allowing an investigator to silently monitor an ongoing conversation or, alternatively, to interrupt and/or terminate the call
        Number is checked against local database of "privileged" numbers for which recording is not permitted (attorneys, etc.)
            If number is in database, recording of call is terminated and word spotting processes are prevented from activating.
        Number is checked against local database of free numbers (bail bondsmen, public defenders, etc.)
            If number is in database, collect call billing is not performed and status is stored to memory in order to omit "collect" message from prompts upon answering of call
    IPTS takes instructs IP gateway to take trunk off-hook and dials number to be called via 1+, 101xxx, or other direct-dial method
    If called party answers, IPTS plays announcement and prompts for acceptance of collect (if free call status has not been set). Also offers choice to press distinct digits for rate quote, number-blocking, and transfer via VOIP to a service provider CSR. If abbreviated, introductory call due to lack of billing means is being offered, announcement is played to alert called party to that effect.
        If no answer, busy, or answering machine is detected, call is terminated
        If called party selects rate quote option, rate quote is given for this call, as well as for alternate charges for day/evening/night rates, then customer is re-prompted for acceptance of call, etc.
        If called party selects number-blocking option, number is added to intra-company database of customer-requested blocked numbers, message is played to calling party indicating the call was not accepted, and the call is terminated
    Upon acceptance of charges, station port is bridged to trunk port to complete call. If applicable, keyword spotting techniques may be initiated to detect the presence of certain words or phrases spoken in the conversation.
    Once call is bridged, call timer is started.
        Call is terminated, and station & trunk IP gateway ports are reset once call timer reaches (variable) maximum duration, or either party hangs up.
            Optional email sent for calls to hot number list (detailed above)
If Debit Call is chosen:
    IPTS prompts for phone number to call, stores selection
    IPTS performs verification of number to call
        Number formatted correctly (international calls are valid for debit)
            If incorrect format, play message indicating so & re-prompt for number (1 retry, then terminate call if fail on $2^{nd}$ attempt)
        Number checked (via IP data communication with central office) against intra-company database of numbers to be blocked due to customer requests
            If number is denied, play message to caller indicating reason
        Number is checked against local database of "hot" numbers for which inmate facility has requested notification upon calling If number is in database, perform one of the following:
  Notify via pager
  Notify via email
    Email optionally includes URL link to mp3-formatted recording of conversation. Clicking link will begin playback of recording. Email will be sent upon completion of call.
    Email optionally includes file attachment of mp3-formatted recording of conversation. Email will be sent upon completion of call.
  Connect to a pre-determined monitoring station (could be PSTN or could be via IP network to SIP client) for the purpose of allowing an investigator to silently monitor an ongoing conversation or, alternatively, to interrupt and/or terminate the call.
Caller is prompted for PIN # identifying debit account to be charged
  PIN # is authenticated against local database and balance information is retrieved
  Balance remaining on debit account is played back to caller
Number is checked against local database of "privileged" numbers for which recording is not permitted (attorneys, etc.)
  If number is in database, recording of call is terminated and word spotting processes are prevented from activating
Number is checked against local database of free numbers (bail bondsmen, public defenders, etc.)
  If number is in database, debit billing is not performed and status is stored to memory in order to omit "collect" message from prompts upon answering of call
  Caller is informed that this is a free call
IPTS takes trunk off-hook and dials number to be called via 1+, 101xxx, 011, or other direct-dial method
If called party answers, IPTS plays announcement and prompts for acceptance of call (message indicates that this is a prepaid call and charges do not apply to the called party). Also offers choice to press distinct digits for number-blocking or transfer via VOIP to a service provider CSR.
If no answer, busy, or answering machine is detected, call is terminated
If called party selects number-blocking option, number is added to intra-company database of customer-requested blocked numbers, message is played to calling party indicating the call was not accepted, and the call is terminated
Upon acceptance of the call, station port is bridged to trunk port to complete call. If applicable, keyword spotting techniques may be initiated to detect the presence of certain words or phrases spoken in the conversation.
Once call is bridged, call timer is started.
  Call is terminated, and station & trunk IP gateway ports are reset once call timer reaches (variable) maximum duration, or either party hangs up.
Optional email sent for calls to hot number list (detailed above)

Automatic Speech Recognition (ASR), Including Word Spotting

As noted above, emphasis in prior monitoring and recording operations in ICS has been maintained as an on-site function at the correctional facility. When speech recognition is used to identify particular spoken words or phrases in inmate calls, the recognition, and any searches based on such recognition has likewise been maintained at the correctional facility at which the speech was communicated to or from an inmate. Because of limited power and flexibility of control computers typically involved in providing ICS at correctional facilities speech recognition functions, including word spotting operations, has been limited.

Speech recognition functionality deployed in such prior correctional facility locations has typically been based on digitized speech generated and stored in real time as the inmate conversation is taking place. While some compression of speech may be used for some purposes, uncompressed digitized speech (and speech parameters derived from such speech) is typically used for ASR operations. In particular, various speech compression techniques, well known in VoIP, cellular and other voice communications applications have not heretofore been applied to speech recognition in these prior analog PSTN ICS network contexts.

FIG. 12 presents a voice processing arrangement 1225 for performing the joint function of telephone-data network interface 210 and various VoIP processing functions represented as 225 in FIG. 2 and in various alternative arrangements in FIGS. 3A-C. Analog line interfacing in the manner of FIG. 12 has been described above. It will be understood from the preceding discussion of ICS data network organization that the arrangement of FIG. 12 will in some cases be distributed over a plurality of networked nodes.

It proves advantageous to include illustrative automatic speech recognition functionality in the arrangement of FIG. 12. This is presented in the form of ASR parameter extraction unit 354 and ASR unit 342. Parameter extraction unit functions in any of several well-known configurations to extract useful parameter values from speech packets available on LAN 310. Such packets will also be identified in standard voice packet manner as to particular sessions, with identified source and destination packet addresses. Parameter extraction proves useful in establishing the necessary correlation with ASR models and associated reference data to allow the content of speech packets to be recognized.

An application of ASR processing that proves to be particularly useful in the high volume context of VoIP communications, and even more particularly in the context of ICS is known as word spotting. Word spotting limits its recognition purview to a selected subset of all speech (selected words and phrases) having relevance in a particular context. Thus, for example, in ICS contexts, it proves particularly useful to monitor conversations for words or phrases that could have relevance to crimes or other public safety concerns.

Figure 13:
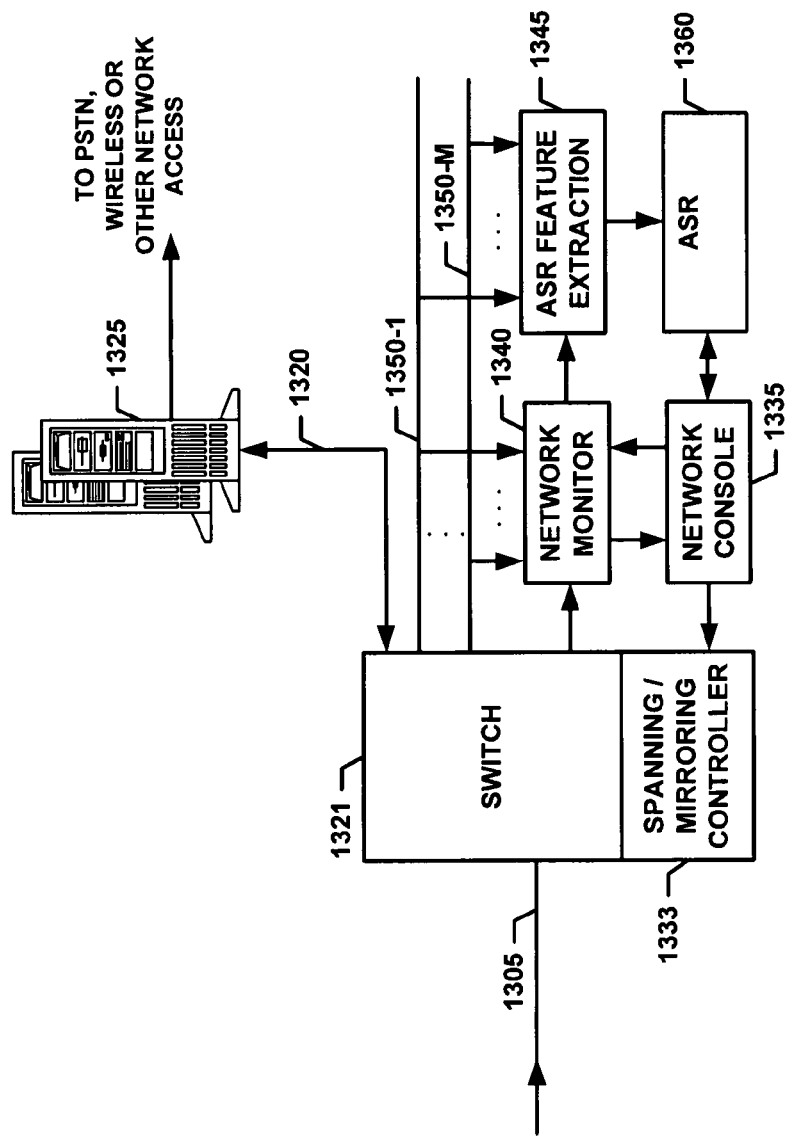
FIG. 13 shows an IPTS fitted with network monitoring and control elements, speech recognition functional elements to control port spanning or mirroring for selective redirection and/or storing of packet data streams.

FIG. 13 illustrates an exemplary association of a switch 1321 (such as IPTS 320 in FIG. 12) being monitored at some or all of its ports by network monitor 1340, and receiving inputs from network console 1335 (or admin terminal 325 in FIG. 12) to direct certain of its operating features. Among these features is the well-known port-spanning or port-mirroring technique for selectively or universally directing traffic appearing at ports of the switch to designated network locations.

In the present illustrative use, switch 1321, in response to ASR feature extraction unit 1345 and ASR unit 1360 determining that one or more word spotting target words or phrases has been detected at a port of switch 1321, diverts or copies the data stream associated with that port to a predetermined recording and/or transmission node 1325. In typical operation, then, speech from a conversation causing a word spotting indication to appear at a port of switch 1321 is illustratively sent to node 1325 for recording, selective monitoring and selective further retransmission to one or more predetermined location(s). As an example, if a conversation being monitored at switch 1321 is found to include potentially offending words or phrases relating to the plotting of a crime, then the call will be forwarded to one or more responsible corrections or law enforcement officials for further action. In addition, such a call will also be stored (if it had not already been subject to recording) and flagged for future retrieval. Thus, if a law enforcement officer is informed of the ongoing call sometime after it has begun, that officer can request a subsequent playback of any missed portion of the recorded call. The present invention also provides in appropriate cases for the playback of previous calls associated with a particular PIN or called party identification.

Figure 14:
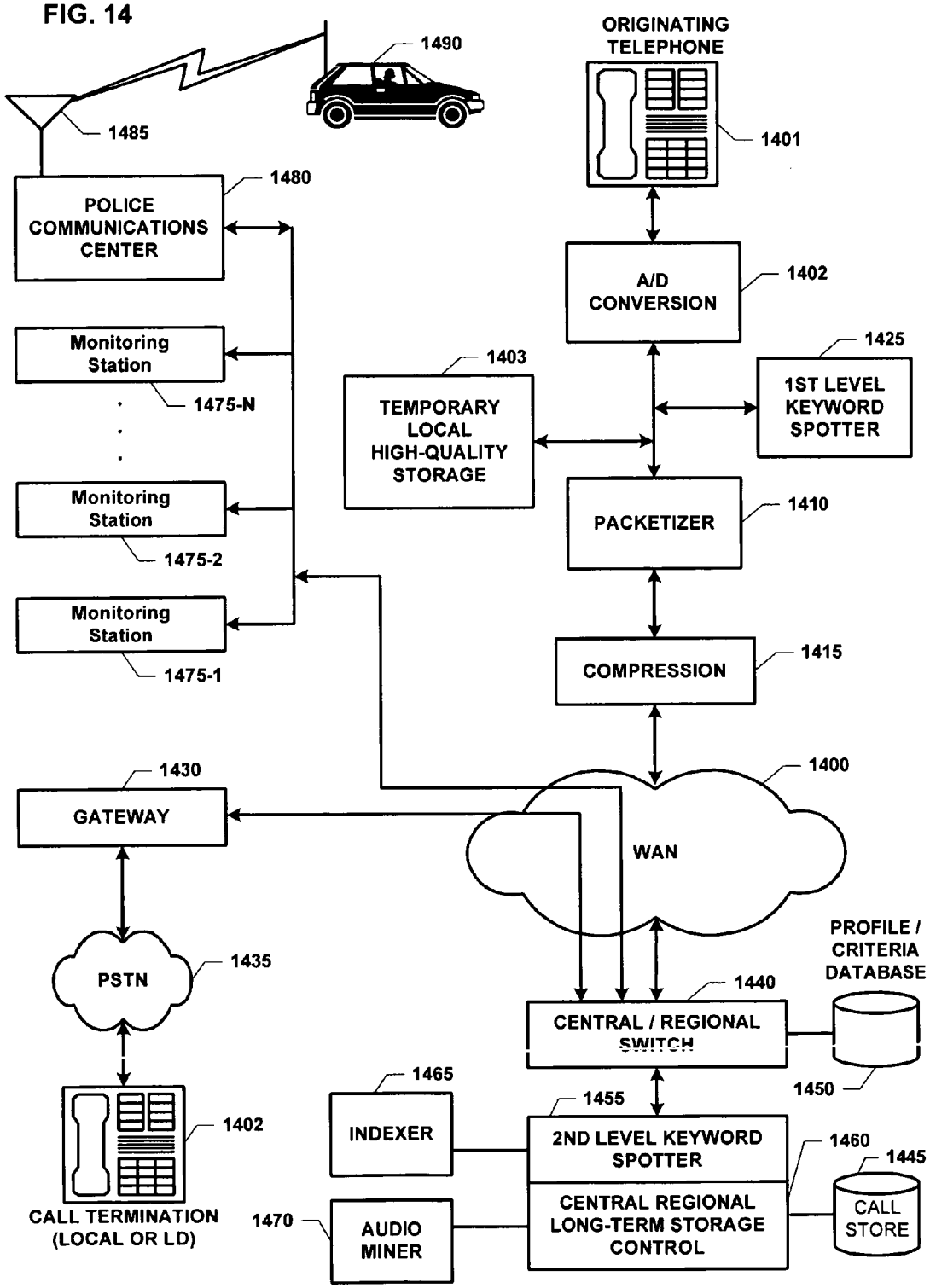
FIG. 14 illustrates a particular application for word spotting to provide real-time access to ongoing ICS calls and the use of centralized or regionalized data storage for long-term retention and access of ICS calls.

FIG. 14 shows an extension of the application of word spotting described in connection with FIGS. 12 and 13. In FIG. 14, an inmate at an originating telephone at an inmate calling center, such as 200 in FIG. 2, is participating in an on-going inmate call to a destination 1402 by way of A/D converter 1402, packetizer 1410, compression (coder) 1415, WAN 1400, gateway 1430 and PSTN 1435. Illustratively, this call is being recorded, either because all calls are routinely recorded, or because call setup information, such as caller identification information, called party identification, or both, prompted a query to profile/criteria data base 1450 for directions on monitoring and/or recording the call. Other criteria may include the occurrence of events that are possibly linked to one or more call parties, timing relative other events—such as known criminal activity, or other relevant facts or suspicions.

In accordance with a feature of this embodiment of the present invention, it proves advantageous to provide analog-to-digital conversion at a sufficient sampling rate and quantizing granularity to provide high quality sampled speech that will be intelligible after digital recording and, especially, communicated over a transmission medium that suffers any of a variety of impairments.

For most voice telephony work, an 8 kHZ sampling rate, with each sample quantized to one of $2^8=256$ PCM (pulse code modulation) levels is usually considered high quality audio. Storage requirements for such digital output, though, are also high—64 kbits/sec. Using one of a variety of ITU-T standard compression schemes, the quality can be improved for a given bit storage rate, or a given quality can be assured using fewer bits/sec. It can be readily shown that an ITU-T μ-law coding with $\mu=255$ provides, for an 8-bit sample, a dynamic range associated with a 12-bit PCM encoding. In all cases, the trade-off of storage requirements and quality of a stored voice signal is a system design choice.

In any event, it proves desirable to initially retain a high quality (as interpreted for overall system design) digital voice recording of a conversation that is likely to be of real-time or future importance. This is advantageously reflected by the use of temporary local high-quality storage unit 1403. Temporary implies a maximum time for storage of a high-quality voice signal—another design choice based on cost, extent of use and other factors. Recordings of conversations are accompanied in store 1403 by call identifying data, such as calling party ID number (and calling number, if applicable), calling location, time of day, day of week, date, called number, and any other criteria deemed relevant or as may be specified by profile information from database 1450.

The contents of store 1403 are, in accordance with present inventive techniques, subject to $1^{st}$ level keyword spotting by unit 1425 in FIG. 14. With a high quality voice signal and a reasonable number of key words (including phrases) identified for spotting, the word spotter 1425 can achieve a relatively high level of success in spotting the words identified in a default word profile, or a call participant-specific word profile provided by profile/criteria database 1450.

Upon spotting of profile identified key words (and/or phrases), key word spotter 1425 advantageously adds identifying data, e.g. a flag value, indicating the finding of key words for a particular segment of a particular conversation stored in an identified position in store 1403. The urgency or importance of the key word finding is advantageously quantified, as by a flag value of 5 for highest interest or priority to 1 for lowest level of priority. This flag value, is typically assigned by the currently applicable profile for the conversation.

Thus, for example, if a police agency is seeking information about a possible near future crime, and if an inmate is thought to be privy to information relating to time, place or other such information of that crime, they will typically assign a high priority and will supply a number of key words thought to be related to the suspected imminent crime. Some key words may be thought to be especially significant and urgent; these would likely be assigned the highest flag value (illustratively, 5). Other key words, though potentially important, might have lower immediate value. These key words would be assigned a somewhat lower value, e.g., a flag value of 4. Other key words would be assigned lower values. It also proves advantageous to also include a standard or default set of keywords that might not be necessarily related to a specific event, but which might have strategic long-term interest. A separate flag value, illustratively 0, might be assigned to such key words.

When a flag of a specified value is set for a particular call, or particular called party, or other specific call characteristic, a message is sent from key word spotter 1425 through WAN 1400 to central/regional switch 1440 from which follow-up action, if any, is originated. Switch 1440 will illustratively assume the form of IPTS 320 in FIG. 3A or 3C, and will evaluate the flag and any further information in profile/criteria database 1450. Such additional data will in appropriate cases include instructions to notify a particular person or office, e.g., a police patrol officer or detective, represented as police vehicle 1490 in FIG. 14 through a police communications center 1480. In other cases, instructions may indicate that the police communications center 1480 be notified to pursue some other action. Other actions directed by a value for a flag signal value and/or other criteria will include notifying a real-time monitoring station, such as one of stations 1475-$i$. The additional information will, in particular cases, include instructions to maintain selected calls, typically those with specific call profiles or those with high flag values, for a longer period of time, instead of suffering irreversible compression, as by compression unit 1415.

When the specified short term storage period for all or selected calls expires, the recordings for these calls is advantageously supplied to compression unit 1415 to render their file size of an acceptable value, thence to switch 1440. At switch 1440, the recorded conversation, including any flags and call identification data, is passed to central/regional long-term storage control 1460 for storage in call store 1445 and selective further processing in one or more of indexer 1465, audio miner 1470 and second-level keyword spotter.

Indexer 1465 provides indexing for recorded calls, illustratively in cooperation with word spotter 1455. Thus, word spotter 1455 performs word spotting on each or select recorded calls in accordance with a default key word list, or a call, caller, called party, time-specific or other call parameter-specific key word list. Thus if an event occurred at a specific time and authorities seek to learn what inmates might know about that event, a time-specific-event-specific key word list may be prepared and used to index the now less than high-quality call recordings for the relevant span of time. The results of this key word spotting are then indexed by indexer 1465 and made available for searching locally, e.g., at a monitoring station 1475-*i*, or anywhere on the ICS provider network via an admin terminal.

In addition to key word spotting-based indexing, recorded calls stored in call store 1445 can be selectively subjected to audio mining as by audio miner 1470. Audio miner 1470 can take any of a variety of forms, including those described in N. Leavitt, "Let's Hear it for Audio Mining," *Computer*, October, 2002, pp. 23-25. A commercial audio mining software development kit is available from Scansoft (now Nuance Communications, Inc.). This Scansoft AudioMining Development System provides the capability to extract spoken word content from, among other sources, telephony speech recordings. In doing so, it catalogs speech content, including telephony speech content. It can employ custom vocabularies for specific contexts. Another commercial offering for analyzing telephone call content is known as CallMiner. As with key word spotting-based indexing results of audio mining are made available for retrieval at a monitoring stations, such as the 1475-i in FIG. 14 or anywhere on the ICS provider network via an admin terminal.

Three-Way Call Detection and Prevention

Figure 15:
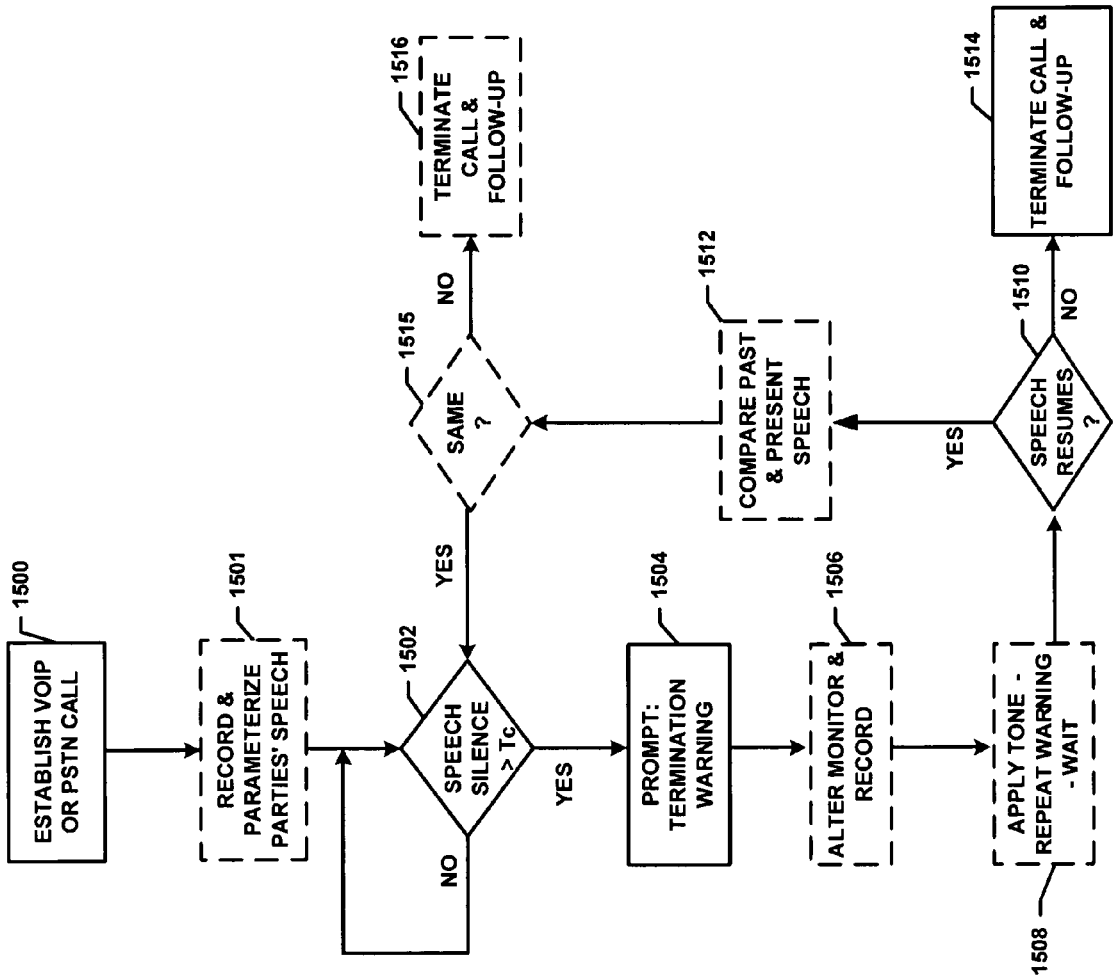
FIG. 15 is a flowchart reflecting a 3-way call attempt detection method using facilities available in the embodiments described above, which method may also be practiced in a PSTN context by adapting standard systems in accordance with an illustrative embodiment of the present invention.

FIG. 15 is a flowchart illustrating operations useful in an embodiment of the present invention that provides enhanced detection and treatment for suspected unauthorized 3-way calling attempts in ongoing calls that employ VoIP and other data networking technologies, in accordance with the present application. However, though the operations shown in FIG. 15 are advantageously carried out in the context of the described VoIP systems, including systems of incorporated patent application 1, particular embodiments of the methods of FIG. 15 may also be practiced in prior art inmate calling systems, including those of the type shown in FIG. 1. Thus, the inventive methods of FIG. 15 provide improvements to such prior art systems.

Turning then to the flowchart of FIG. 15, block 1500 indicates that an inmate call is to be established by one of the techniques described above or in other VOIP-based telephone systems. For purposes to be elaborated below, it often proves advantageous to perform optional step 1501 in FIG. 15, which step is shown in broken line format to identify that step as optional. Step 1501 includes recording at least a portion of the speech present on the call established at step 300, and extracting signal parameters or other characterizing elements of the speech of each party to the conversation. Often, such parameter extraction involves performing frequency analysis such as cepstral analysis, linear predictive coding analysis or other well-known analyses that enable one to make comparisons of the speech of one speaker (illustratively a reference speaker) with the speech of another speaker (illustratively a test speaker). For present descriptive purposes, the speech captured and parameterized at step 301 is to be considered reference speech. This speech will prove useful in some embodiments of the present invention for comparison with test speech in a manner to be described below.

As will be apparent to those skilled in the art, recording an entire conversation and developing speech characterizing parameters for at least selected parts of the conversation will prove useful for many purposes. Thus, for example, subject only to brief pauses in a conversation to an authorized called party, the call may be handed off to another authorized party at the same called station—another family member, for example. It will prove advantageous in some cases to develop call parameters for each such allowed call party. While speech parameters for individual participants in a conversation are illustratively developed and used during the course of an ICS call, it will also prove advantageous to store certain speaker characteristics for future use. Thus, if an unauthorized person is determined to be a called party, or is found to have been added to a call to an otherwise authorized party, then it will often prove advantageous to store speech characteristics of such unauthorized person for future use. These parameters are advantageously stored in a network database such as database 323 in FIG. 3, or in a local database at control computer 110 when a non-VOIP, i.e., analog PSTN inmate calling is used.

A common technique employed in embodiments of the present invention relating to the methods of flowchart of FIG. 15 is that of monitoring for speech silence, where speech silence refers to the absence of speech signal content on the communications connection or link (whether PSTN, VoIP or both) corresponding to speech by an inmate calling party and a called party. Such speech silence will advantageously be detected in VoIP (or partially VoIP contexts) by a monitoring and recording unit shown, for example, as 343 in FIG. 12 or by a separate silence detector, illustrated as 322 in FIG. 12, cooperating with monitoring and recording unit 343 in the network functionality shown in FIG. 12. In other contexts, such monitoring will be accomplished in monitoring facilities associated with an admin terminal such as 325, 335 or 365 in FIGS. 3A, 3B and 3C, respectively, or as an added element at a correctional facility-based monitoring unit included in control computer 110 in the prior art system of FIG. 1. When computer 110 is used for these purposes, it will prove advantageous to re-program that computer to perform the inventive features shown in FIGS. 15 and 16, and described herein.

Figure 16:
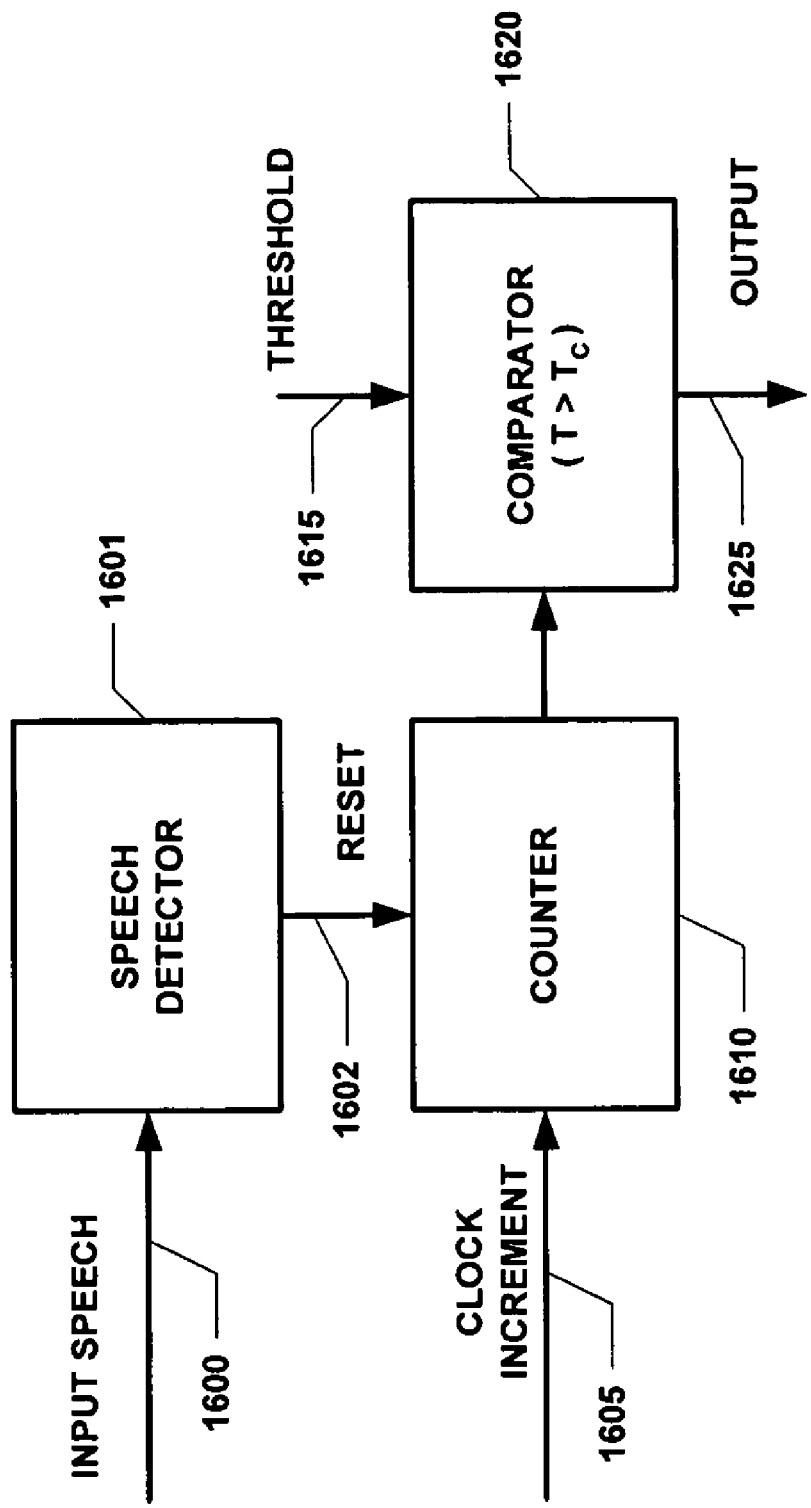
FIG. 16 is a functional block diagram of a speech silence detector useful in application of the method of FIG. 15.

The improved monitoring of inmate calls in accordance with FIGS. 15 and 16 may be performed on premises controlled by an inmate calling service provider, correctional facility personnel, or someone else designated to perform such monitoring. In appropriate other cases, in accordance with present inventive teachings, monitoring for speech silence may be accomplished at any other point on or along an inmate calling path or link.

Actual detection of speech silence (as distinguished from the presence or absence of ambient noise, including background sounds) as described above will be accomplished by well-known signal processing apparatus for receiving telephone call (or other) signals in analog or digital (including, as appropriate, packetized) form, performing any appropriate filtering of these signals and then applying signal processing techniques to determine the presence or absence of speech content. Illustrative speech detector techniques are described, for example, in U.S. Pat. Nos. 4,028,496 to LaMarche et al. and 5,822,726 to Taylor, et al, among many other published references. In modern implementations, detection of speech signals, even low level speech signals appearing in high or low noise environments are readily identified. In particular, it has been shown in the many references in the field how to detect the beginning and end of speech utterances, for a wide variety of applications. Such applications include automatic speech recognition and efficient transmission resource sharing.

FIG. 16 shows a generalized schematic representation of a speech silence detector. Shown there is a speech detector 1601, which may be of any well known type, illustratively assuming the form of one of those cited above. Input speech applied on input 1600 to speech detector 1601 is processed by speech detector 1601 to produce a signal on output 1602 whenever speech is present on input 1600. Advantageously, output 1602 is coupled to a reset input to counter 1610, which may be of any well-known compatible design known in the art. Counter 1610 also receives incrementing clock signals on input 1605.

Thus, if no reset signal (indicating the presence of speech on input 1600) is present on input 1602, counter 1610 will continue to increment through its counting range. When, however, speech on input 1600 causes a signal on reset input 1602 to counter 1610, the count of counter 1610 is reset to an initial condition, illustratively the all-zero state. The output 1612 of counter 1610, designated T for Time, is applied to one input of comparator 1620. Comparator 1620 also receives a user-selectable threshold value $T_C$, which is advantageously chosen to represent a count in counter 1610 indicative of a time period, $T_C$. This user-selectable time period represented by the value $T_C$ allows a user to choose a duration of silence indicative of suspicious activity on a monitored telephone call. Such suspicious activity is illustratively associated with an attempt to place or otherwise create a forwarded, third-party, conference or other unauthorized inmate telephone call after once having established an authorized call between an inmate and an authorized called party. An output is provided on output 1625 from comparator 1620, and counter 1610 is reset (not shown).

It will be recognized by those skilled in the art that the functions shown in FIG. 16 and described above will advantageously be realized by execution of programs in a processor, such as that included in any of the call control processors in a personal computer implementation or a telephony switch such as IPTS 320 shown in the figures in incorporated applications included in this application as. Additionally or alternatively, a special purpose processor may readily be adapted for performing such functions in light of the inventive teachings of this application.

Returning to FIG. 15, a YES output from the test at step 1502 indicates that a period of speech silence exceeding a desired threshold, $T_C$ has been detected. It proves advantageous to selectively issue a warning message upon experiencing a speech silence interval equaling or exceeding $T_C$. Such warning message will be chosen at the discretion of the system operator, but will illustratively be of the form: A condition has occurred that is not consistent with the authorized use of this service. If the permitted use is not resumed within ten seconds, then this call will be terminated. The stated period (ten seconds) may be chosen to be any appropriate period, and the stated action (termination) may be adjusted to an action that is appropriate to the circumstances. Other particular warnings (or other information announcements) may be substituted as desired by the system operator.

As indicated by optional step 1506, the monitoring and/or recording functions performed by the inmate calling system may be adjusted or invoked as appropriate to the potential violation of allowed calling procedures. Thus, for example, if recording of the conversation had not been underway at the time the excessive speech silence interval occurred, then recording may illustratively be turned on. This adjustment will conveniently be made by signaling network console unit 1335 to appropriately alter mirroring of the call to storage units, such as 1325 in FIG. 13.

Alternatively, or additionally, a record of the detected speech silence interval will illustratively be logged in an event log, including information relating to the calling and (allowed) called party, any conditions noted in a database, such as database 323 in FIG. 3A, that identifies special calling privileges or limitations applicable to the calling party—including conditions relating to the particular (allowed) called party and any information relating to other events transpiring during the call (and the speech silence interval) such as DTMF or other tones. In the case of packet-based calling, call setup or control packets observed during a speech silence interval may also be logged and used to influence call treatment subsequent to the issuance of the warning at step 1504.

In appropriate cases, other optional call treatment represented by step 1508 in FIG. 15 may be employed. Thus, an interfering tone, warble or other sound may be applied to either or both ends of a call, and the prompt of step 1504 (or another prompt) may be issued.

Again using functionality of the type shown generally in FIG. 16, or in equivalent programmed processor functionality, the resumption of speech between the allowed calling and called parties (indicated, for example, by a YES result from a test at step 1510) will allow the call to continue.

If speech resumes after a warning prompt or other action following detection of an excessive speech silence interval, other optional steps may be applied to the call as continued. Thus, in addition to again monitoring for excessive speech silence intervals, it proves advantageous—especially after a speech silence interval or other suspicious call event—to also compare the speech of parties to the conversation after such the suspicious call event with that observed before the suspicious event.

For this purpose, an analysis of the speech of speakers on the conversation after the excessive speech silence period is performed at step 1512. If, a comparison of speech parameters extracted at step 1512 with those extracted previously from the analysis at step 1501 does not provide a match at test step 1515, then it will in many cases prove advantageous to terminate the call and perform any appropriate follow-up. Such termination will be especially appropriate when the suspicious event is the above-described excessive speech silence interval. This is the case because the suspicions of a possible unauthorized additional or substituted party raised by the speech silence interval tends to be confirmed by speech after resumption at step 1510 that is found at optional steps 1512 and 1515 to not be the same as that of any of the previously allowed called parties.

Follow-up indicated at step 1516 may include identifying the new called party on the conversation. This may be accomplished using available call setup information that may have been collected during the course of the call, including the excessive speech silence interval, or by comparison of the speech parameters of the apparent new party to the conversation with a database of previously stored sets of speech parameters, each set of which is known to be associated with an identified person.

SIP-Based Unauthorized 3-Way Call Treatment
Background

As noted above, numerous industry standards (including ITU Recommendations) treating the architecture, features and other aspects of IP telephony, including a wide full range of multimedia functionality and services, have been developed by standards bodies, including the Internet Engineering Task Force (IETF) and International Telecommunications Union (ITU) and others. Many of the ITU documents related to such services and networks for providing them are described in U.S. Pat. No. 5,867,494, which patent is hereby incorporated by reference for all purposes in this application as if set forth in its entirety herein. Other features and operating modes of VoIP networks and services are also described in this U.S. Pat. No. 5,867,494. Important standards such as the H.323 Recommendation by the ITI, and the various Session Initiation Protocol (SIP) standards by the Internet Engineering Task Forces (IETF) have been central to the development of VOIP networks and processes. In particular, the cited SIP protocols and their extensions have been a stimulus to a wide variety of new VOIP features and applications. Embodiments of the present invention that employ aspects of the SIP protocols, hereinafter, SIP.

Illustrative IP networks are described, for example, in International Patent Application Number PCT/US00/40175, with International Publication Number WO 00/76158 A1, published Dec. 14, 2000. This published international patent application is hereby incorporated by reference as if set forth in its entirety herein. Voice and multimedia services over IP packet networks is now well known and popularly referred to as Voice over IP (VoIP), which usage will be adopted in this application. It should be understood, however, that such services include real time multimedia calling, streaming multimedia in all of its forms, and interactive activities including gaming and much more. These services and infrastructure for making them available are described in, among many others, M. Goncalves, *Voice over IP Networks*, McGraw-Hill, 1999; O. Hersent, et al., *IP Telephony—Packet-based multimedia communications systems*, Addison-Wesley, 2000; M. A. Miller, *Voice Over IP—Strategies for the Converged Network*, M&T Books, 2000; J. Davidson, *Voice over IP Fundamentals*, Cisco Press, 2000; and U. Black, *Voice Over IP*, $2^{nd}$ Ed., Prentice-Hall, 2001.

A. Sulkin, *PBX Systems for IP Telephony*, McGraw-Hill, 2002, provides a general overview of so-called IP PBX (IP Private Branch Exchange) use in providing VoIP services. Sulkin, at pages 183-202, introduces and describes certain of the ITU and IETF standards publications useful in practicing VoIP applications. It will be recognized from the above-cited references and the general knowledge of the art that the ITU H.323 (and related) Recommendations—sometimes referred to as the H.323 suite, and the several IETF SIP standards compete and complement each other in meeting requirements in developing and deploying VoIP applications. A further description of the various SIP protocols is provided in G. Camarillo, *SIP Demystified*, McGraw-Hill, 2002. Of course the best source for standards information relating to telecommunications and the Internet 310 remain the sources provided by the ITU and IETF. A frequently updated web site presenting current status of many SIP and other VoIP developments and standardization efforts is maintained at the Computer Science Department at Columbia University.

As noted above in connection with other embodiments of the present invention, the very popular 3-way calling feature available to many PSTN customers provides a potential for abuse when used in ICS.

Techniques seeking to thwart unauthorized 3-way calling, including one embodiment described above, have usually been applied after an authorized call has been established. These techniques often employ monitoring a calling line to detect hook-flashes or other signals characteristic of a 3-way call attempt on an ongoing call. Call treatment, including call termination, is then applied. In the illustrative embodiment of the present invention described above, techniques including monitoring for silence, announcements made by the system to the call parties and selective application of speaker recognition techniques are used to discourage the addition of unauthorized third parties to an otherwise authorized call.

The present inventive embodiment, by contrast, includes techniques for controlling inmate and other regulated-calling-context calling to ensure that unauthorized 3-way calling is discouraged, and prevented before a call is allowed by determining with improved accuracy, and in a manner tailored to the packet network and VoIP context, which attempted calls are not authorized. Avoidance of false-positive 3-way call indications is readily achieved in embodiments of the present invention.

In accordance with one aspect of the present invention, existing conference calling mechanisms of VoIP systems and methods are employed on all or selected inmate calls, even when the calling party does not request such conference facilities. An appropriately configured or modified existing conference calling mechanism appropriate to a particular implementation is advantageously invoked to require that each destination or destination party in a VoIP conference call—even when only one party other than the calling party is present on the call—is positively identified to an appropriate level of certainty.

Such positive identification can take the form of one or more of (i) a station identification, as by equipment code, e.g., a MAC or similar address, an IP-phone identification response, or mobile device (e.g., cellular phone) serial number, (ii) an IP address, Ethernet address, or other network address, (iii) session ID, including an encrypted session ID, (iv) Identification Friend or Foe (IFF) response, (v) a random or predetermined number or code sent by a conferencing server only to specified destinations that is returned after being subjected to a transformation, such as a hashing function that is characteristic of a particular person or station.

In particular cases, biometric responses, including fingerprint, retinal scan or other such personal indicia can be sought to help verify the identity of a party at a conference station. In other cases, station equipment with personal identification readers, e.g., for sensing information on driver licenses, passports, credit or debit cards, or other cards having machine-readable data, can be used to identify a person at a called terminal with increased certainty.

In accordance with another aspect of the present invention, a request to complete a call from an inmate caller to a particular first destination is conditionally treated as a request to set up a conference with the caller and the first station, without any other destination stations included or allowed in the conference. Conditions for such conditional treatment will include the identity and inmate status of the inmate caller. Thus, if the inmate caller has failed to observe rules of behavior, including rules for telephone calling behavior, then it may be determined by correctional facility officials that this inmate caller will have all calls treated as conference calls, and thereby subject to close scrutiny. Such close scrutiny may include, in addition to having all calls treated as conference calls, default recording of all conversations originated by that inmate caller, if recording is not already a default mode of monitoring. In general, however, it will often be determined that all calls will treated as conference calls, and (except for well-known exceptions, such as calls between an inmate and his/her attorney) all calls will be recorded.

If the inmate has displayed other characteristics of behavior (or if, for example, he or she has been convicted of a particular crime) then other then the call may not necessarily be required to have all calls treated as conference calls. In each case details of applicable rules will advantageously be stored in a database that is queried upon request for the exercise of calling privileges by each particular inmate. This database will also provide other data to the conference server to better evaluate how to allow calling privileges to be exercised by a particular inmate caller.

When a request for placement of an inmate call is received and a determination that treatment of the call will be that treatment accorded a conference call, then the request is forwarded via a gateway or a user agent active in a SIP call treatment. Other particular arrangements may be employed to place the request over a packet network to the network-based conference server. Gateways will be adapted to permit traffic from a variety of station equipment at a correctional facility to be processed by the present invention.

While a number of particular network configurations will suitably serve the conferencing requirements of the present invention, one illustrative arrangement presented in U.S. Patent Application 2002/0126626 A1, published Sep. 12, 2002 based on an application filed Feb. 28, 2002 and claiming priority based on Provisional Application 60/280,783, filed Apr. 2, 2001, will provide a suitable framework for these purposes. This application 2002/0126626 is hereby incorporated by reference as if set forth in its entirety herein. Other particular servers and equivalent framework functionality will be found in others of the references cited above. Results of the present invention are accomplished through suitably adapting and modifying the cited servers and associated functionality, including programming these existing servers to perform steps and functions as described herein.

After any required tests regarding called station and/or called party identity are performed by the network-based conference server, and results are found to be satisfactory, then the conference call is joined at the conference server. The inmate caller and the allowable called party may then carry on their desired conversation. If the original call requested by the inmate was a conference call with more than one called party, and if all requested called parties are found to be allowable, and the identity of each called station and/or party is adequately verified, then the conversation will proceed with any mixed signals being illustratively provided by the conference server in the manner described in incorporated U.S. patent application 2002/0126626 A1.

When a call is underway, data streams received from each party to the conference call, including 2-party conference calls, are monitored as necessary to assure adherence to call restrictions. In particular, by monitoring the calling party's address information on each input data stream, the server will verify that the originally allowed link is still in the same state. Matters such as encoder type, sampling and transmission rate, or any other signal stream characteristic that changes can be cause to suspect that the call has been changed by the attempted or actual substitution of another party. When such suspicious behavior is encountered, appropriate action can be taken by the conference server. Thus, for example, one or more parties in the conference can have his or her data stream terminated, mirrored to another monitoring location, or simply redirected to another destination, e.g., a corrections officer.

Figure 17:
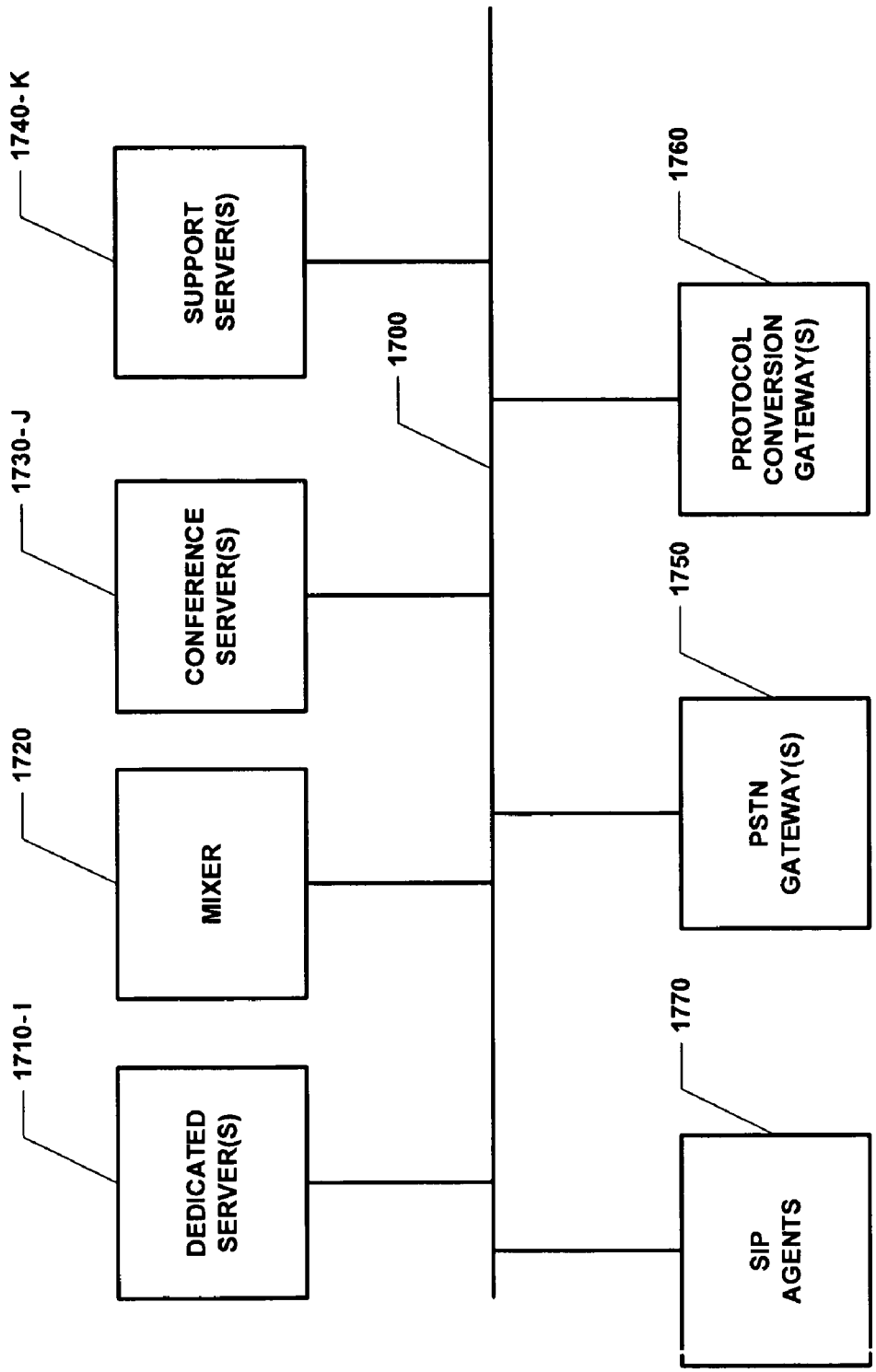
FIG. 17 is a network block diagram of elements of a VOIP-enabled system for performing conference call setup in accordance with aspects of the present invention.

FIG. 17 shows a representative set of functional elements useful in a packet network context for detection of unauthorized 3-way call attempts in accordance with aspects of the present invention. Shown there is a representative network structure 1700—illustratively shown in the form of a local area network (LAN) or wide area network (WAN), but suitable for realization as a plurality of functional elements distributed over one or more packet networks of well known varieties. Thus, network 1700 will illustratively include one or more portions adapted for transmission of Ethernet packets or frames, and other packet types, such as IP packets or Asynchronous Transfer Mode packets. For purposes of illustration, network 200 will be assumed to be adapted for use with SIP protocol features, including the well known conferencing functionalities available using IETF SIP standards.

Also shown in FIG. 17 is conference server functionality in the form of one or more conference servers 1730-J, J=1, N, illustratively of a type specified in known IETF SIP standard structures and protocols. It will be recognized that when more that one such conference server is required, such plural conferencing servers 1730-J may be co-located or geographically distributed to any desirable degree to meet system or user needs, as may other functional elements shown in FIG. 17. It is the function of each conference server 1730-J to complete calls between parties seeking to join in a conference call. Access by such parties is facilitated using well-known SIP agents, shown as 1770 in FIG. 17, acting on behalf of respective SIP clients. It is, of course, possible for such SIP agents 1770 to join their respective clients in two-party calls in accordance with well-known end-point-to-end-point (or address-to-address) protocols without the benefit of functionality provided by SIP server(s) 1730-J. In describing advantages accruing through use of the present invention, however, emphasis will be placed on conference calling operations.

End points participating in conference calls in accordance with the present invention are advantageously SIP end points, but may, as well, be PSTN or other protocol-based end points, e.g., end points operating in accordance with ITU H.323 protocols. When PSTN end points are to participate in such conference calls, it proves advantageous to employ well-known PSTN gateways, shown as 1750 in FIG. 17, which may illustratively be of the types described, e.g., in incorporated provisional patent application 1. Protocol Conversion Gateway(s) 1760 represent gateways for permitting participation of H.323 or other protocol-based end points. Gateways 1750 and 1760 perform the necessary signal format, data structure and other conversions appropriate to permit interfacing with the illustrative SIP-oriented network structure 1700 and conference server(s) 1730-J. Such gateway functionality also facilitates interoperation of other functional elements shown in FIG. 17, viz., dedicated server(s) 1710-I, mixer 1720, and support servers 1740-K which elements will now be discussed.

Specifically, support server(s) 1740-K represent database and, as needed, database management and data analysis functionality commonly associated with database systems for storing, retrieving and forming conclusions used by conference servers 17304 and other system elements shown in FIG. 17—all in accordance with aspects of the present invention. Dedicated servers 1710-I are functional elements illustratively used in evaluating speech (and other) content, speakers and signals from end-point and other system equipment. Thus, dedicated servers 1710-I are advantageously used to help in the identification of particular end-point equipment, addresses, and users at such end points.

Mixer 1720 represents one or more functional units for receiving incoming data streams, illustratively speech data streams, from conference originators (e.g., inmate callers), invitees to a conference call (called party (ies)), and participants in on-going conferences. Also present at mixer 1720 is real-time information regarding the conference end points and, advantageously, conference participants to permit identification of end points and participants at such end points that are part of the conference. In particular, address information, equipment identification and speaker identification is desirably available at the mixer, which operates under the control of the conference server. Mixer 1720 has the primary function, of course, of queuing appropriate data streams for delivery to conference participants, with due regard to authorized party identification, end point location or address and the like and end point equipment characteristics. Generally, data streams delivered to an end point in an authorized conference will include a mixed version of the speech (or other) content originated at all (or selected ones of) the end points participating in a conference. When the conference is a two-person conference including a calling inmate and another authorized party, then the mixer merely provides each end with the streaming packets from the other party. Mixer 1720 will, of course, provide any codec translation necessary for each receiving party. That is, if three authorized parties are taking part in a conference call, and if each party is using a different particular codec, then Mixer 1720 will perform conversion of format and other characteristics of a data stream from one party to a form suitable for receipt by each of the other parties. In doing so, Mixer 1720 will typically decode an input data streams and then mix and encode the decoded data streams using encoders appropriate to each of the intended recipients. Mixer 1720 will also perform signal alignment functions, as is well known in the art.

Figure 18:
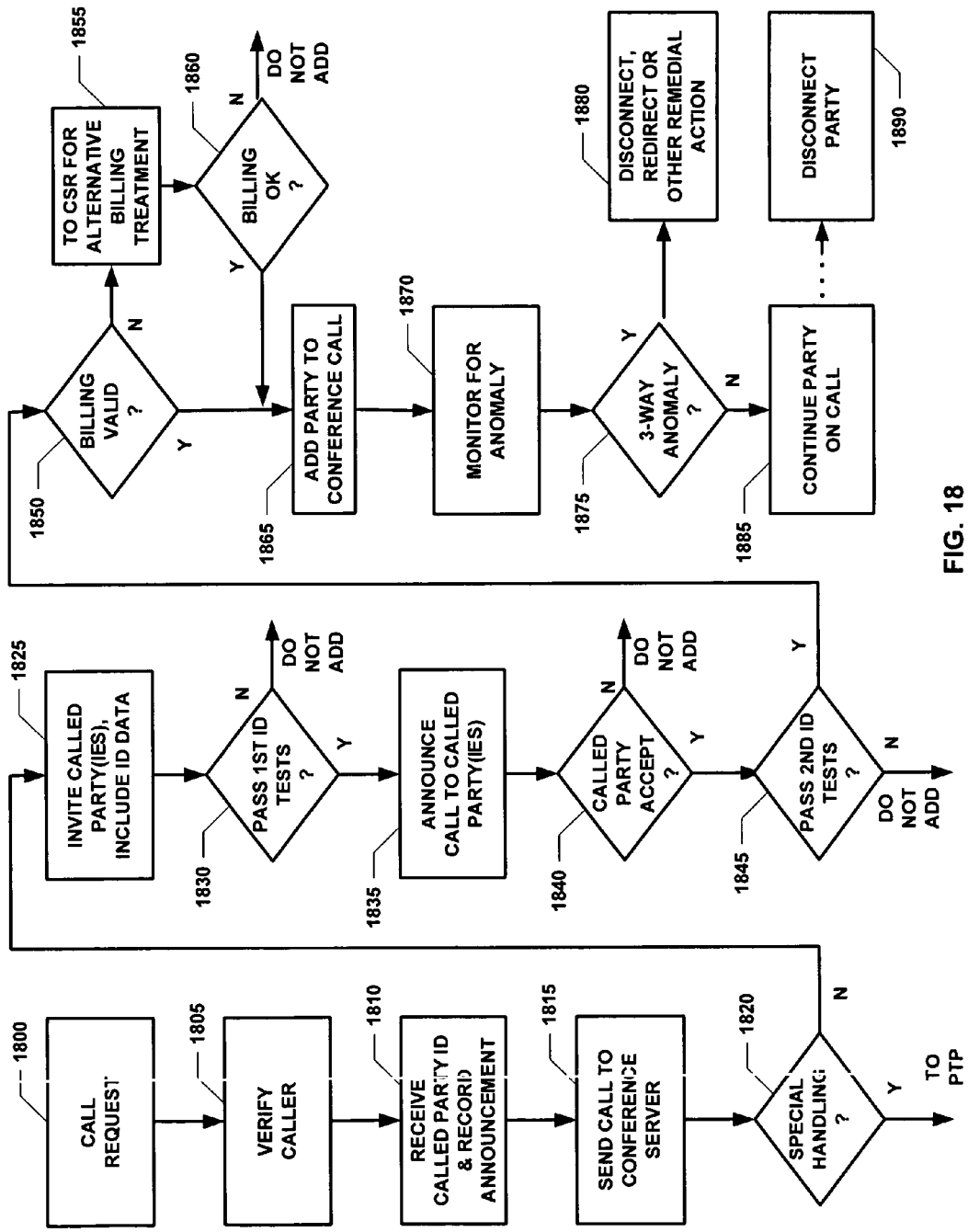
FIG. 18 is a flowchart illustrating a method for the prevention or reduction of unauthorized 3-way calls employing enhanced operation of elements of the illustrative network of FIG. 17.

FIG. 18 is a flowchart illustrating operations useful in embodiments of the present invention. Shown there, at step 1800 is a call request origination, as by an inmate lifting the handset of a telephone instrument in a correctional facility. Step 1805 represents caller verification processing described above. Advantageously, such verification includes speaker verification by comparison of a spoken utterance by the caller with a previously recorded and stored sample of the person purporting to be the caller. Such representation will in appropriate cases be accompanied by presentation of a password, PIN or other device.

When the caller is verified to be the person he/she purports to be, the caller is prompted at step 1810 to provide identification of the party sought to be called. If a 3-way call is requested, such identification will include identification of all parties to the call. The identification may be by a name, network address, PSTN phone number, or other acceptable identification. A local verification of the allowability of a call to the identified parties may be made, and a recording will be made of the caller identifying himself/herself if one has not previously been made. When such recording is made and any local called party allowability (e.g., called party not on blocked list) is completed, the call request is forwarded at step 1815 to a conference server 1730. At step 1820 a reference is made by a conference server 1730 to a support services server 1740 to determine if any special handling is required for a call by the caller or a called party (e.g., a lawyer) or any combination of these persons, or to an identified called station (e.g., a lawyer's office). Also, a prior determination may be made that ordinary point-to-point calling may be acceptable or appropriate for the particular proposed call. For concreteness and ease of understanding, however, it will be assumed for present descriptive purposes that all calls are to be handled as conference calls.

At step 1825 in FIG. 18, a conference server 130 invites identified called parties to join a conference call, the invitation advantageously including information, such as a coded character sequence that will be appropriate in some cases to identify the called station. In particular, such a sequence or other data originated by the conference server may be used by some end point devices to produce a transformed (e.g., by executing a well known hash function that is particular to the end station) sequence suitable for returning to the conference server during conference setup and, if the end point is approved for participation in a 3-or-more-person conference, during the course of the conference. Such an exchange of data may also (or instead) include a MAC address or other end-point address indicia that can readily be accessed by a conference server.

In some embodiments of the present invention, a prescribed response from a called party end point (e.g., digital phone, smart phone, computer, or an add-on or plug-in device at a standard telephone—collectively represented by representative digital telephone 349 in FIG. 12) is illustratively chosen to be a hashed version of a prescribed sequence, with one of the hashing function or prescribed sequence being indicative of the identity of the called station and/or the called party. Thus, for example, if a serial number or other terminal identification indicia is present at the called station, and a sequence is sent from a conference server 1730-J, the serial number will illustratively be used to define a hashing function to be applied to the sequence sent from the conference server. The resulting hashed version of the sequence received at the terminal will then be sent to the conference server 1730-J. In practice, either the hash function or the identification indicia can be sent with the manner of applying one as the hashing function also being indicated.

If an appropriate end-point validation indication is received (e.g., an appropriately hashed version of the sequence sent, or an expected MAC or other address—or a hashed version of either), then the test at step 1830 will be deemed to have been passed (a yes determination at 1830). If the expected validation indication is not found at step 1830, then a determination is made that the called end-point should not be added to the conference call. In practice, a conference server 1470-J will evaluate responses to a query message sent to a first network address associated with called party (or terminal or entity), and will accept a plurality of possible responses as sufficient evidence that the called party, or terminal, or other entity is present at the illustrative first address. Such acceptable evidence is advantageously stored or generated at conference server 1470-J for evaluation of identification query responses.

If a first identification query sent to a called party or called location (which may, for example, be a network destination for a law office) does not include sufficient evidence of the presence of the called entity (or if no response is received), then subsequent identification queries may be sent seeking further evidence. Depending on the called party/entity, more than one network address may be used to address such queries. Conference server 1470-J will, as appropriate, employ public or private network directory services to locate or determine any necessary (and acceptable) initial or alternative destination addresses for such queries.

Upon answer of a validated end-point, an announcement as to the nature of the call (e.g., one including a playback of the recorded caller speech from step 1810 and a request to accept or decline payment) is made at step 1835 of the nature of the call and a test is made at step 1840 for acceptance of the call charges. If a called party declines to pay charges for participation in the call, then that party is not added to the conference. If all called parties (even if it is only one called party) declines, the conference call attempt is terminated. If an acceptance indication is sent by the called party in response to the announcement at step 1835, then second identification tests are advantageously made at step 1845. These tests may be optional, e.g., as specified in a special handling determination at step 1820, but will advantageously include those described above, and, in particular, may include speaker identification applied to speech signals received from the called party end point and compared in a dedicated server 1710 in FIG. 17 with previously recorded speech. Server 1710 will illustratively be of a type described herein for use for speaker identification of a calling party. It will also prove advantageous to record speech from an approved conference call, including a two-party call, using call recording techniques described above, such recorded speech then being available for use for future verifications. Such recorded speech will desirably be identified in a database, illustratively in a support server 1740 where it will be identified as associated with particular calling and called parties and/or end-points.

Step 1850 represents a determination, as by reference to LIDB or other network databases in the manner described above in connection with other embodiments of the present invention, and in incorporated provisional application 1, or this step 1850 may reflect other billing preferences of the service provider or a called party. If available billing treatment is determined by the service provider to be inadequate, or uncertain, as reflected by a NO determination at step 1850, then reference is made of the called party to a CSR for alternative billing treatment. Instead, optional special treatment may be applied to a particular call if special circumstances exist, as when a present call is the first by a calling inmate from the correctional facility. Such special treatment is described, for example, in connection with FIG. 11. If the consultation at step 1855 results in a mutually satisfactory billing arrangement (a YES determination at step 1860), the called party is added to the conference call, as indicated at step 1865. If a NO determination is made at step 1860, the called party is not added.

Once step 1865 is performed, a conference call will be maintained with at least the calling party and one approved called party. Other allowed parties may be added during the course of this conference call, and some allowed parties may depart the call. In all cases, however, the joining of a party to a conference call (again, including the case of a single called conferee, i.e., a two-party call), call placement is made under the express control of a conference server 1730 and is subject to any desired and appropriate number of test conditions, as for an initial called party/entity. While a conference call is ongoing, a conference server 1730 acting in selective cooperation with one or more support servers 1740 and one or more dedicated servers 1710 desirably monitors all ongoing calls, usually with the exception of those expressly excluded, e.g., attorney-client conversations. Such network-based monitoring may take many forms, but may include key-word (or phrase) spotting, speaker identification, and monitoring for any other desired condition or signal. Hook-flash and some similar conditions associated with some 3-way calling attempts in the past will not generally be suitable subjects for monitoring in packet-based systems, but the kind of monitoring undertaken is not inherently limited in accordance with the present inventive techniques. Instead, address information, end-point device identification and other tools described above will be used with greater certainty and few false positive indications. In addition, biometric identification mechanisms, such as speaker identification (or speaker change indications), and comparison of current speaker voice prints or other speech parameters with stored speech information will prove more accurate and reliable than prior techniques.

FIG. 18 shows at step 1870 that ongoing conference calls will be monitored for anomalies, such as unexpected address changes for a called station or end-user device, or a particular speaker (or a change in speaker). Other anomalous conditions or failures to maintain particular conditions—as by the withdrawal of a previously approved identification device (smart card, etc.)—will trigger an anomaly condition. Such an anomaly will then be reported, as by an alarm or other message to analysis mechanisms, including support server 1740, and data from databases included therein, for comparison and evaluation with other stored information, all as represented by step 1880 in FIG. 18. Other particular anomalies suitable for monitoring and reporting (and other remedial action) will include detection in the codec used by a particular end point, or other transmission characteristics of a particular data flow. Other changes, or attempted changes, in the manner of mixing and synchronizing data streams will also prove useful in particular cases as anomalies sufficient to cause further analyses. If unresolved, appropriate actions will, in appropriate cases, include termination of a call or disconnection of a link to one or more call participants, or changes in monitoring or recording of a call, illustratively using facilities described herein. It will also prove useful when particular acts associated with particular call participants are detected to record and retain speech samples of potentially offending call participants for future use in granting or refusing access to calls.

Finally, in due course a continuing conference call will be maintained until hang-up by all (or all but one) of the conferees. This is reflected by blocks 1885 and 1890 in FIG. 18.

Since the conference server(s) 1730-J and associated other network servers have greater control over called party access, and have a potentially much larger body of called-party and end-point identification information available, unauthorized 3-way calling attempts will be greatly discouraged. If such 3-way calls are established, they will be more readily detected and reported in accordance with the present inventive teachings and practice. Further, additional information regarding called stations and called (and unauthorized added) parties available to the system of FIG. 17 will afford enhanced opportunities for remedial and preventative measures.

While this section entitled SIP-Based Unauthorized 3-Way Call Treatment emphasizes benefits of the embodiments of the present invention relating to 3-way call prevention and detection, it will be recognized that these teachings are applicable to more general access controls. That is, these teachings relate more generally to access to, and continued participation in, calls using voice (and other) packet communications systems.

Caller Authentication Using Biometrics

As noted in connection with other embodiments of the present invention, it proves advantageous to determine the identity of a caller seeking to place calls in an ICS. Many of the call privileges and restrictions in a correctional facility typically are user-dependent, i.e., particular inmates may enjoy greater or lesser calling privileges in relation to personal behavior. Use of ICS system features, such as call monitoring and recording may also be dependent on the caller being accurately identified.

For these reasons, a number of techniques, collectively referred to as biometric tests or measures are advantageously performed in addition to, or in place of, more traditional personal identification practices, such as use of identification (inmate) number with PINs or passwords. It has been suggested that such traditional practices are concerned more with cards, codes and numbers—rather than being directly concerned with persons. Accordingly, such biometric measures, or biometrics as face and hand structure, finger prints, and, especially, iris recognition and voice (speaker) recognition. The latter two biometrics (iris and speaker recognition) have high levels of accuracy and are constant over time. Tests have shown that impersonation of these characteristics is not easily achieved. A report comparing various biometrics is available from Securimetrics, Inc.

Commercial offerings of iris recognition products are available, e.g, from Iridian Technologies, where available products include software suitable for enabling cameras to collect iris image information from persons, including inmates, and for processing such images for personal identification purposes. Thus, captured image data is advantageously stored in a database, such as database 323 in FIG. 3C, with known identification data. These image data are then advantageously compared with images derived at a correctional facility call center by scanning the iris of a would-be caller. IPTS 320 in FIG. 3C advantageously performs the transfer from a camera at the correctional facility to database 323 and performs the comparison of the currently generated image with images stored in database 323 to identify (or fail to identify) the person submitting the current iris image.

A similar process is used in connection with personal identification using speaker recognition. Thus, a spoken sample of a person's speech—preferably an utterance relating to the person's name, PIN number or some combination of such terms—is collected. Advantageously this collection is performed at a time when that person's identity can be determined with a high degree of certainty, as when he/she has been arrested and finger-printed or otherwise subject to close scrutiny. This (reference) spoken speech sample is then stored, again advantageously in a database such as 323 in FIG. 3, and a current (test) sample of speech by a person purporting to have a particular identity is collected and compared using a computer such as IPTS 320 in FIG. 3. When a sufficient similarity is determined to exist between the reference and test samples, the identity of the person is deemed to be verified.

Illustrative commercial products providing speaker recognition functionality are available from a number of vendors, including ScanSoft Inc. See, for example, the description of ScanSoft's SpeechSecure Speaker Verification.

Application of the combination of iris recognition and/or speaker recognition together with more traditional user-ID, password and PIN techniques provides a high degree of certainty as to the identity of an individual, and such techniques are used to advantage in embodiments of the present invention described herein.

It will be recognized by those skilled in the art that the present inventive embodiments provide IP telephony systems and methods for use in inmate telephone service applications. The design makes possible operational efficiencies, a high degree of flexibility in service offerings, centralized or regionalized network control and easy maintenance of high value assets—all resulting in economies of scale and redundancy not previously available using prior on-site inmate calling services platforms. As has been noted above, the 3-way calling features described in connection with FIGS. 15 and 16 may readily be adapted for use in present personal computer implementations of ICS.

While the foregoing description has been in terms of voice communications, those skilled in the art will recognize that the described techniques are readily adapted for use with video and multimedia communications contexts as well. Thus, for example, presently described techniques will find application in video visitation and video arraignment, and other similar inmate communications contexts. Thus, for example, typical areas of applications for present inventive techniques are described in the paper by C. E. Johnson, et al., "New Technology is Creating Improvements in the Corrections Field, *Corrections Today*, July, 2005, pp. 62-64, which paper is hereby incorporated by reference as if set forth in its entirety herein.

While references are sometimes made in this application to subsets of parties, it should be understood that this includes the subset having all of the (usually, called) parties. The term call content, and related term call content packets refer to the voice or other content of a call. Also, the term switch should be understood to include router in appropriate cases.

While the terms correctional or correctional facilities and related terms have been used extensively in the present description, it will be understood that such usage includes other confinement contexts as well.

What is claimed is:

1. At a server in a packet network, a method for selectively establishing and monitoring a call between a calling party and a called party, the method comprising
    receiving a first message from said calling party including a request to establish a call to said called party,
    sending a second message to a first network address associated with said called party, said second message requesting evidence of the presence of said called party at said first network address,
    evaluating evidence of satisfying at least a first criterion in any response to said second message
    when said evidence in said any response to said second message satisfies at least said first criterion, establishing a conference call between said calling party and said first network address, and
    after said establishing a conference call between said calling party and said first network address, monitoring packets for evidence of the exclusive continued presence of said called party at said first network address to detect any attempted or actual addition of another party or substitution of another party for the called party.

2. The method of claim 1 wherein said request to establish a call to said called party does not include a request to establish a conference call.

3. The method of claim 1 wherein said request to establish a call includes a network address for said called party.

4. The method of claim 1 wherein said request to establish a call does not include a network address for said called party, said method further comprising obtaining said first network address from a network directory resource.

5. The method of claim 1 further comprising
    when said evidence in said any response to said second message does not satisfy said at least a first criterion, sending at least a third message to said first network address, said at least a third message requesting additional evidence of the presence of said called party at said first network address,
    evaluating evidence of satisfying at least a second criterion in any response to said at least a third message, and
    when said evidence in said any response to said at least a third message satisfies said at least a second criterion, establishing a conference call between said calling party and said first network address.

6. The method of claim 5 wherein said evidence satisfying at least a first criterion comprises information relating to said first address.

7. The method of claim 5 wherein satisfying said at least a second criterion comprises information relating to a terminal connected to said network at said first address.

8. The method of claim 1 wherein said conference call is established by bridging a link between said calling party and said server with a link between said first network address and said server.

9. The method of claim 5 wherein said conference call is established by bridging a link between said calling party and said server with a link between said first network address and said server.

10. The method of claim 1, further comprising generating an alarm signal when said evidence of the continued presence of said called party at said first network address fails to comply with at least a second criterion.

11. The method of claim 10, further comprising generating an alarm signal when said evidence of the continued presence of said called party at said first network address fails to comply with at least a second criterion.

12. The method of claim 1 wherein the identifier uniquely identifying the particular end-user hardware device associated with said called party is an equipment code.

13. The method of claim 12 wherein the equipment code is a MAC address, an IP-phone identification response, or a cellular phone serial number.

14. The method of claim 1 wherein the identifier uniquely identifying the particular end-user hardware device associated with said called party comprises a network address.

15. At a server in a packet network, a method for selectively establishing and monitoring a call between a calling party and a called party, the method comprising
- receiving a first message from said calling party including a request to establish a call to said called party,
- sending a second message to a first network address associated with said called party, said second message requesting evidence of the presence of said called party at said first network address,
- evaluating evidence of satisfying at least a first criterion in any response to said second message, wherein said evidence satisfying at least a first criterion comprises an identifier uniquely identifying a particular end-user hardware device associated with said called party,
- when said evidence in said any response to said second message satisfies at least said first criterion, establishing a conference call between said calling party and said first network address, and
- after said establishing a conference call between said calling party and said first network address, monitoring for additional evidence of the exclusive continued presence of said called party to detect an attempted or actual addition of another party or substitution of another party for the called party, wherein said additional evidence comprises the identifier uniquely identifying the particular end-user hardware device associated with said called party.

16. At a server in a packet network, a method for selectively establishing and monitoring a call between a calling party and a called party, the method comprising
- receiving a first message from said calling party including a request to establish a call to said called party,
- sending a second message to a first network address associated with said called party, said second message requesting evidence of the presence of said called party at said first network address,
- evaluating evidence of satisfying at least a first criterion in any response to said second message, wherein said evidence satisfying at least a first criterion comprises a session identifier uniquely identifying the called party,
- when said evidence in said any response to said second message satisfies at least said first criterion, establishing a conference call between said calling party and said first network address, and
- after said establishing a conference call between said calling party and said first network address, monitoring packets for evidence of the exclusive continued presence of said called party at said first network address to detect any attempted or actual addition of another party or substitution of another party for the called party.

17. At a server in a packet network, a method for selectively establishing and monitoring a call between a calling party and a called party, the method comprising
- receiving a first message from said calling party including a request to establish a call to said called party,
- sending a second message to a first network address associated with said called party, said second message requesting evidence of the presence of said called party at said first network address,
- evaluating evidence of satisfying at least a first criterion in any response to said second message, wherein said evidence satisfying at least a first criterion comprises information subject to a transformation that is characteristic of a particular person or end-user hardware device, and
- when said evidence in said any response to said second message satisfies at least said first criterion, establishing a conference call between said calling party and said first network address, and
- after said establishing a conference call between said calling party and said first network address, monitoring packets for evidence of the exclusive continued presence of said called party at said first network address to detect any attempted or actual addition of another party or substitution of another party for the called party.

18. The method of claim 17 wherein the information is a number or code sent by a conferencing server only to specified destinations.

19. The method of claim 17 wherein the transformation is an encryption.

20. The method of claim 17 wherein the transformation is a hashing function.

21. The method of claim 17 wherein the information is biometric information.

* * * * *